US010908651B2

(12) United States Patent
Honma et al.

(10) Patent No.: US 10,908,651 B2
(45) **Date of Patent: *Feb. 2, 2021**

(54) ELECTRONIC DEVICE HOUSING

(71) Applicant: TORAY INDUSTRIES, INC., Tokyo (JP)

(72) Inventors: Masato Honma, Ehime (JP); Yoshiki Takebe, Ehime (JP); Naokichi Imai, Ehime (JP); Takashi Fujioka, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/760,735

(22) PCT Filed: Sep. 6, 2016

(86) PCT No.: PCT/JP2016/076117

§ 371 (c)(1),
(2) Date: Mar. 16, 2018

(87) PCT Pub. No.: WO2017/047440

PCT Pub. Date: Mar. 23, 2017

(65) Prior Publication Data

US 2018/0260003 A1 Sep. 13, 2018

(30) Foreign Application Priority Data

Sep. 18, 2015 (JP) ................................ 2015-185785
Sep. 18, 2015 (JP) ................................ 2015-185786
Sep. 18, 2015 (JP) ................................ 2015-185787

(51) Int. Cl.
*G06F 1/16* (2006.01)
*G06F 1/20* (2006.01)

(52) U.S. Cl.
CPC .......... *G06F 1/1658* (2013.01); *G06F 1/1605* (2013.01); *G06F 1/1626* (2013.01);
(Continued)

(58) Field of Classification Search
CPC .... G06F 1/1658; G06F 1/1656; G06F 1/1698; G06F 1/1605; G06F 1/1626;
(Continued)

(56) References Cited

U.S. PATENT DOCUMENTS

2003/0189814 A1 10/2003 Kato et al.
2006/0232920 A1 10/2006 Miyamoto et al.
(Continued)

FOREIGN PATENT DOCUMENTS

CN 1494149 A 5/2004
CN 101010188 A 8/2007
(Continued)

OTHER PUBLICATIONS

JP2005317942 with english translation (Year: 2005).*
(Continued)

*Primary Examiner* — Abhishek M Rathod
(74) *Attorney, Agent, or Firm* — Birch, Stewart, Kolasch & Birch, LLP

(57) ABSTRACT

An electronic device housing includes: a bottom cover; a top cover; a partition structure that is disposed in a space divided by the bottom cover and the top cover and has an opening; and a heat generation member. The partition structure is joined to the bottom cover or the top cover to form a hollow structure, and the heat generation member is disposed on a surface of the partition structure on the hollow structure side.

9 Claims, 22 Drawing Sheets

4
3
D3
2
D4
S1
(a)

S1
4
3
D3
2
D4
(b)

(52) U.S. Cl.
CPC .......... *G06F 1/1635* (2013.01); *G06F 1/1656* (2013.01); *G06F 1/1698* (2013.01); *G06F 1/203* (2013.01)

(58) Field of Classification Search
CPC ..... G06F 1/1635; G06F 1/203; H05K 5/0086; H05K 7/20409
See application file for complete search history.

(56) References Cited

U.S. PATENT DOCUMENTS

2008/0264956 A1 10/2008 Estlander
2009/0117366 A1* 5/2009 Honma ................. B29C 70/086 428/314.8
2011/0090632 A1* 4/2011 Raff ...................... G06F 1/1616 361/679.27
2011/0319525 A1* 12/2011 Maeda ............... C08G 59/3218 523/452
2013/0010411 A1* 1/2013 Wu ........................... G09F 9/30 361/679.01
2013/0065987 A1 3/2013 Fukuzaki et al.
2013/0083249 A1* 4/2013 Nonomura ............... H04N 5/64 348/725
2013/0083491 A1* 4/2013 Rappoport ............ G06F 1/1656 361/722
2013/0242487 A1 9/2013 Fujioka et al.
2014/0022749 A1 1/2014 Nonomura et al.
2015/0040583 A1 2/2015 Kwak et al.
2015/0062826 A1 3/2015 Lin
2015/0084816 A1 3/2015 Kurose et al.
2018/0085977 A1* 3/2018 Ezaki ...................... B32B 15/08

FOREIGN PATENT DOCUMENTS

CN 103237646 A 8/2013
CN 203814112 U 9/2014
EP 1898231 A1 3/2008
JP 58-27997 U 2/1983
JP 4-118560 U 10/1992
JP 4-125496 U 11/1992
JP 8-288681 A 11/1996
JP 10-117071 A 5/1998
JP 10-150280 A 6/1998
JP 11-17369 A 1/1999
JP 2000-151132 A 5/2000
JP 2000-190163 A 7/2000
JP 2000-194269 A 7/2000
JP 2005-317942 A 11/2005
JP 2005317942 A * 11/2005 ............... H05K 5/02
JP 2006-293926 A 10/2006
JP 2008-527686 A 7/2008
JP 2011-22848 A 2/2011
JP 2012-124267 A 6/2012
JP 2013-62379 A 4/2013
JP 2013-74043 A 4/2013
JP 2013-81000 A 5/2013
JP 5418102 B2 2/2014
JP 2014-123645 A 7/2014
JP 2014-239105 A 12/2014
JP 2015-70307 A 4/2015

OTHER PUBLICATIONS

English translation ofJP2014123645 (Year: 2014).*
International Search Report, issued in PCT/JP2016/076117, PCT/ISA/210, dated Oct. 18, 2016.
Written Opinion of the International Searching Authority, issued in PCT/JP2016/076117, PCT/ISA/237, dated Oct. 18, 2016.
Chinese Office Action and Search Report, dated Mar. 19, 2019, for Chinese Application No. 201680053866.6, with an English translation.
Extended European Search Report, dated Apr. 11, 2019, for European Application No. 16846311.5.
Office Action issued in Chinese Patent Application No. 201680053866.6 dated Aug. 13, 2019.
Extended European Search Report, dated Oct. 9, 2020, for European Application No. 20182300.2.
Japanese Office Action dated Oct. 20, 2020, for Japanese Application No. 2016-561868, with an English translation.

* cited by examiner (a)
(b)
100
1
101
θ

ELECTRONIC DEVICE HOUSING

TECHNICAL FIELD

The present invention relates to an electronic device housing in which electronic device components are built.

BACKGROUND ART

Performance enhancement of central processing units significantly contributes to rapid performance enhancement and miniaturization of electronic devices in recent years. However, since the amount of heat generated by the whole of a so called mother board including the central processing unit significantly affects the performance of an electronic device, many attempts have been made to improve the heat dissipation property of the electronic device by a strategy such as performance enhancement of a heat dissipation member such as a cooling fan or a heat sink, or use of a material having a high thermal conductivity for a housing that stores a mother board. In addition, the risk of occurrence of a low temperature burn in a human body due to generation of heat by an electronic device has been increased as portable electronic devices such as smartphones and tablet personal computers have come into wide use. Further, electronic device housings are required to have increased rigidity for preventing breakage of components in electronic devices with thickness reduction of notebook computers, smart phones and tablet personal computers. Specifically, at the time when an electronic device is operated (a load is applied in the thickness direction of the electronic device), or falls, a force acts on an electronic device housing in a torsion direction, and therefore the electronic device housing is required to have high torsional rigidity. In view of such a background, many techniques for improving the thermal property (e.g. heat dissipation property) and the rigidity of an electronic device housing have been heretofore proposed.

Specifically, as a technique for improving heat dissipation property, Patent Document 1 discloses an invention in which a resin housing having high heat dissipation property is prepared using a material obtained by mixing a polyphenylene sulfide resin with a thermally conductive material having a thermal conductivity of 100 W/m·K or more. Patent Document 2 discloses an invention in which heat dissipation property is improved by taking advantage of thermal conductivity of aluminum while rigidity is secured by an aluminum back chassis and reinforcing pieces of a carbon fiber-reinforced composite material. Likewise, Patent Document 3 discloses an invention in which a heat pipe is laid on a housing surface at a part close to an element serving as a heat source in an electronic device to impart heat dissipation property, and the heat pipe itself is made rigid to improve rigidity. In addition, as a technique for improving rigidity, Patent Document 4 discloses an invention in which a claw portion provided in a first housing is engaged with an engaged portion provided in a second housing, whereby the first housing and the second housing are engaged with each other on a lateral surface. Patent Document 5 discloses an invention for increasing the rigidity of an electric device cabinet structure which includes a resin lower case having upper and lower electric device mounting surfaces, and an upper case having a front wall overlapping the upper electric device mounting surface.

In addition, in recent years, for reducing the thickness and weight of an electronic device, improving the portability of the electronic device, and preventing breakage of components in the electronic device, an electronic device housing has been required to have increased rigidity. Specifically, when the electronic device is held with one hand and operated with the other hand, when the electronic device is transported, or when a monitor or the like is opened or closed, a biased load is applied, and therefore a force acts on the electronic device housing in a torsion direction. In addition, if the electronic device is dropped by accident during transportation, a force also acts in a torsion direction. Therefore, the electronic device housing is required to have high torsional rigidity. In addition, when a load is applied to the electronic device housing in a thickness direction, internal electronic components, liquid crystal components such as a display, particularly glass members may be broken, and therefore the electronic device housing is required to have high deflection rigidity. On the other hand, when the electronic device housing is formed of a material having high conductivity, the performance of an antenna built in the electronic device housing be deteriorated. In view of such a background, many electronic device housings having improved rigidity while securing antenna performance have been heretofore proposed.

Specifically, Patent Document 6 discloses an invention that relates to an electronic device in which an antenna and a shielding member are built. Patent Document 7 discloses an invention in which rigidity is increased by joining a metallic reinforcing plate to a resin housing. Patent Document 8 discloses an invention that relates to an electronic device in which a shielding member is disposed in a resin housing in such a manner that the shielding member does not overlap an antenna. Patent Document 9 discloses an invention that relates to an electronic device in which an opening formed in a part of a housing is covered with a material having low conductivity, and an antenna is disposed at the position of the opening.

Further, when a battery is built in an electronic device, action of a force on a battery in a torsion direction may cause breakdown or firing of a battery. In addition, in a device in which a battery can be easily accessed, the battery is exposed if the device falls and a cover is detached, and therefore the possibility that other members come into contact with the battery increases, leading to a further increase in risk of causing the breakdown or firing. Therefore, the electronic device housing is required to have high torsional rigidity. In view of such a background, many techniques for increasing the rigidity of an electronic device housing have been heretofore proposed.

Specifically, Patent Document 5 discloses an invention for increasing the rigidity of an electric device cabinet structure which includes a resin lower case having upper and lower electric device mounting surfaces, and an upper case having a front wall overlapping the upper electric device mounting surface. Patent Document 3 discloses an invention for increasing the rigidity of an electronic device housing of by making the electronic device housing have a structure in which surfaces of two plates are selectively bonded and joined together. Patent Document 4 discloses an invention for increasing the rigidity of an electronic device housing by abutting the tip of a rib, which is formed on the inner surface of a first housing, against the inner surface of a second housing. Patent Document 10 discloses an invention that relates to an electronic device case in which a battery can be accessed by opening and closing a back side wall. Patent Document 11 discloses an invention that relates to a frame body having a closed space formed by sealing two frame components with a photosensitive adhesive.

PRIOR ART DOCUMENTS

Patent Documents

Patent Document 1: Japanese Patent Publication No. 5418102

Patent Document 2: Japanese Patent Laid-open Publication No. 2012-124267

Patent Document 3: Japanese Patent Laid-open Publication No. 8-288681

Patent Document 4: Japanese Patent Laid-open Publication No. 2011-22848

Patent Document 5: Japanese Patent Laid-open Publication No. 10-150280

Patent Document 6: Japanese Patent Laid-open Publication No. 2015-70307

Patent Document 7: Japanese Patent Laid-open Publication No. 2000-151132

Patent Document 8: Japanese Patent Laid-open Publication No. 2006-293926

Patent Document 9: Japanese Patent Laid-open Publication No. 2013-81000

Patent Document 10: Japanese Patent Laid-open Publication No. 10-117071

Patent Document 11: National Publication of International Patent Application No. 2008-527686

SUMMARY OF THE INVENTION

Problems to be Solved by the Invention

However, in the invention disclosed in Patent Document 1, thermal characteristics are improved due to thermal conductivity originating from a material by using a material having high thermal conductivity as compared to a resin material that does not include a thermally conductive material, but a structure of a housing for securing rigidity is not mentioned, and a shape cannot be retained when a large load is applied to the electronic device.

In addition, in the invention disclosed in Patent Document 2, thermal characteristics are secured by aluminum, and rigidity is secured by a carbon fiber-reinforced composite material, but since the difference between the thermal characteristics of the aluminum material in a thickness direction and a surface direction is small, and therefore when an electronic device housing with a heat generation member is disposed near a portion that is in contact with a human body, the contact surface of the human body has a high temperature in a local manner.

In addition, in the invention disclosed in Patent Document 3, thermal characteristics are improved because a heat pipe is laid in the housing, but in the structure of the electronic device housing, only the bottom surface is made rigid, and therefore it is unable to improve rigidity by making use of the whole surface of the housing, resulting in insufficient torsional rigidity.

In addition, in the invention disclosed in Patent Document 4, a claw portion and an engaged portion are not brought into contact with each other or integrated with each other, and therefore when application of a large load causes torsion, the claw portion or the engaged portion is broken, or the electric device housing is divided into the first housing and the second housing. As a result, in the invention disclosed in Patent Document 4, only a certain scale of torsional deformation can be suppressed.

In addition, in the invention disclosed in Patent Document 5, the upper electric device mounting surface of the resin lower case and the front wall of the upper case are pressure-welded to be joined. Therefore, according to the invention disclosed in Patent Document 5, it is not possible to provide an electronic device housing which has a level of torsional rigidity required in the market.

As described above, in conventional techniques for increasing the rigidity of the electronic device housing while imparting favorable thermal characteristics to the electronic device housing, it is not possible to impart favorable thermal characteristics and high torsional rigidity to the electronic device housing while attaining thickness reduction and weight reduction. Thus, it is expected to provide a technique capable of imparting favorable thermal characteristics and high torsional rigidity to the electronic device housing while attaining thickness reduction and weight reduction.

In addition, in the invention disclosed in Patent Document 6, a distance between the antenna and the shielding member is secured by inserting a spacer, but the distance between the antenna and the shielding member is not defined, and it is hard to say that the distance is sufficient for improving antenna performance. In addition, a sufficient distance can be secured between the antenna and the shielding member only when a thick spacer is used, and performance required in the market is not attained from the viewpoint of an increase in weight and utilization of a space. Further, since the shielding member is only locally disposed, the torsional rigidity and deflection rigidity of the electronic device housing are not attained.

On the other hand, in Patent Document 7, an antenna is not described, but if the antenna is disposed on a printed board, it is difficult to secure a distance between the antenna and a reinforcing plate, which is necessary for obtaining satisfactory antenna performance. In addition, since the flat portion of the reinforcing plate and the housing are joined to each other, the effect of reinforcing the housing is low, so that the torsional rigidity and deflection rigidity of the housing are not attained.

In addition, in the invention disclosed in Patent Document 8, satisfactory antenna performance cannot be obtained because consideration is not given to the distance in the in-surface direction between the antenna and the shielding member. In addition, since the shielding member is considered to be a plate-like member, it is not possible to satisfy the torsional rigidity and deflection rigidity as a housing.

In addition, in the invention disclosed in Patent Document 9, it is necessary that an opening be formed in the housing, and to a member formed of a conductive material be attached to the opening, and therefore productivity is deteriorated. Further, since rigidity is exhibited only by the housing, torsional rigidity that satisfies market needs cannot be exhibited.

As described above, according to the conventional techniques, it is not possible to improve torsional rigidity and deflection rigidity while securing antenna performance. Thus, it is expected to provide a technique capable of improving the torsional rigidity and deflection rigidity while securing antenna performance.

Further, in the invention disclosed in Patent Document 5, the upper electric device mounting surface of the resin lower case and the front wall of the upper case are pressure-welded to be joined. Thus, according to the invention disclosed in Patent Document 5, it is not possible to provide an electronic device housing which has a level of torsional rigidity required in the market, and is excellent in portability.

In addition, in the invention disclosed in Patent Document 3, the inner plate is joined to the whole surface of the outer plate, and stretch-molding is performed to form a heat pipe channel, so that the cooling capacity is improved. However, in the heat pipe channel formed by stretch-molding, the thickness of the plate decreases, and therefore torsional rigidity required for the electronic device housing cannot be attained. In addition, the inner plate is formed on the whole surface of the outer plate, and thus from the viewpoint of weight reduction, it is hard to say that the invention in Patent Document 3 provides an effective method for improving rigidity.

In addition, in the invention disclosed in Patent Document 4, the tip of the rib is in contact with only the inner surface of the housing. Thus, in the invention disclosed in Patent Document 4, if torsion occurs due to application of a heavy load to the housing, the tip of the rib relatively slips with respect to the inner surface of the housing, and therefore only a certain level of torsional deformation can be suppressed.

In addition, in the invention disclosed in Patent Document 10, a person who has no knowledge or is not authorized may access the battery without permission, resulting in occurrence of breakdown or firing of the battery. In addition, by impact in accidental falling of the electronic device, the battery may be broken to be fired. Further, Patent Document 10 suggests that a partition sustains an external pressure, so that an electronic device assembly disposed in a storage space can be prevented from being affected, but with such partial reinforcement, torsional rigidity required in the market cannot be attained.

In addition, in the invention disclosed in Patent Document 11, it is not easy to form the joining portion of the frame member, the optical guide and the photosensitive adhesive without a break, and thus productivity is deteriorated. In addition, since consideration is not given properties of the frame body having a closed space, torsional rigidity required in the market cannot be attained, and a charged battery may be broken inside.

As described above, according to the conventional technologies, it is not possible to effectively suppress breakage of the battery stored inside while attaining thickness reduction and weight reduction. Thus, it is expected to provide a technique capable of effectively suppressing breakage of a battery stored inside while attaining thickness reduction and weight reduction.

The present invention has been made in view of the above-described problems, and an object of the present invention is to provide an electronic device housing having improved thermal characteristics and torsional rigidity while attaining thickness reduction and weight reduction.

Another object of the present invention is to provide an electronic device housing having improved torsional rigidity and deflection rigidity while securing antenna performance.

Still another object of the present invention is to provide an electronic device housing capable of effectively suppressing breakage of a battery stored inside while attaining thickness reduction and weight reduction.

Solutions to the Problems

An electronic device housing according to a first aspect of the present invention includes: a bottom cover; a top cover; a partition structure that is disposed in a space divided by the bottom cover and the top cover and has an opening; and a heat generation member, the partition structure being joined to the bottom cover or the top cover to forma hollow structure, the heat generation member being disposed on a surface of the partition structure on the hollow structure side.

In the electronic device housing according to the first aspect of the present invention, the bottom cover or the top cover that forms the hollow structure has a hole, in the above-described invention.

In the electronic device housing according to the first aspect of the present invention, the height of the follow structure is within a range of 50% or more and 90% or less of the height of the space, in the above-described invention.

In the electronic device housing according to the first aspect of the present invention, at least one of a cooling member, an air blowing member and a thermally conductive member is disposed in the hollow structure, in the above-described invention.

In the electronic device housing according to the first aspect of the present invention, the thermal conductivity of the partition structure in a surface direction is within a range of 0.1 W/m·K or more and 300 W/m·K or less, and the ratio of the thermal conductivity in a surface direction to the thermal conductivity in a thickness direction in the partition structure is within a range of 1 or more and 100 or less, in the above-described invention.

In the electronic device housing according to the first aspect of the present invention, the partition structure, and the bottom cover or the top cover to which the partition structure is joined are formed of a fiber-reinforced composite material, a thermoplastic resin is provided in or on a joining portion of at least one of the partition structure and the bottom cover or the top cover, and the partition structure and the bottom cover or the top cover are joined with the thermoplastic resin, in the above-described invention.

In the electronic device housing according to the first aspect of the present invention, the partition structure and the bottom cover or the top cover are directly joined, in the above-described invention.

An electronic device housing according to a second aspect of the present invention includes: a bottom cover; a top cover; a partition structure disposed in a space divided by the bottom cover and the top cover; and an antenna, the partition structure being joined to the bottom cover or the top cover. The electronic device housing satisfies the following condition (A) or (B), and the shortest distance between a first material and the antenna is 3 mm or more. Condition (A): the antenna is disposed on the partition structure, and at least a part of the bottom cover or the top cover which is joined to the partition structure includes a first material having a volume resistivity of less than $1.0\times10^{-2}$ Ω·m, and the partition structure includes a second material having a volume resistivity of $1.0\times10^{-2}$ Ω·m or more. Condition (B): the antenna is disposed on the bottom cover or the top cover to which the partition structure is joined, at least a part of the partition structure includes a first material having a volume resistivity of less than $1.0\times10^{-2}$ Ω·m, and the bottom cover or the top cover to which the partition structure is joined includes a second material having a volume resistivity of $1.0\times10^{-2}$ Ω·m or more.

In the electronic device housing according to the second aspect of the present invention, the antenna is disposed within a range of 50% or more and 95% or less of the height of the space where the position of the inner surface of the bottom cover is a reference position, in the above-described invention.

In the electronic device housing according to the second aspect of the present invention, at least a part of the bottom cover or the top cover which is not joined to the partition structure includes the second material, in the above-described invention.

In the electronic device housing according to the second aspect of the present invention, the shortest distance between the antenna and an electronic component other than the antenna, which is disposed on the partition structure, is 3 mm or more, in the above-described invention.

In the electronic device housing according to the second aspect of the present invention, the shortest distance between the first material and a transmission portion and a reception portion that form the antenna is 3 mm or more, in the above-described invention.

In the electronic device housing according to the second aspect of the present invention, the partition structure is joined to a portion of the bottom cover or the top cover joined to the partition structure, which includes the first material, in the above-described invention.

In the electronic device housing according to the second aspect of the present invention, the projected area of the partition structure in a direction of the bottom cover or the top cover which is joined to the partition structure is within a range of 60% or more and 95% or less of the area of the bottom cover or the top cover to which the partition structure is joined, in the above-described invention.

In the electronic device housing according to the first and second aspects of the present invention, the partition structure has a hole, in the above-described invention.

In the electronic device housing according to the first and second aspects of the present invention, a hollow structure is formed by the bottom cover or the top cover which is joined to the partition member, and the volume of the hollow structure is within a range of 55% or more and 95% or less of the volume of the space, in the above-described invention.

An electronic device housing according to a third aspect of the present invention includes: a bottom cover; a top cover; and a partition structure that is disposed in a space divided by the bottom cover and the top cover and has an opening, the partition structure being joined to the bottom cover or the top cover. A battery is fixed in a hollow structure formed by joining the partition structure to the bottom cover or the top cover.

In the electronic device housing according to the third aspect of the present invention, a gap of 1 mm or more is present between the battery and the bottom cover or the top cover which is joined to the partition structure, in the above-described invention.

In the electronic device housing according to the third aspect of the present invention, a cushioning member is disposed in the gap, in the above-described invention.

In the electronic device housing according to the third aspect of the present invention, the bottom cover or the top cover which is joined to the partition structure is a seamless member formed of the same material, in the above-described invention.

In the electronic device housing according to a third aspect of the present invention, the battery is disposed on a surface of the partition structure, in the above-described invention.

In the electronic device housing according to the third aspect of the present invention, the elastic modulus of the partition structure and the elastic modulus of the bottom cover or the top cover which is joined to the partition structure are larger than the elastic modulus of the top cover or the bottom cover which is not joined to the partition structure, in the above-described invention.

In the electronic device housing according to a third aspect of the present invention, the battery is a battery that can be charged in a non-contact manner, in the above-described invention.

In the electronic device housing according to a third aspect of the present invention, the partition structure has an opening having an area of 30% or less of the surface area of the partition structure, in the above-described invention.

In the electronic device housings according to the first, second and third aspects of the present invention, the partition structure is joined to the bottom cover or the top cover by thermal welding in such a manner that the peeling load at 23° C. is within a range of 60 N/cm$^2$ or more and 5000 N/cm$^2$ or less, and the peeling load at 200° C. is less than 60 N/cm$^2$, in the above-described invention.

In the electronic device housing according to the first, second and third aspects of the present invention, the partition member includes a plurality of components, in the above-described invention.

Effects of the Invention

In the electronic device housing according to the present invention, thermal characteristics and torsional rigidity can be improved while thickness reduction and weight reduction are attained.

EMBODIMENTS OF THE INVENTION

First Embodiment

First, an electronic device housing according to a first embodiment of the present invention will be described. Examples of the application of the electronic device housing of the present invention may include speakers, displays, HDDs, notebook personal computers, mobile phones, digital still cameras, PDAs, plasma displays, televisions, lighting systems, refrigerator and game machines. In particular, the housing is preferably used for clamshell-type personal computers and tablet-type personal computers which have high torsional rigidity and are required to be light and thin.

Figure 1:
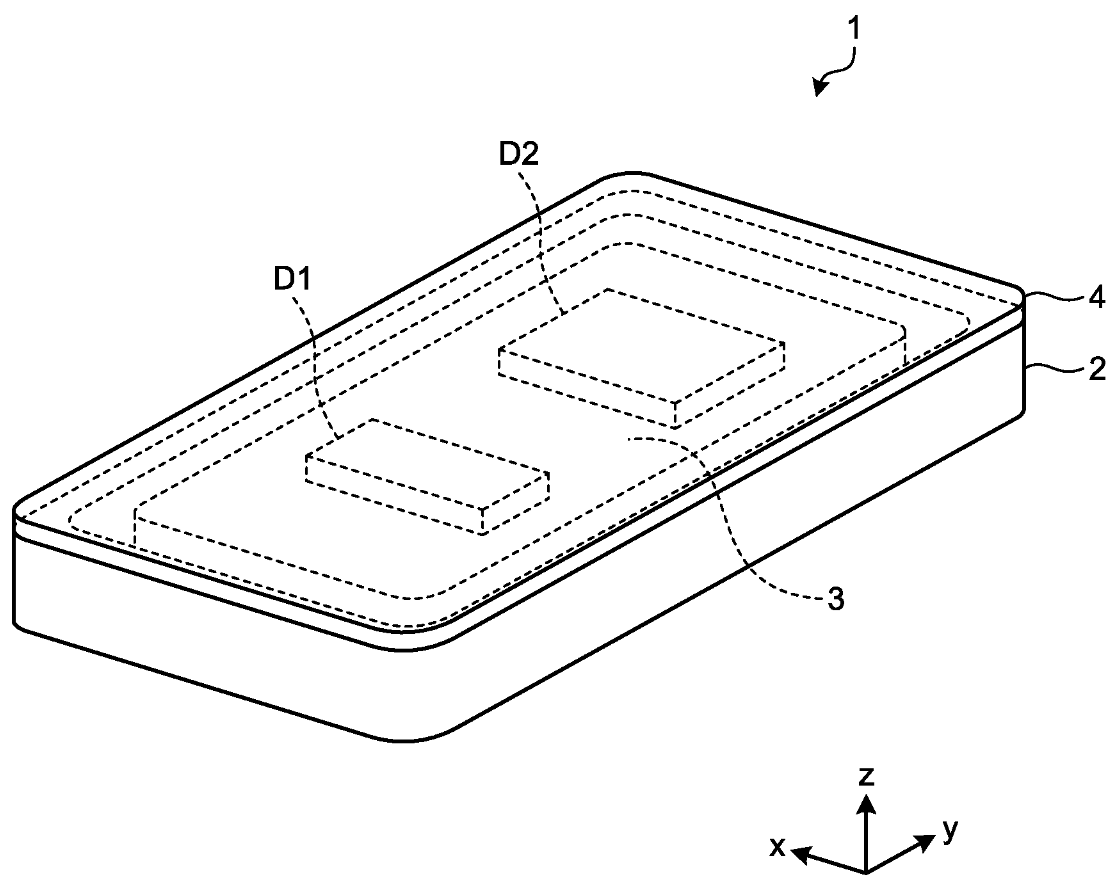
FIG. 1 is a perspective view showing a configuration of an electronic device housing according to a first embodiment of the present invention.

FIG. 1 is a perspective view showing a configuration of an electronic device housing according to the first embodiment of the present invention. As shown in FIG. 1, an electronic device housing 1 according to the first embodiment of the present invention includes, as main components, a bottom cover 2 rectangular in plan view, a partition structure 3 joined to the bottom cover 2 and having an opening, and a top cover 4 rectangular in plan view. In the following description, a direction parallel to short sides of the bottom cover 2 and the top cover 4 is defined as an x direction, a direction parallel to long sides of the bottom cover 2 and the top cover 4 is defined as a y direction, and a direction perpendicular to the x direction and the y direction is defined as a z direction (vertical direction).

Figure 2:
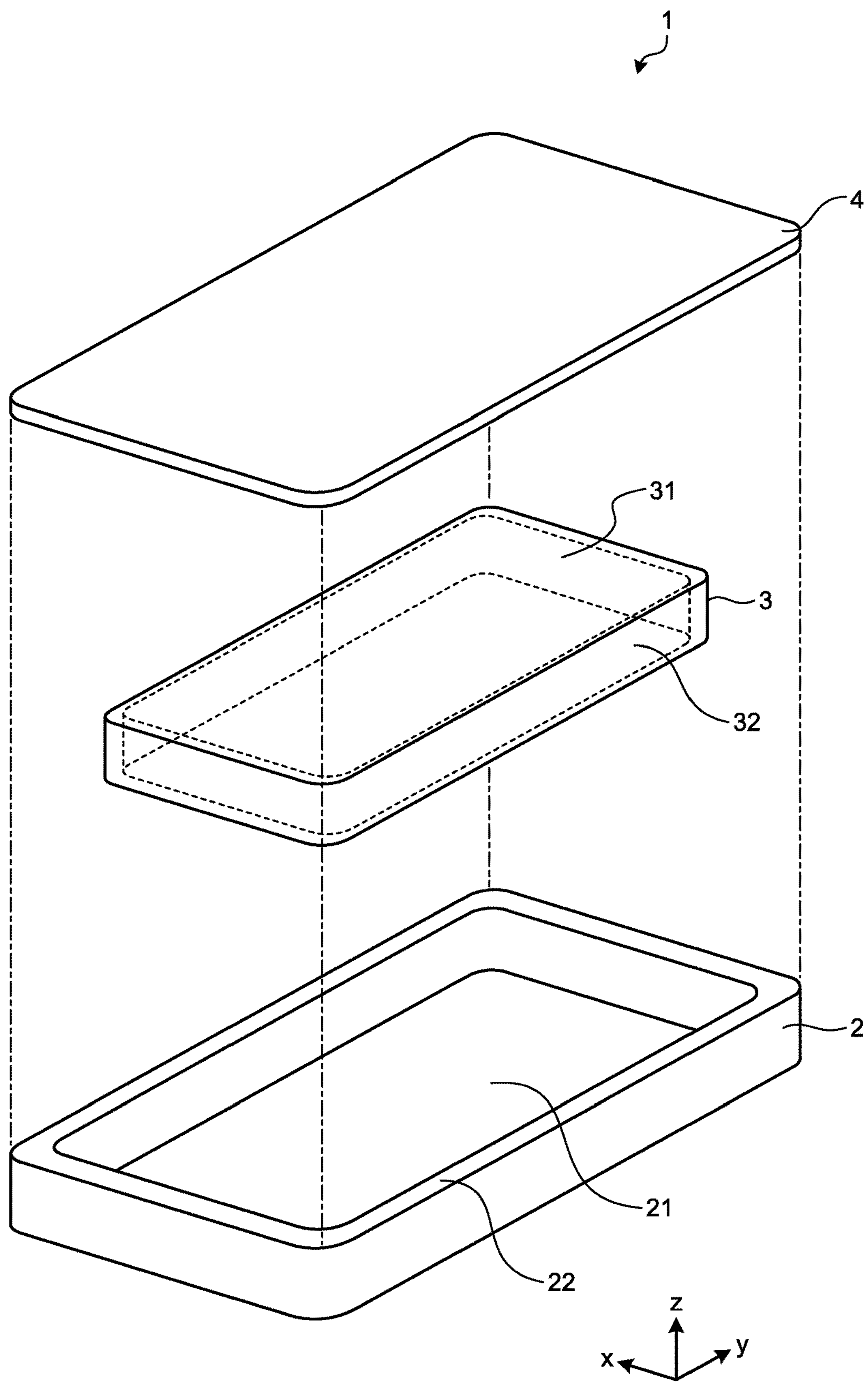
FIG. 2 is an exploded perspective view of the electronic device housing shown in FIG. 1.

FIG. 2 is an exploded perspective view of the electronic device housing 1 shown in FIG. 1. As shown in FIG. 2, the bottom cover 2 includes a flat portion 21 parallel to an x-y plane and rectangular in plan view, and a rising wall member 22 erected in the positive direction of z from an edge member of the flat portion 21. The thickness of a member that forms the bottom cover 2 is preferably within a range of 0.1 mm or more and 0.8 mm or less. In addition, the elastic modulus of the member that forms the bottom cover 2 is preferably within a range of 20 GPa or more and 120 GPa or less.

In addition, it is preferable that the bottom cover 2 is formed of any one of a metal material and a fiber-reinforced composite material, and the bottom cover 2 may be formed by combining these materials. From the viewpoint of exhibiting high torsional rigidity, the bottom cover 2 is preferably a seamless member formed of the same material. From the viewpoint of productivity, the flat portion 21 having a simple shape may be formed using the metal material and the fiber-reinforced composite material which have high dynamic properties, and the rising wall member 22 and a joining portion which have a complicated shape may be formed by injection molding etc. using a resin material excellent in moldability.

It is preferable to use a light metal material such as an aluminum alloy, a magnesium alloy or a titanium alloy as the metal material. Examples of the aluminum alloy may include A2017 and A2024 as Al—Cu systems, A3003 and A3004 as Al—Mn systems, A4032 as an Al—Si system, A5005, A5052 and A5083 as Al—Mg systems, A6061 and A6063 as Al—Mg—Si systems, and A7075 as an Al—Zn system. Examples of magnesium alloy may include AZ31, AZ61 and AZ91 as Mg—Al—Zn systems. Examples of the titanium alloy may include alloys containing palladium of grades 11 to 23, alloys containing cobalt and palladium, and Ti-6Al-4V corresponding to grade 50 (a alloy), grade 60 ($\alpha$-$\beta$ alloy) and grade 80 ($\beta$ alloy).

As reinforcing fibers to be used in the fiber-reinforced composite material, fibers such as carbon fibers, glass fibers, aramid fibers, boron fibers, PBO fibers, high strength polyethylene fibers, alumina fibers and silicon carbide fibers can be used, and two or more of these fibers may be mixed, and used. These reinforcing fibers can be used as fiber structures such as long fibers aligned in one direction, single tows, woven fabrics, knits, nonwoven fabrics, mats and braided cords. From the viewpoints of high dynamic characteristics and design freedom, it is preferable to use unidirectional continuous fiber prepreg, and from the viewpoint of isotropy of dynamic properties and moldability, it is preferable to use a fabric prepreg. In addition, the reinforcing fiber may be composed of a laminate of these prepregs.

Examples of the matrix resin that can be used include thermosetting resins such as epoxy resins, phenol resins, benzoxazine resins and unsaturated polyester resins, polyester-based resins such as polyethylene terephthalate (PET), polybutylene terephthalate (PBT), polytrimethylene terephthalate (PTT), polyethylene naphthalate and liquid crystal polyester, polyolefins such as polyethylene (PE), polypropylene (PP) and polybutylene, styrene-based resins, urethane resins, and thermosetting resins such as polyoxymethylene (POM), polyamide (PA), polycarbonate (PC), polymethyl methacrylate (PMMA), polyvinyl chloride (PVC), polyphenylene sulfide (PPS), polyphenylene ether (PPE), modified PPE, polyimide (PI), polyamideimide (PAI), polyether imide (PEI), polysulfone (PSU), modified PSU, polyether sulfone (PES), polyketone (PK), polyether ketone (PEK), polyether ether ketone (PEEK), polyether ketone ketone (PEKK), polyarylate (PAR), polyether nitrile (PEN), phenol-based resins, and phenoxy resins. From the viewpoint of productivity and dynamic characteristics, thermosetting resins are preferably used, and among them, epoxy resins are preferably used. From the viewpoint of moldability, thermoplastic resins are preferably used. Among them, polyamide resins are preferably used from the viewpoint of strength, polycarbonate resins are preferably used from the viewpoint of impact resistance, polypropylene resins are preferably used from the viewpoint of lightness, and polyphenylene sulfide resins are preferably used from the viewpoint of heat resistance. The resin may be used not only as a matrix resin of the fiber-reinforced composite material but also as the bottom cover, the top cover or the partition structure which is composed of a resin itself.

Figure 3:
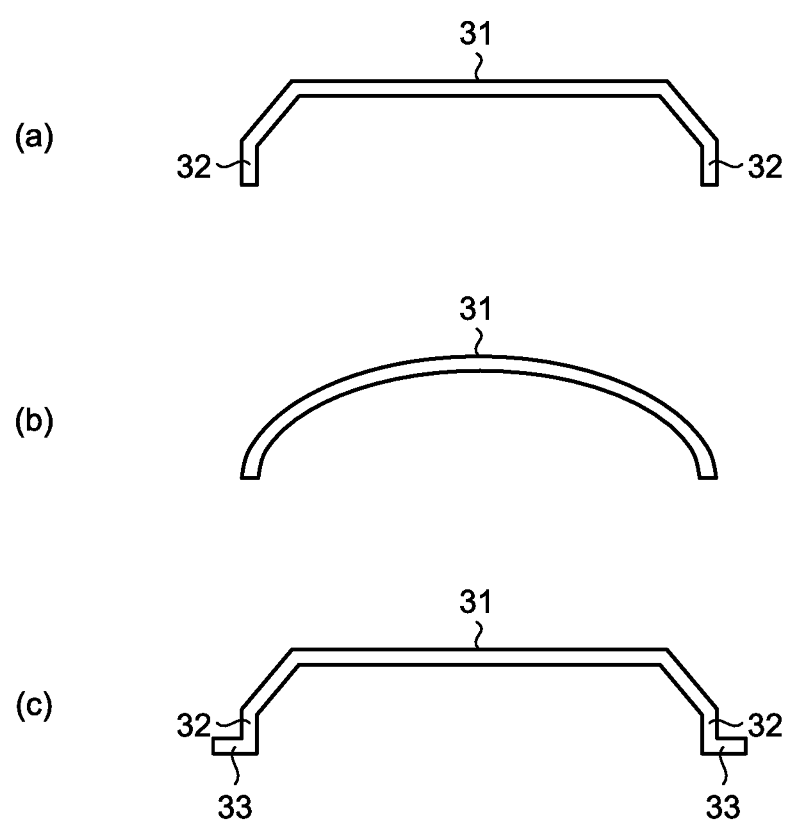
FIGS. 3(*a*) to 3 (*c*) are sectional views showing one example of a configuration of a partition structure.

The partition structure 3 is a partition structure having an opening. Specifically, the partition structure 3 includes a flat portion 31 parallel to an x-y plane and rectangular in plan view, and a rising wall member 32 erected in the negative direction of z from an edge member of the flat portion 31. A surface of the flat portion 31, which faces the flat portion 21 of the bottom cover 2, is packed with an electronic device. The partition structure 3 is joined to the bottom cover 2 with a hollow structure S1 formed between the flat portion 31 and the flat portion 21 of the bottom cover 2 by joining the reinforcing structure 3 to the flat portion 21 of the bottom cover 2. As used herein, the "partition structure having an opening" refers to a shape having an opening in a part of the partition structure, and has the flat portion 31 and the rising wall member 32 as shown in FIG. 3(*a*), but the partition structure 3 may include a member having a curved shape as the flat portion 31 as shown in FIG. 3(*b*). That is, a curved member may be used as the flat portion 31, resulting in omission of the rising wall member 32. Further, as shown in FIG. 3(*c*), the reinforcing structure may include the flat portion 31, the rising wall member 32 and the joint portion 33. In addition, from the viewpoint of increasing rigidity and effectively utilizing the space, an irregular shape may be formed on the flat portion 31. In the present embodiment, the partition structure 3 is joined to the bottom cover 2, but the partition structure 3 may be joined to the top cover 4 to form the hollow structure S1 between the flat portion 31 of the partition structure 3 and the top cover 4. The partition structure 3 is not particularly limited, but is preferably a member having an opening, and one example thereof is the partition structure shown in FIGS. 3(*a*) to 3(*c*).

The area of the joining area in a plane parallel to the x-y plane is preferably within a range of 10 $cm^2$ or more and 100 $cm^2$ or less. Specifically, when the joining area is less than 10 $cm^2$, there arises the problem if a load that causes large deformation is applied to the electronic device housing 1, the partition structure 3 is peeled from the bottom cover 2, and thus original torsional rigidity cannot be exhibited. When the joining area is larger than 100 $cm^2$, there arises the problem that the increase in the joining area causes an increase in weight of the electronic device housing 1 and a decrease in volume of the hollow structure S1. Thus, the joining area is preferably within a range of 10 $cm^2$ or more and 100 $cm^2$ or less.

The maximum value of a distance h between the flat portion 31 of the partition structure 3 and the flat portion 21 of the bottom cover 2 (height of the partition structure 3 from the flat portion 21) is within a range of 3 mm or more and 30 mm or less. In the present invention, the height h of the partition structure 3 is one factor of exhibiting torsional rigidity. Thus, when the maximum value of the height h is less than 3 mm, there arises the problem that the effect of the rising wall member 32 is low in the electronic device housing 1, so that original torsional rigidity cannot be exhibited. On the other hand, when the maximum value of the height h is larger than 30 mm, there arises the problem that it is necessary to increase the thickness of the rising wall member 32, resulting in an increase in weight of the electronic device housing 1. Thus, the maximum value of the height h is preferably within a range of 3 mm or more and 30 mm or less.

Figure 4:
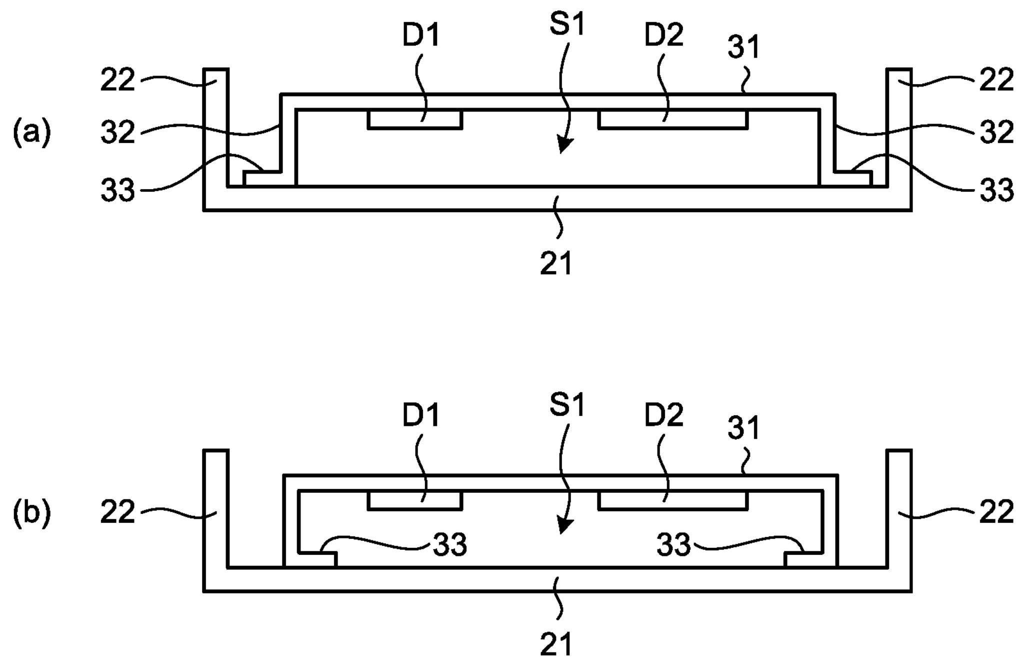
FIGS. 4(*a*) and 4(*b*) are sectional views showing one example of a configuration of the partition structure shown in FIG. 2.
Figure 5:
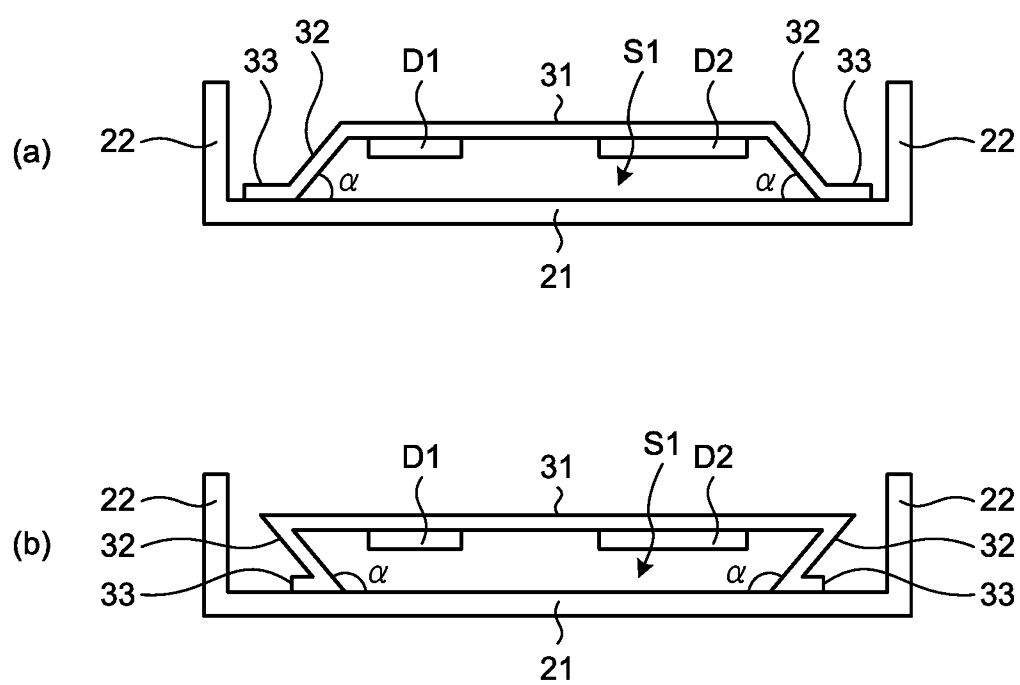
FIGS. 5(*a*) and 5(*b*) are sectional views showing one example of a configuration of the partition structure shown in FIG. 2.

FIGS. 4 and 5 are sectional views showing one example of a configuration of the partition structure 3 shown in FIG. 2. The joining portion 33 may be provided so as to extend in an outward direction parallel to the x-y plane from the edge member of the rising wall member 32 as shown in FIG. 4(*a*). In addition, the joining portion 33 may be provided so as to extend in an inward direction parallel to the x-y plane from the peripheral portion of the rising wall member 32 as shown in FIG. 4(*b*). In addition, it is preferable that the angle α of the rising wall member 32 with respect to the flat portion 21 of the bottom cover 2 (or the joining portion 33 of the partition structure 3) is within a range of 45° or more and 135° or less as shown in FIGS. 5(*a*) and 5(*b*). FIG. 5(*a*) shows a state in which the angle α of the rising wall member 32 is an acute angle, and FIG. 5(*b*) shows a state in which the angle α of the rising wall member 32 is an obtuse angle.

Heat generation members D1 and D2 are disposed on the surface of the partition structure 3 in the hollow structure S1 formed by joining the partition structure 3 and the bottom cover 2 or the top cover 4 (shown in FIGS. 2 to 6). With this configuration, the distance between the bottom cover 2 touched by a user of an electronic device and the heat generation members D1 and D2 can be increased to suppress elevation of the temperature of the bottom cover 2. Here, in this specification, the "heat generation member" means a component that generates heat as an electronic device is operated, and particularly refers to a component that causes temperature elevation by 10° C. or more as the electronic device is operated. Examples of the heat generation member may include LEDs, capacitors, inverters, reactor elements, thermistor elements, power transistor elements, motors, CPUs, and electronic boards on which these elements are mounted.

It is preferable that the partition structure 3 has a hole for dissipating heat in the hollow structure S1 to the outside. In addition, a hole for dissipating heat in the hollow structure S1 to the outside may be formed in the bottom cover 2 or the top cover 4 that forms the hollow structure S1. In addition, the height of the hollow structure S1 is preferably within a range of 50% or more and 90% or less of the height of the space divided by the bottom cover 2 and the top cover 4. At least one of a cooling member, an air blowing member and a thermally conductive member may be disposed in the hollow structure S1.

Figure 6:
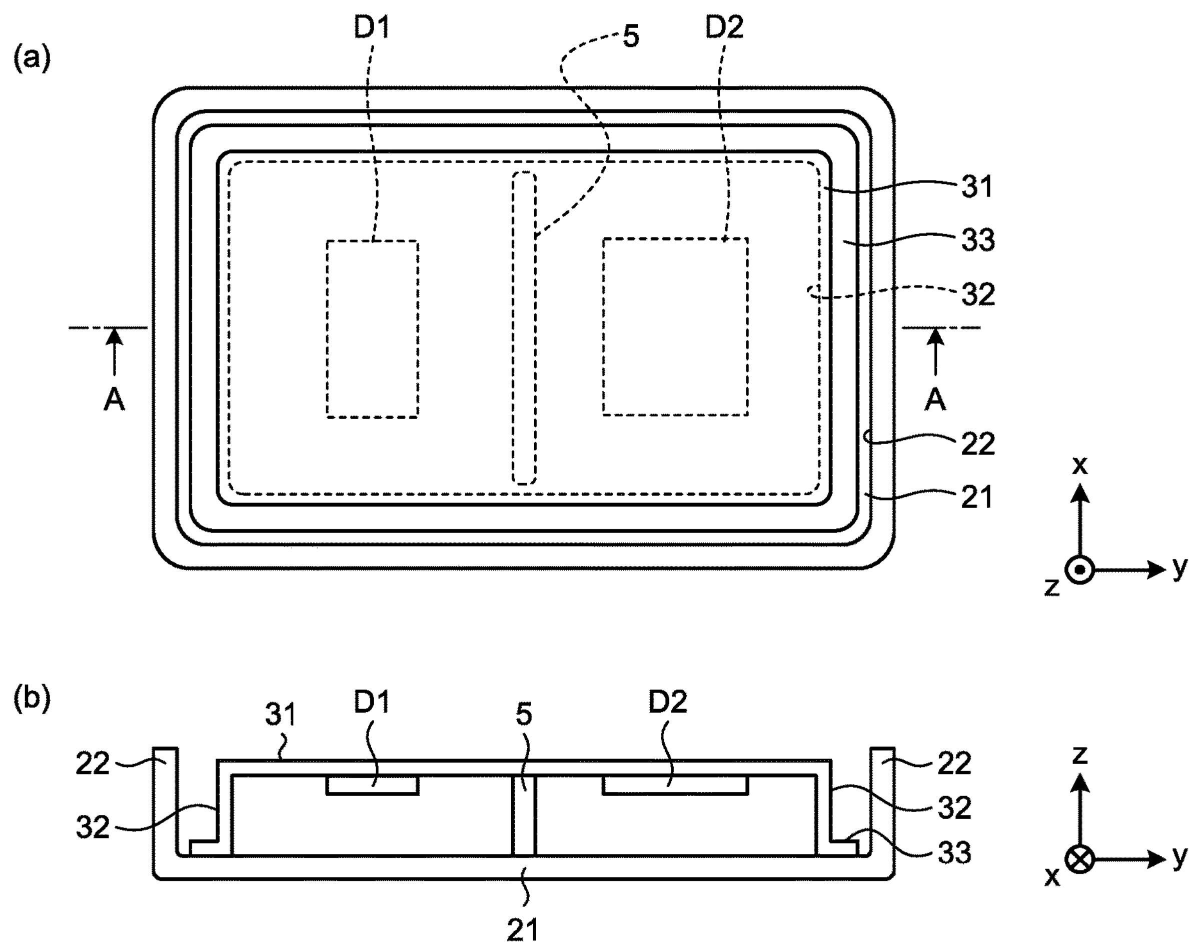
FIGS. 6(*a*) and 6(*b*) show a plan view and a sectional view showing a configuration of another partition structure.

Deflection rigidity may also be increased by disposing another partition structure in the hollow structure S1 formed between the flat portion 31 of the partition structure 3 and the flat portion 21 of the bottom cover 2. FIG. 6(*a*) is a plan view showing a configuration of another partition structure, and FIG. 6(*b*) is a sectional view taken along line A-A in FIG. 6(*a*). As shown in FIGS. 6(*a*) and 6(*b*), another partition structure 5 is a member disposed so as to extend in the x direction at the central part of the hollow structure S1 in the y direction, and is connected to the flat portion 21 of the bottom cover 2 and the flat portion 31 of the partition structure 3. By integrating the flat portion 21 of the bottom cover 2 and the flat portion 31 of the partition structure 3 with the other partition structure 5 interposed therebetween, the bottom cover 2 and the partition structure 3 are deformed in synchronization with each other if a load is applied, and therefore the deflection rigidity of the electronic device housing 1 can be improved. In addition, the rising wall member 22 of the bottom cover 2 and the rising wall member 32 of the partition structure 3 are integrated with the other partition structure 5, and thus the rising wall members 22 and 32 of the bottom cover 2 and the partition structure 3 are hardly deformed particularly inside direction of the electronic device housing 1, so that the torsional rigidity of the electronic device housing 1 can be improved.

As long as the other partition structure 5 is connected to the flat portion 21 of the bottom cover 2 and the flat portion 31 of the partition structure 3, another reinforcing structure 5 may be a member disposed so as to extend in the y direction at the central part of the hollow structure S1 in the x direction, or a member disposed so as to extend in the diagonal direction of the hollow structure S1. In particular, it is preferable that the other partition structure 5 is disposed so as to pass through a position at which the amount of deflection of the flat portion 21 of the bottom cover 2 increases when a load is applied in the thickness direction, and a plurality of members may be disposed with the members crossing one another. In addition, it is preferable that the other partition structure 5 is formed of an impact absorbing material excellent in elasticity, such as a resin material having an elastomer or rubber component, or a gel, and accordingly, not only deflection rigidity but also an effect against impact can be exhibited.

In the present embodiment, a curved member may be used as the flat portion 31, resulting in omission of the rising wall member 32. In addition, from the viewpoint of increasing rigidity and effectively utilizing the space, an irregular shape may be formed on the flat portion 31. In the present embodiment, the partition structure 3 is joined to the bottom cover 2, but the partition structure 3 may be joined to the top cover 4 to form the hollow structure S1 between the flat portion 31 of the partition structure 3 and the top cover 4.

In the present embodiment, the joining portion 33 is formed on all of the four rising wall members 32 formed on respective sides of the flat portion 31, but the joining portion 33 may be formed on at least one of the four rising wall members 32. Alternatively, the joining portion 33 may be formed on two or more adjacent rising wall members 32 among the four rising wall members 32. In addition, the area of the joining portion 33 formed on one rising wall member 32 is preferably 1 $cm^2$ or more. In addition, the thickness of the member that forms the partition structure 3 is preferably within a range of 0.3 mm or more and 1.0 mm or less from the viewpoint of reducing the weight and thickness of the electronic device housing. In addition, the elastic modulus of the member that forms the partition structure 3 is preferably within a range of 20 GPa or more and 120 GPa or less.

In addition, it is preferable that the partition structure 3 is formed of any one of the above-described metal material and fiber-reinforced composite material, and the material can be selected according to the purpose of the partition structure 3. That is, it is preferable to use a metal material or fiber-reinforced composite material having a high elastic modulus from the viewpoint of exhibiting a high reinforcing effect, it is preferable to use a non-conductive material such as a resin or a glass fiber-reinforced composite material from the viewpoint of exhibiting radio wave permeability (antenna property), and it is preferable to use a conductive material such as a metal material or a carbon fiber-reinforced composite material from the viewpoint of exhibiting electromagnetic wave shielding property (radio wave shielding property). Further, when the partition structure 3 is formed of a fiber-reinforced composite material, it is preferable that the partition structure 3 is composed of a laminate of continuous fiber prepregs. In addition, the ratio of the linear expansion coefficient of the partition structure 3 to the linear expansion coefficient of the bottom cover 2 to which the partition structure 3 is joined is within a range of 0.1 or more and 10 or less.

In addition, from the viewpoint of the thermal characteristics, particularly dissipation efficiency with respect to heat generated from the heat generation members shown by symbols D1 and D2, it is preferable that the thermal conductivity of the partition structure 3 in a surface direction is within a range of 0.1 W/m·K or more and 300 W/m·K or less, and the ratio of the thermal conductivity in a surface direction to the thermal conductivity in a thickness direction in the partition structure 3 is within a range of 1 or more and 100 or less. Here, as a method for measuring the thermal conductivity, for example, the specific heat and the thermal diffusivity are measured by a laser flash method, and the thermal conductivity is calculated from the following equation.

$$K=Cp\cdot\alpha\cdot\rho$$

Here, K represents a thermal conductivity of the sample, Cp represents a specific heat of the sample, $\alpha$ represents a thermal diffusivity of the sample, and $\rho$ represents a specific gravity of the sample.

Further, the partition structure 3 is joined to the flat portion 21 of the bottom cover 2 by thermal welding, and the peeling load at 23° C. is preferably within a range of 60 $N/cm^2$ or more and 5000 $N/cm^2$ or less. In addition, the peeling load at 23° C. is preferably within a range of 100 $N/cm^2$ or more and 5000 $N/cm^2$ or less. Examples of the thermal welding method may include an insert injection method, an outsert injection method, a vibration welding method, an ultrasonic welding method, a laser welding method and a hot plate welding method. Here, it is preferable that the bonding surface between the partition structure 3 and the flat portion 21 has a peeling load of less than 60 $N/cm^2$ at 200° C. in addition, the peeling load at 200° C. is more preferably 30 $N/cm^2$ or less.

In addition, this peeling load is preferably less than 60 $N/cm^2$ at 150° C., and it is preferable from the viewpoint of disassembling adhesive that the peeling load can be easily peeled off in a lower temperature range. However, when the disassembling temperature decreases, the partition structure may be peeled off by temperature elevation associated with operation of an electronic component or depending on a temperature of a use environment in use as an electronic device housing. Therefore, it is preferable that in the temperature range where the electronic device housing is used, the partition structure is joined with high bonding strength, and in the disassembling temperature range, the reinforcing structure can be easily peeled off. Thus, the peeling load at 80° C. is more preferably within a range of 60 $N/cm^2$ or more and 5000 $N/cm^2$ or less.

The peeling load at 200° C. is preferably as low as possible, and most preferably 10 $N/cm^2$ or less. Since the peeling load at 200° C. is preferably as low as possible, the lower limit thereof is not particularly limited, and is preferably 0 $N/cm^2$ or more, but the peeling load at 200° C. is more preferably 1 $N/cm^2$ or more because when it is excessively low, handling characteristics may be deteriorated.

With this configuration, disassembling bondability that makes it possible to easily remove the partition structure 3 can be exhibited, so that repair and recycling of an electronic device can be facilitated. In addition, it is preferable that the partition structure 3, and the bottom cover 2 to which the partition structure 3 is joined are formed of a fiber-reinforced composite material, a thermoplastic resin is provided in or on a joining portion of at least one of the partition structure 3 and the bottom cover 2, and the partition structure 3 and the bottom cover 2 are joined with the thermoplastic resin.

As a method for providing a thermoplastic resin on the joining portion, mention is made of a method in which using a fiber-reinforced sheet (prepreg sheet) including a thermoplastic resin as a matrix resin, molding is performed to obtain the partition structure 3, and the bottom cover 2 or the top cover 4 to which the partition structure 3 is joined. A molded product obtained by this method is preferable because a thermoplastic resin is present on a surface of the molded product at a high ratio, and therefore it is possible to secure a wide bonding area in joining. From the viewpoint of the dynamic characteristics of the members, a fiber-reinforced composite material including a thermosetting resin as a matrix resin is preferable, and as a method for providing a thermoplastic resin on such a member, a mention is made of a method in which a molten material obtained by heating and melting a thermoplastic resin or a solution obtained by dissolving a thermoplastic resin in a solvent is applied to provide a thermoplastic resin on the fiber-reinforced composite material. In addition, a mention may be made of, for example, a method in which in molding and curing of a fiber-reinforced sheet (prepreg sheet) including a thermosetting resin as a matrix resin, a laminate in which a film or nonwoven fabric composed of a thermoplastic resin is laminated on a surface is molded under heat and pressure on the outermost layer of the fiber-reinforced sheet (prepreg sheet).

In addition, it is preferable that the partition structure 3 and the bottom cover 2 or the top cover 4 are joined directly. When a fiber-reinforced composite material having a thermoplastic resin is used for the partition structure 3 and/or the joining portion of the bottom cover 2 or the top cover 4 which is joined to the partition structure 3, it is not necessary to use an adhesive in addition to the members, and the members can be joined directly, so that an increase in weight of the electronic device housing 1 can be suppressed. A suitable method for directly joining the partition structure 3 and the bottom cover 2 or the top cover 4 is a method using a laminate, in which a film or nonwoven fabric composed of a thermoplastic resin is laminated on a surface, for the outermost layer of a fiber-reinforced sheet (prepreg sheet) including a thermosetting resin as a matrix resin, and the thermoplastic resin used here can also be selected from the group of thermoplastic resins exemplified as the matrix resin.

Preferably, a thermoplastic resin is selected which has a melting point lower than the molding temperature at which a fiber-reinforced sheet (prepreg sheet) with the matrix resin composed of a thermosetting resin is molded and cured. The lower limit of the melting point of the thermoplastic resin is not particularly limited, but it is preferably 80° C. or higher, more preferably 100° C. or higher from the viewpoint of exhibiting heat resistance in application of the electronic device housing of the present invention to an electronic device. In addition, the form of the thermoplastic resin is not particularly limited, and examples thereof include forms of films, continuous fibers, woven fabrics, particles, nonwoven fabrics and the like, but from the viewpoint of handling characteristics during molding operation, forms of films and nonwoven fabrics are preferable. By selecting such a resin, the thermoplastic resin is melted during molding, and the thermoplastic resin is formed while spreading like a film over a surface of a molded product, so that the bonding area increases during joining, or the reinforcing fibers of the fiber-reinforced sheet are impregnated with the thermoplastic resin to form a strong thermoplastic resin layer, so that high peeling strength can be exhibited. The thermoplastic resin may be provided on at least one of the partition structure 3 obtained in the above-mentioned method and the bottom cover 2 and the top cover 4 joined to the partition structure 3, but it is preferable that the thermoplastic resin is provided on the joining members of both the members to be joined. In addition, it is preferable that substantially the same thermoplastic resin is selected as thermoplastic resins to be provided.

In this specification, the "disassembling adhesive" means that the partition structure 3 can be not only easily removed, but also re-bonded, and in re-bonding, the thermoplastic resin may be provided, but it is preferable that the reinforcing structure can be re-bonded without increasing the weight of the thermoplastic resin or the like. In addition, the peeling load in re-bonding is preferably 50% or more, more preferably 70% or more, of the original peeling load. The disassembling adhesive in the present invention can be attained by applying to a joining technique such characteristics of a thermoplastic resin that the resin is melted by heating to reduce dynamic characteristics, and the resin is solidified by cooling or at normal temperature to exhibit high dynamic characteristics specific to the resin.

In addition, a hole can be formed in each of the flat portion 31 and the rising wall member 32 of the partition structure 3 within the bounds of not considerably reducing torsional rigidity in the present invention. With such a structure, it is possible to dispose a wiring cable for connecting an electronic component built in the hollow structure S1 to an electronic component disposed in a space other than the hollow structure S1 divided by the bottom cover 2 and the top cover 4, and a display, a keyboard and so on which correspond to the top cover 4. From the viewpoint of dissipation of heat, it is preferable that the hole is disposed to so as to improve the flow of air, e.g. the hole is formed on the opposed rising wall member 32. The area of the holes is preferably 30% or less of the surface area of the partition structure 3, and is more desirably 15% or less of the surface area of the reinforcing structure 3 from the viewpoint of torsional rigidity.

The top cover 4 is joined to the edge member of the rising wall member 22 of the bottom cover 2. In FIG. 1, the top cover 4 has a smooth plate shape, but may have a plate shape having a curved surface or irregularities. The material and shape of the top cover 4 may be the same as those of the bottom cover 2, and with this configuration, the electronic device housing 1 having high rigidity on either of surfaces thereof can be obtained. In addition, the top cover 4 may be an electronic component such as a liquid crystal display or a keyboard, and with such a configuration, application to a laptop-type personal computer or a tablet-type personal computer is possible.

As is evident from the above description, the electronic device housing 1 according to the first embodiment of the present invention is an electronic device housing including: the top cover 4; the bottom cover 2 having the rising wall member 22 that is erected toward the top cover 4 and joined to the top cover 4 at the edge member; the partition structure 3 that is disposed in the hollow structure S1 divided by the top cover 4 and the bottom cover 2 and has an opening; and heat generation members D1 and D2, the partition structure 3 being joined to the bottom cover 2 or the top cover 4 to form the hollow structure S1, the heat generation members D1 and D2 being disposed on a surface of the partition structure 3 on the hollow structure S1 side. Accordingly, thermal characteristics and torsional rigidity can be improved while thickness reduction and weight reduction are attained.

The hollow structure S1 may be formed by joining the partition structure 3 to the bottom cover 2 or the top cover 4 with the partition structure 3 being formed from a member having an opening shape. Here, it is preferable that the projected area of the partition structure 3 in a direction of the bottom cover 2 or top cover 4 to which the partition structure 3 is joined is adjusted to fall within a range of 60% or more and 95% or less of the projected area of the bottom cover 2 or top cover 4 to which the partition structure 3 is joined. The disposed position of the partition structure 3 is not particularly limited, but it is preferable that the reinforcing structure 3 is positioned equally from the center position of the bottom cover 2 or the top cover 4, and by disposing the reinforcing structure 3 in this manner, torsional rigidity in an x direction or a y direction can be made isotropic. From the viewpoint of effectively utilizing a space excluding the hollow structure S1, in the space divided by the bottom cover 2 and the top cover 4, the partition structure 3 may be placed on any one of the bottom cover 2 and the top cover 4.

Specifically, when the projected area of the partition structure 3 is less than 60% of the area of the bottom cover 2 or the top cover 4 to which the partition structure 3 is joined, there arises the problem that the rising wall member 32 that is one factor of exhibiting torsional rigidity in the present invention is formed at a position close to the center position of the bottom cover 2 or the top cover 4, so that original torsional rigidity cannot be exhibited. On the other hand, when the projected area of the partition structure 3 is more than 95% of the area of the bottom cover 2 or the top cover 4 to which the partition structure 3 is joined, high torsional rigidity can be exhibited, but there arises the problem that a space excluding the hollow structure S1 becomes small, and therefore it is difficult to dispose electronic components and wiring and the like for forming an electronic device, so that application as an electronic device housing is difficult. Thus, the projected area in a direction of the bottom cover 2 or top cover 4 to which the partition structure 3 is joined is preferably within a range of 60% or more and 95% or less of the area of the joined bottom cover 2 or top cover 4 to which the partition structure 3 is joined.

Here, the shape of the projected surface of the partition structure 3, i.e. the shape of the flat portion 31 is not particularly limited, and may be not only a rectangular shape, but also a circular shape or a polygonal shape, and from the viewpoint of exhibiting high deflection rigidity, a shape conforming to the shape of the bottom cover 2 and/or the top cover 4 is preferable. Specifically, the shape of the projected surface of the partition structure 3 is preferably a rectangular shape. In addition, from the viewpoint of effectively utilizing the hollow structure S1 and a space excluding the hollow structure S1, the shape of the projected surface of the partition structure 3 is preferably a shape conforming to the shape of an electronic component to be packed. In addition, from the viewpoint of exhibiting isotropic rigidity against any load, the shape of the projected surface of the partition structure 3 is preferably a shape that is symmetric with respect to an axis in the x direction and/or the y direction.

In addition, when the hollow structure S1 is formed by forming the partition structure 3 from a member having an opening shape, and joining the partition structure 3 to the bottom cover 2 or the top cover 4, the volume of the hollow structure S1 formed by the partition member 3 in the bottom cover 2 is preferably within a range of 55% or more and 95% or less of the volume of the space divided by the bottom cover 2 and the top cover 4. Specifically, when the volume of the hollow structure S1 is less than 55% of the volume of the space divided by the bottom cover 2 and the top cover 4, there arises the problem that the height of the rising wall member 32 that is one factor exhibiting torsional rigidity in the present invention is low and/or the projected area of the partition structure 3 is small, so that original torsional rigidity cannot be exhibited. On the other hand, when the volume of the hollow structure S1 is more than 95% of the volume of the space divided by the bottom cover 2 and the top cover 4, high torsional rigidity can be exhibited, but there arises the problem that a space excluding the hollow structure S1 becomes small, and thus it is difficult to dispose electronic components and wiring and the like for forming an electronic device, so that application as an electronic device housing is difficult. Thus, the volume of the hollow structure S1 is preferably within a range of 55% or more and 95% or less of the volume of the space divided by the bottom cover 2 and the top cover 4.

In the present embodiment, the partition structure 3 includes one component, but the partition structure 3 may include a plurality of components. Similarly, the bottom cover 2 and the top cover 4 include one component, but the bottom cover 2 and/or the top cover 4 may include a plurality of components. With regard to the partition structure including a plurality of components, the bottom cover including a plurality of components, and the top cover including a plurality of components, the method for joining a plurality of components for forming the partition structure 3, the bottom cover 2 and the top cover 4 is not particularly limited. Examples of the method for joining a plurality of components include a method components are provided with holes, and fastened using screws, rivets and the like, or a method in which components shapes so that they can be mutually fitted are fitted and joined. Other methods for joining a plurality of components include a method in which in which an adhesive is applied to join components, and a method in which components are joined by thermal welding with a thermoplastic resin interposed between the components. Examples of the thermal welding method may include an insert injection method, an outsert injection method, a vibration welding method, an ultrasonic welding method, a laser welding method and a hot plate welding method.

EXAMPLES

Hereinafter, the present invention will be described in detail by way of examples. However, the present invention is not limited to the following examples.

<Evaluation and Measurement Methods>

(1) Torsional Rigidity Test

Figure 7:
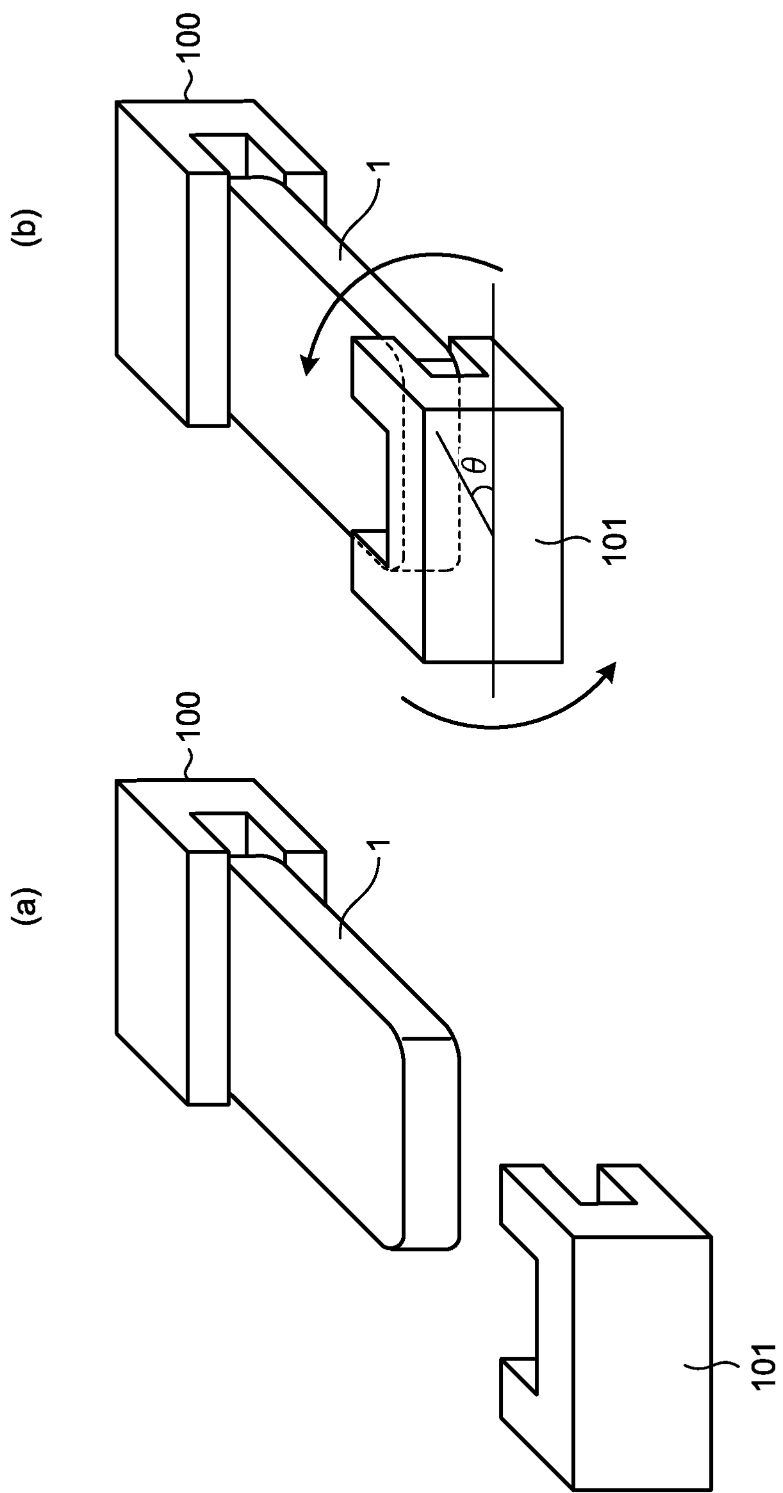
FIGS. 7(*a*) and 7(*b*) are perspective views for illustrating a torsional rigidity test method.

A housing 1 was fixed in a tester in such a manner that one side of the electronic device housing 1 was fixed by a U-shaped fixing tool 100, and the other side opposed to the fixed side was held by a support tool 101 as shown in FIG. 7(*a*), the displacement amount of the electronic device housing 1 was then measured when a load of 50 N was applied with a change rate set to 1°/min at an angle θ as shown in FIG. 7(*b*), and the measured value was defined as a torsional rigidity value of the electronic device housing 1.

(2) Deflection Rigidity Test

Figure 8:
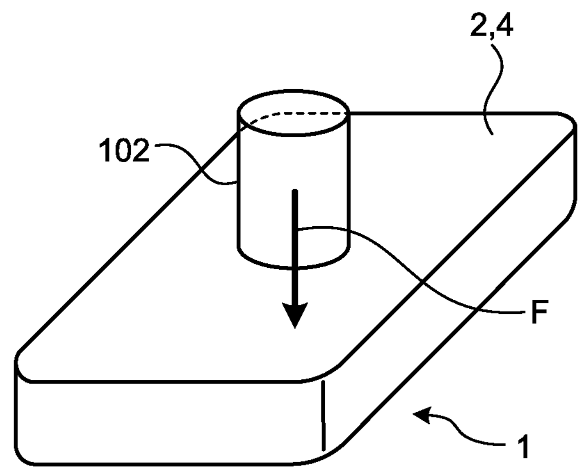
FIG. 8 is a perspective view for illustrating a deflection rigidity test method.

As shown in FIG. 8, the electronic device housing was installed in a tester in such a manner that it was able to apply a load F from the side of a bottom cover 2 or a top cover 4 to which the partition structure was joined. "Instron" (registered trademark) Universal Tester Model 4201 (manufactured by Instron Co., Ltd.) was used as a tester. The flex amount of the bottom cover 2 or the top cover 4 was measured when a load of 100 N was applied with the electronic device housing 1 pressed at the center position at a cross head speed of 1.0 mm/min using an indenter 102 having a diameter of 20 mm, and the measured value was defined as a deflection rigidity value.

(3) Evaluation of Flexural Modulus

In accordance with the specifications in ASTM D-790 (1997), the flexural moduli of materials to be used for the partition structure 3, the bottom cover 2 and the top cover 4 were evaluated. From each of members obtained in examples and comparative examples, a bending test piece having a width of 25±0.2 mm with a length set to span L+20±1 mm so that the thickness D and the span L satisfied the relationship of L/D=16 was cut for the four directions: 0°, +45°, −45° and 90° directions where a certain direction was set to the 0° direction. In this way, test pieces were prepared. The number of measurements (n) in each direction was 5, and the average value of all measured values (n=20) was defined as a flexural modulus. "Instron" (registered trademark) Universal Tester Model 4201 (manufactured by Instron Co., Ltd.) was used as a tester, a three-point bending test tool (indenter diameter: 10 mm, fulcrum diameter: 10 mm) was used, the support span was set to 16 times of the thickness of the test piece, and the bending elastic modulus was measured. The test was conducted under the following conditions: the moisture content of the test piece was 0.1 mass % or less, the atmospheric temperature was 23° C., and the humidity was 50% by mass.

(4) Peeling Load Test of Partition Structure (23° C. and 200° C.)

Figure 9:
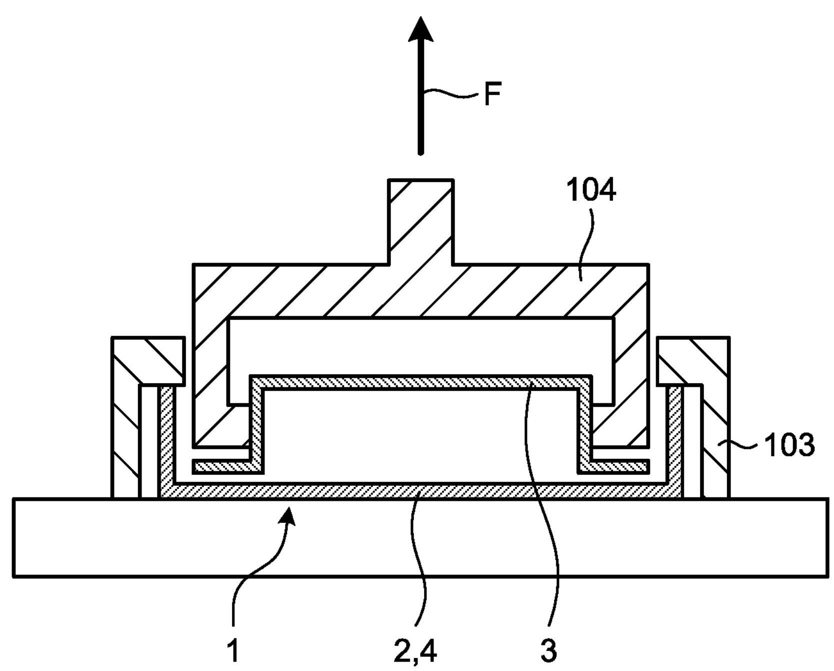
FIG. 9 is a sectional view for illustrating a peeling load test method.

The peeling load of the partition structure was evaluated in accordance with "Testing methods for tensile strength of adhesive bonds" specified in JIS K6849 (1994). As test pieces in this test, electronic device housings obtained in examples and comparative examples were used. Here, for measuring the peeling strength of the partition structure, evaluation was performed in a state in which there was not a top cover or bottom cover to which the partition structure was not joined (before the reinforcing structure was joined). Specifically, as shown in FIG. 9, the bottom cover 2 or the top cover 4 of the electronic device housing 1 was fixed by a fixing tool 103, and the partition structure 3 was fixed by a tensile tool 104. A tensile load F was applied while each member was fixed, and evaluation was performed until the partition structure 3 was peeled off, or the tensile tool 104 was detached from the partition structure 3. The joining area here was calculated by measuring the width and length of the joining surface of the partition structure 3 before joining. When joining was partially performed, the areas thereof were measured, and summed to determine a joining area. The peeling load of the partition structure 3 was calculated from the resulting tensile load value and joining area. For the peeling load of the partition structure 3 at 200° C., the electronic device housing 1 was placed in a thermostat together with the fixing tool, and the atmospheric temperature in the thermostat was elevated to 200° C. After elevation of the temperature, this state was maintained for 10 minutes, and a tensile load was then applied in the same manner as in the peeling load test of the partition structure 3, and evaluation was performed.

(5) Evaluation of Thermal Characteristics

Thermal characteristics were evaluated using specimens described in examples and comparative examples. A cartridge heater was inserted into an aluminum block to obtain a heat generation member. The aluminum block was placed at the center of a partition structure in a surface direction, and fed with a power of 8 W for 20 minutes to heat the aluminum block. For measurement of a temperature serving as an index of thermal characteristics, the temperature of the outer surface (open air side) of a bottom cover, which was not in contact with the aluminum block, was measured by a thermocouple (K type), and thermal characteristics were evaluated using the obtained temperature. Results of the evaluation were based on the following criteria. ○: the temperature is lower than 30° C. Δ: the temperature is lower than 35° C. x: the temperature is 40° C. or higher. In this evaluation, mark ○ corresponds to a good effect.

(6) Measurement of Thermal Conductivity of Material

Materials 1 to 4 to be used in examples were each formed into a disk shape having a diameter of 10 mm and a thickness of 3 to 6 mm, the specific heat and the thermal diffusivity were measured by a laser flash method-thermal constant measuring apparatus TC-3000 manufactured by Shinku-Riko Co., Ltd, and calculated by the following equation, and the thermal conductivity was calculated from the following equation.

$$K = Cp \cdot \alpha \cdot \rho$$

where K represents a thermal conductivity, Cp represents a specific heat, α represents a thermal diffusivity, and ρ represents a density.

The thickness of the material to be measured was changed according to the thermal conductivity of the measured material (hereinafter, referred to as a sample), where the thickness was increased in the case of a large thermal conductivity, and decreased in the case of a small thermal conductivity. Specifically, it took several tens millisecond until the temperature of the back surface of the sample rose to the maximum temperature after the laser irradiation, and the thickness of the sample was adjusted so that the time $t_{1/2}$ until the temperature rose by ½ of the temperature rise $\Delta Tm$ to the above-mentioned maximum temperature was 10 millisecond or more (maximum 15 millisecond). The specific heat was determined by bonding glassy carbon as a light receiving plate to the front surface of the sample, and measuring a temperature rise after laser irradiation by a R thermocouple bonded to the center of the back surface of the sample.

In addition, the measured value was calibrated with sapphire as a standard sample. The thermal diffusivity was determined by depositing a film on both sides of the sample just until the surfaces were invisible by a carbon spray, and measuring a change in temperature of the back surface of the sample after laser irradiation by an infrared detector. When the thermal conductivity shows anisotropy, the maximum value of the measured value was defined as a representative value. The thermal conductivity in each of the thickness direction and the surface direction was measured by the above-mentioned method, the thermal conductivity in the surface direction was divided by the thermal conductivity in the thickness direction to determine a thermal conductivity (ratio). The thermal conductivity in the surface direction and the thickness direction, and the ratio of the thermal conductivity in the surface direction and the thermal conductivity in the thickness direction for each material are shown in Table 1.

<Materials Used>

Materials used for evaluation are shown below.

[Material 1]

"TORAYCA" Prepreg P3252S-12 (manufactured by Toray Industries, Inc.) was provided as material 1. The properties of material 1 are shown in Table 1 below.

[Material 2]

SCF 183 EP-BL 3 manufactured by Super Resin Industry Co., Ltd. was provided as material 2. The properties of material 2 are shown in Table 1 below.

[Material 3]

An aluminum alloy A5052 was provided as material 3. The properties of material 3 are shown in Table 1 below.

[Material 4]

A magnesium alloy AZ31 was provided as material 4. The properties of material 4 are shown in Table 1 below.

TABLE 1

| | | Material 1 | Material 2 | Material 3 | Material 4 |
|---|---|---|---|---|---|
| Material | — | CFRP | GFRP | Al alloy | Mg alloy |
| Elastic modulus | GPa | 60 | 25 | 70 | 45 |
| Linear expansion coefficient | $10^{-6}$/° C. | 0.3 | 7 | 23.6 | 26 |
| Thermal conductivity (surface direction) | W/m · K | 4.6 | 0.3 | 236.0 | 159.0 |
| Thermal conductivity (thickness direction) | W/m · K | 0.7 | 0.1 | 180.0 | 120.0 |
| Thermal conductivity (ratio) | — | 6.6 | 3.0 | 1.3 | 1.3 |

Example 1

Example 1-(1): Preparation of Bottom Cover

Seven sheets having a predetermined size were cut from material 1. Among them, four sheets were cut in such a manner that the fiber direction of a prepreg was parallel to a longitudinal direction (x direction in FIG. 1), and the other three sheets were cut in such a manner that the fiber direction was parallel to a lateral direction (y direction in FIG. 1). In this example, the lateral direction (y direction) was set to 0°, and a laminate including seven prepreg sheets was prepared in such a manner that prepreg sheets with the fiber direction set to 90° and prepreg sheets with the fiber direction set to 0° were symmetrically laminated. Here, a press molding apparatus and a pair of molds were used, and the resulting laminate was disposed in a pair of molds. Here, the heating platen temperature of the press molding apparatus was set to 150° C., the molds were moved, and the laminate was pressurized with the molding pressure kept at 1.0 MPa. After 30 minutes, the molds were opened, and the molded article was removed from the molds. Trimming was performed so that the rising wall of the resulting molded article had a desired height, thereby obtaining a bottom cover.

Example 1-(2): Preparation of Top Cover

Except that molds configured to prepare a molded article having a smooth shape were used, the same procedure as in Example 1-(1) was carried out to obtain a molded article. Trimming was performed so that the resulting molded article had a desired size, thereby obtaining a top cover.

Example 1-(3): Preparation of Partition Structure

Figure 10:
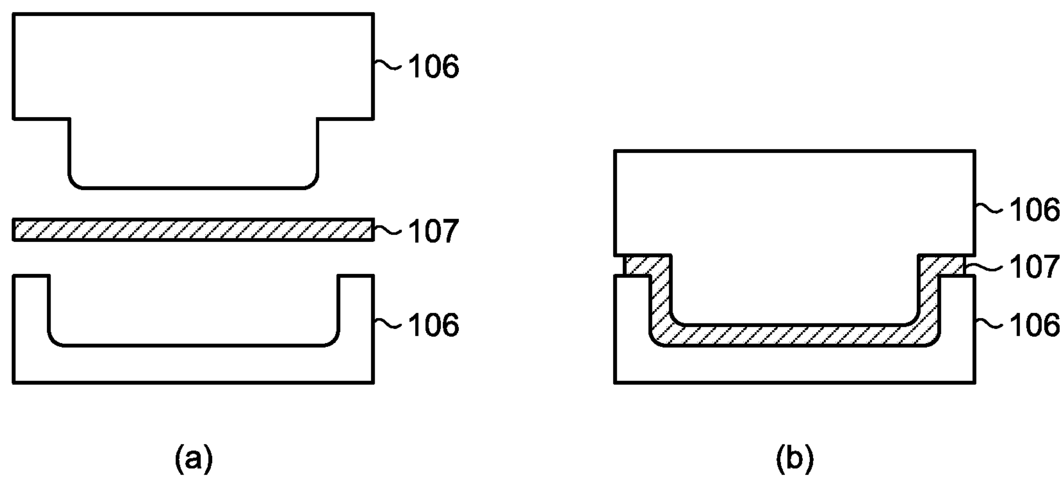
FIGS. 10(*a*) and 10(*b*) are sectional views for illustrating a press molding method.

Except that molds 106 as shown in FIG. 10 were used, the same procedure as in Example 1-(1) was carried out to obtain a molded article. Further, in a rising wall member portion protruding in the height direction of the partition structure, three tetragonal openings of 5 mm×20 mm were cut out at equal intervals from the center on the short edge side. In addition, trimming was performed so that the joining surface of the resulting molded article had a desired width, thereby obtaining a partition structure.

Example 1-(4): Preparation of Electronic Device Housing

The members obtained in Examples 1-(1) to 1-(3) were bonded using an adhesive. The molding conditions and evaluation results in Example 1 are shown in Table 2 below.

Examples 2, 3 and 4

Except that the partition structure had a size as described in Table 2, the same procedure as in Example 1 was carried out to obtain an electronic device housing. The molding conditions and evaluation results in Examples 2, 3 and 4 are shown in Table 2 below.

Example 5

Example 5-(1): Preparation of Bottom Cover

A film composed of a polyamide copolymer ("AMILAN" (registered trademark) CM8000 manufactured by Toray Industries, Inc.) and having a thickness of 50 μm was laminated on a surface to be joined to the partition structure, thereby obtaining a laminate. Except that the resulting laminate was used, the same procedure as in Example 1-(1) was carried out to obtain a bottom cover.

Example 5-(2): Preparation of Top Cover

As in the case of Example 5-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 1-(2) was carried out to obtain a top cover.

Example 5-(3): Preparation of Partition Structure

As in the case of Example 5-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 1-(3) was carried out to obtain a partition structure.

Example 5-(4): Preparation of Electronic Device Housing

Figure 11:
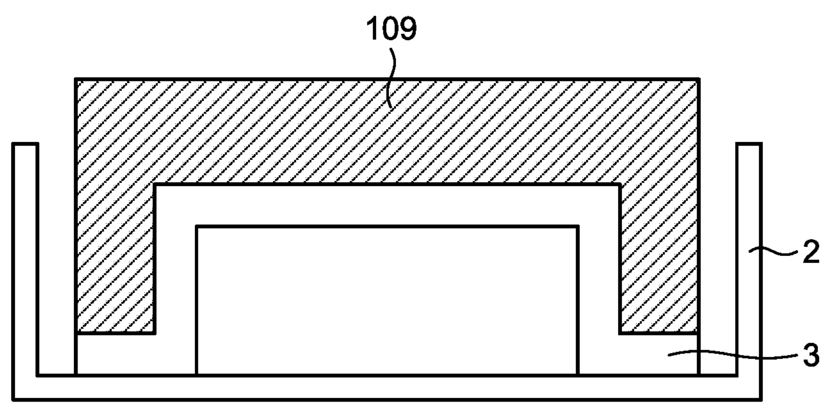
FIG. 11 is a sectional view for illustrating thermal welding of a partition structure to a bottom cover in Example 5 using a joining tool.

The partition structure obtained in Example 5-(3) and the bottom cover obtained in Example 5-(1) were superposed on each other in joined form, a joining tool 109 as shown in FIG. 11 was provided, and the joined bottom cover and partition structure were disposed, and heated and pressurized in a press molding apparatus set so that the joining tool 109 had a surface temperature of 180° C. After 1 minute, the bottom cover 2, the partition structure 3 and the joining tool 109 were taken out from the press molding apparatus, and cooled. After 5 minutes, the joining tool 109 was removed to obtain an integrated product of the bottom cover 2 and the partition structure 3. Thereafter, the top cover 4 was joined using an adhesive in the same manner as in Example 1-(4). The molding conditions and evaluation results in Example 5 are shown in Table 3 below.

Example 6

In the same manner as in Example 5, each member was obtained with a material and a size as described in Table 3. Except for the above, the same procedure as in Example 5 was carried out to obtain an electronic device housing. The molding conditions and evaluation results in Example 6 are shown in Table 3 below.

Example 7

Except that as the bottom cover, a material as described in Table 3 was used, the heating platen temperature was 200° C., and the molding pressure was 10 MPa, the same procedure as in Example 5 was carried out to obtain an electronic device housing. The molding conditions and evaluation results in Example 7 are shown in Table 3 below.

Example 8

Except that as the bottom cover, a material as described in Table 3 was used, the heating platen temperature was 220° C., and the molding pressure was 10 MPa, the same procedure as in Example 5 was carried out to obtain an electronic device housing. The molding conditions and evaluation results in Example 8 are shown in Table 3 below.

Example 9

Except that as the partition structure, a material as described in Table 4 was used, the same procedure as in Example 5 was carried out to obtain an electronic device housing. The molding conditions and evaluation results in Example 9 are shown in Table 4 below.

Example 10

Examples 10-(1) and 10-(2): Preparation of Bottom Cover and Top Cover

Each member was obtained in the same manner as in Examples 5-(1) and 5-(2).

Example 10-(3): Preparation of Partition Structure

Except that a mold corresponding to only a flat portion of a partition structure was used, the same procedure as in Example 5-(3) was carried out to obtain a flat portion of a partition structure. The flat portion of the resulting partition structure was then inserted into an injection mold, and using a molding machine, a glass fiber-reinforced resin (CM1011G-30 manufactured by Toray Industries, Inc.) was molded by insert injection molding at a cylinder temperature of 260° C. and a mold temperature of 80° C. to form a rising wall member of a partition structure, thereby obtaining a partition structure.

Example 10-(4): Preparation of Housing

Except that each member obtained in Examples 10-(1) and 10-(3) was used, the same procedure as in Example 5-(4) was carried out to obtain an integrated product of a bottom cover 2 and a partition member 3. Similarly, the top cover obtained in Example 5-(2) was thermally welded and joined to the bottom cover. The molding conditions and evaluation results in Example 10 are shown in Table 4 below.

Reference Example 1

Except that a size as described in Table 4 was employed, the same procedure as in Example 5 was carried out to obtain a bottom cover and a partition structure. Electronic components were disposed in a hollow structure S1 formed by the bottom cover and the partition structure, and a joining portion was joined by an ultrasonic welding machine. In addition, as a top cover, a liquid crystal display was provided, and joined to a bottom member by a double-sided tape. The molding conditions and evaluation results in the electronic device obtained in Reference Example 1 are shown in Table 4 below.

Comparative Example 1

Except that a partition structure was not used, the same procedure as in Example 1 was carried out to obtain an electronic device housing. The molding conditions and evaluation results in Comparative Example 1 are shown in Table 5 below.

Comparative Example 2

Except that a laminate obtained by laminating material 1 and material 2 was used as a material of a bottom cover, the same procedure as in Example 1 was carried out to obtain an electronic device housing. The molding conditions and evaluation results in Comparative Example 2 are shown in Table 5 below.

Comparative Example 3

Except that an opening was not provided, and material 3 was used as a material of each of a bottom cover and a top cover, the same procedure as in Example 1 was carried out to obtain an electronic device housing. The molding conditions and evaluation results in Comparative Example 3 are shown in Table 5 below.

[Evaluation]

In any of examples, favorable thermal characteristics were obtained by providing the opening. This is influenced by a distance between the heat generation member placed on the partition structure and the bottom cover. That is, it is suggested that the risk of a low temperature burn or the like is reduced in the bottom cover supposed to be touched by a human body. In particular, favorable results were obtained in Examples 1 and 4 to 10 and Reference Example 1. Further, the electronic device housings obtained in examples were confirmed to exhibit high torsional rigidity. Among them, the electronic device housing of Example 1 exhibited very high torsional rigidity, and was also capable of mounting many electronic components etc. in a hollow structure because the ratio of the hollow structure was high. Examples 5 to 10 are preferable from the viewpoint of repair and recycling because the top cover and the partition structure are joined to each other by thermal welding, and therefore the joining portion can be disassembled by heating while high torsional rigidity and deflection rigidity are exhibited. In addition, these examples are preferable from the viewpoint of weight reduction an increase in weight is smaller as compared to a case where an adhesive or a hot melt resin is used.

In Examples 7 and 8, a material having a high thermal conductivity was used for the bottom cover, and therefore heat generated in the housing was quickly transmitted to the whole of the bottom cover, so that local high-temperature portions were not generated. In addition, these examples are preferable because high dynamic properties are also obtained, and therefore not only high torsional rigidity but also deflection rigidity is exhibited. In addition, Reference Example 1 was provided as a method for using an electronic device housing, where electronic components were disposed in a hollow structure to prepare an electronic device with a liquid crystal display used as a top cover. It was confirmed that when the requirements of the present invention were satisfied, it was possible to provide an electronic device exhibiting high torsional rigidity and deflection rigidity in addition to excellent thermal characteristics.

On the other hand, the electronic device housings of Comparative Examples 1 and 2 had poor thermal characteristics, very low resistance to torsion, so that there was the possibility of damaging internal electronic components. In Comparative Example 3, a partition structure was used, but the requirements of the present invention were not satisfied, and it was impossible to exhibit satisfactory torsional rigidity.

TABLE 2

| | | Example 1 | Example 2 | Example 3 | Example 4 |
|---|---|---|---|---|---|
| **Bottom cover:** | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | $cm^2$ | 630 | 630 | 630 | 630 |
| Volume | $cm^3$ | 572 | 572 | 572 | 572 |
| **Top cover:** | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| **Partition structure:** | | | | | |
| Material | — | Material 2 | Material 2 | Material 2 | Material 2 |
| Length | mm | 200 | 206 | 200 | 206 |
| Width | mm | 290 | 296 | 290 | 296 |
| Height | mm | 8 | 3 | 3 | 8 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | $cm^2$ | 48 | 49 | 48 | 49 |
| Projected area | $cm^2$ | 580 | 610 | 580 | 610 |
| Volume | $cm^3$ | 412 | 132 | 126 | 433 |
| Opening member | Present/absent | Present | Present | Present | Present |

TABLE 2-continued

| | | Example 1 | Example 2 | Example 3 | Example 4 |
|---|---|---|---|---|---|
| **Electronic device housing** | | | | | |
| Projected area ratio | % | 92.1 | 96.8 | 92.1 | 96.8 |
| Volume ratio | % | 72.0 | 23.1 | 22.0 | 75.7 |
| Integration method | — | Adhesive | Adhesive | Adhesive | Adhesive |
| Bonding portion | — | Plane | Plane | Plane | Plane |
| Peeling load (23° C.) | $N/cm^2$ | 1500 | 1500 | 1500 | 1500 |
| Peeling load (200° C.) | $N/cm^2$ | 700 | 700 | 700 | 700 |
| **Evaluation** | | | | | |
| Torsional rigidity | — | ⊙ | ○ | ○ | ⊙ |
| Deflection rigidity | — | ○ | ○ | ○ | ○ |
| Thermal characteristics | — | ○ | Δ | Δ | ○ |

TABLE 3

| | | Example 5 | Example 6 | Example 7 | Example 8 |
|---|---|---|---|---|---|
| **Bottom cover:** | | | | | |
| Material | — | Material 1 | Material 1 | Material 4 | Material 3 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.6 |
| Projected area | $cm^2$ | 630 | 630 | 630 | 630 |
| Volume | $cm^3$ | 572 | 572 | 572 | 586 |
| **Top cover:** | | | | | |
| Material | — | Material 1 | Material 1 | Material 1 | Material 1 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| **Partition structure:** | | | | | |
| Material | — | Material 2 | Material 2 | Material 2 | Material 2 |
| Length | mm | 200 | 206 | 200 | 200 |
| Width | mm | 290 | 296 | 290 | 290 |
| Height | mm | 8 | 8 | 8 | 8 |
| Angle | ° | 90 | 90 | 90 | 90 |
| Thickness | mm | 0.8 | 0.8 | 0.8 | 0.8 |
| Overlap width | mm | 5 | 5 | 5 | 5 |
| Bonding area | $cm^2$ | 48 | 49 | 48 | 48 |
| Projected area | $cm^2$ | 580 | 610 | 580 | 580 |
| Volume | $cm^3$ | 412 | 433 | 412 | 412 |
| Opening member | Present/absent | Present | Present | Present | Present |
| **Electronic device housing** | | | | | |
| Projected area ratio | % | 92.1 | 96.8 | 92.1 | 92.1 |
| Volume ratio | % | 72.0 | 75.7 | 72.0 | 70.2 |
| Integration method | — | Thermal welding | Thermal welding | Thermal welding | Thermal welding |
| Bonding portion | — | Plane | Plane | Plane | Plane |
| Peeling load (23° C.) | $N/cm^2$ | 2500 | 2500 | 2500 | 2500 |
| Peeling load (200° C.) | $N/cm^2$ | 50 | 50 | 50 | 50 |

TABLE 3-continued

| | | Example 5 | Example 6 | Example 7 | Example 8 |
|---|---|---|---|---|---|
| Evaluation | | | | | |
| Torsional rigidity | — | ⊙ | ⊙ | ○ | ⊙ |
| Deflection rigidity | — | ○ | ○ | ○ | ○ |
| Thermal characteristics | — | ○ | ○ | ○ | ○ |

TABLE 4

| | | Example 9 | Example 10 | Reference Example 1 |
|---|---|---|---|---|
| Bottom cover: | | | | |
| Material | — | Material 1 | Material 1 | Material 1 |
| Length | mm | 210 | 210 | 180 |
| Width | mm | 300 | 300 | 230 |
| Height | mm | 10 | 10 | 7 |
| Thickness | mm | 0.8 | 0.8 | 0.8 |
| Projected area | $cm^2$ | 630 | 630 | 414 |
| Volume | $cm^3$ | 572 | 572 | 253 |
| Top cover: | | | | |
| Material | — | Material 1 | Material 1 | Display |
| Length | mm | 210 | 210 | 210 |
| Width | mm | 300 | 300 | 300 |
| Height | mm | — | — | — |
| Thickness | mm | 0.8 | 0.8 | 0.8 |
| Projected area | $cm^2$ | 630 | 630 | 630 |
| Volume | $cm^3$ | — | — | — |
| Partition structure: | | | | |
| Material | — | Material 1 | Material 2/GF-reinforced resin | Material 2 |
| Length | mm | 200 | 200 | 162 |
| Width | mm | 290 | 290 | 215 |
| Height | mm | 8 | 8 | 5 |
| Angle | ° | 90 | 90 | 90 |
| Thickness | mm | 0.8 | 0.8 | 0.5 |
| Overlap width | mm | 5 | 5 | 5 |
| Bonding area | $cm^2$ | 48 | 48 | 37 |
| Projected area | $cm^2$ | 580 | 580 | 348 |
| Volume | $cm^3$ | 412 | 412 | 155 |
| Opening member | Present/absent | Present | Present | Present |
| Electronic device housing | | | | |
| Projected area ratio | % | 92.1 | 92.1 | 84.1 |
| Volume ratio | % | 72.0 | 72.0 | 61.4 |
| Integration method | — | Thermal welding | Thermal welding | Thermal welding |
| Bonding portion | — | Plane | Plane | Plane |
| Peeling load (23° C.) | $N/cm^2$ | 2500 | 2500 | 2500 |
| Peeling load (200° C.) | $N/cm^2$ | 50 | 50 | 50 |
| Evaluation | | | | |
| Torsional rigidity | — | ⊙ | ⊙ | ⊙ |
| Deflection rigidity | — | ○ | ○ | ○ |
| Thermal characteristics | — | ○ | ○ | ○ |

TABLE 5

| | | Comparative Example 1 | Comparative Example 2 | Comparative Example 3 |
|---|---|---|---|---|
| Bottom cover: | | | | |
| Material | — | Material 1 | Material 1/Material 2 | Material 3 |
| Length | mm | 210 | 210 | 210 |
| Width | mm | 300 | 300 | 300 |
| Height | mm | 10 | 10 | 10 |
| Thickness | mm | 0.8 | 1.6 | 0.8 |
| Projected area | $cm^2$ | 630 | 630 | 630 |
| Volume | $cm^3$ | 572 | 516 | 572 |
| Top cover: | | | | |
| Material | — | Material 1 | Material 1 | Material 3 |
| Length | mm | 210 | 210 | 210 |
| Width | mm | 300 | 300 | 300 |
| Height | mm | — | — | — |
| Thickness | mm | 0.8 | 0.8 | 0.8 |
| Projected area | $cm^2$ | 630 | 630 | 630 |
| Volume | $cm^3$ | — | — | — |
| Partition structure: | | | | |
| Material | — | — | — | Material 2 |
| Length | mm | — | — | 100 |
| Width | mm | — | — | 200 |
| Height | mm | — | — | 2 |
| Angle | ° | — | — | 90 |
| Thickness | mm | — | — | 1 |
| Overlap width | mm | — | — | 5 |
| Bonding area | $cm^2$ | — | — | 29 |
| Projected area | $cm^2$ | — | — | 200 |
| Volume | $cm^3$ | — | — | 19 |
| Opening member | Present/absent | Absent | Absent | Absent |
| Electronic device housing | | | | |
| Projected area ratio | % | 0.0 | 0.0 | 31.7 |
| Volume ratio | % | 0.0 | 0.0 | 3.4 |
| Integration method | — | — | — | Adhesive |
| Bonding portion | — | — | — | Plane |
| Peeling load (23° C.) | $N/cm^2$ | — | — | 1500 |
| Peeling load (200° C.) | $N/cm^2$ | — | — | 700 |
| Evaluation | | | | |
| Torsional rigidity | — | X | X | X |
| Deflection rigidity | — | X | ○ | X |
| Thermal characteristics | — | X | X | X |

Second Embodiment

An electronic device housing according to a second embodiment of the present invention will now be described.

Figure 12:
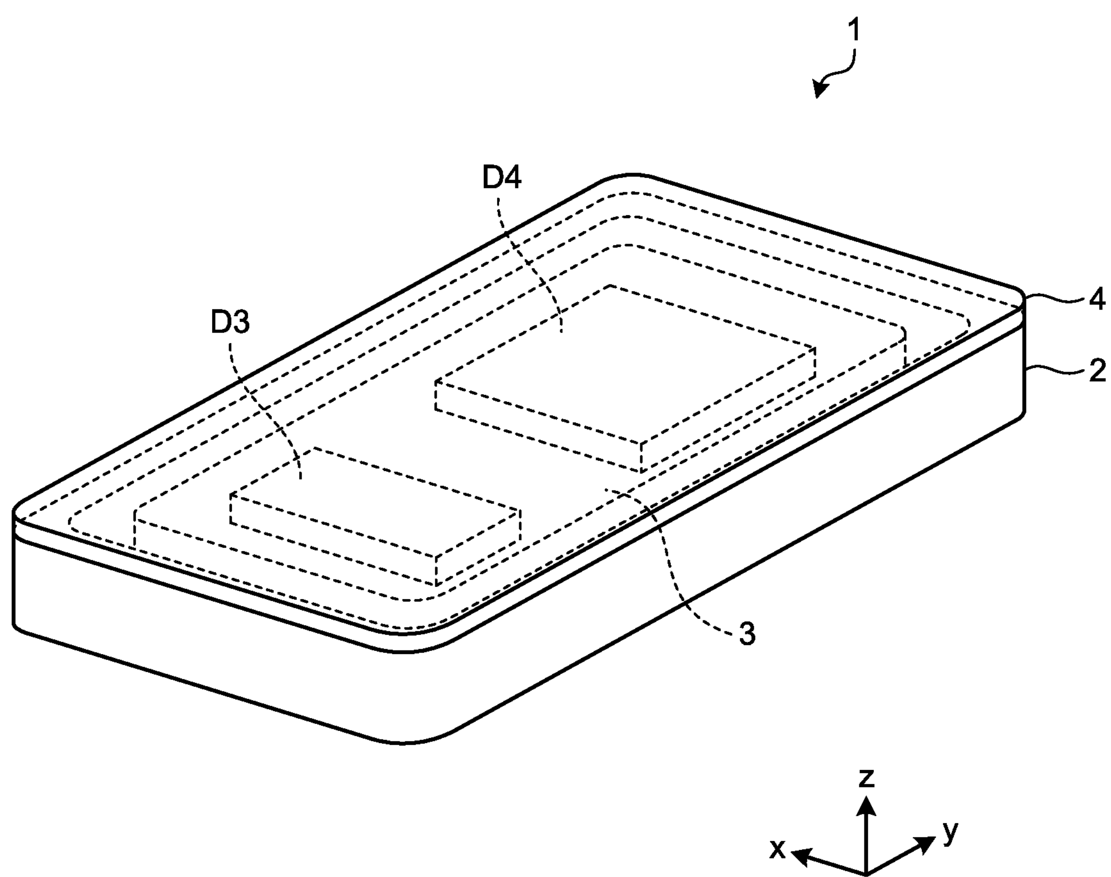
FIG. 12 is a perspective view showing a configuration of an electronic device housing according to a second embodiment of the present invention.

FIG. 12 is a perspective view showing a configuration of the electronic device housing according to the second embodiment of the present invention. As shown in FIG. 12, an electronic device housing 1 according to the second embodiment of the present invention includes, as main components, a bottom cover 2 rectangular in plan view, a partition structure 3 joined to the bottom cover 2, and a top cover 4 rectangular in plan view. In the present embodiment, the bottom cover 2 and top cover 4 and the partition structure 3 are functionally separated, and shaped in accordance with a purpose. In the following description, a direction parallel to short sides of the bottom cover 2 and the top cover 4 is defined as an x direction, a direction parallel to long sides of the bottom cover 2 and the top cover 4 is defined as a y direction, and a direction perpendicular to the x direction and the y direction is defined as a z direction (vertical direction).

Figure 13:
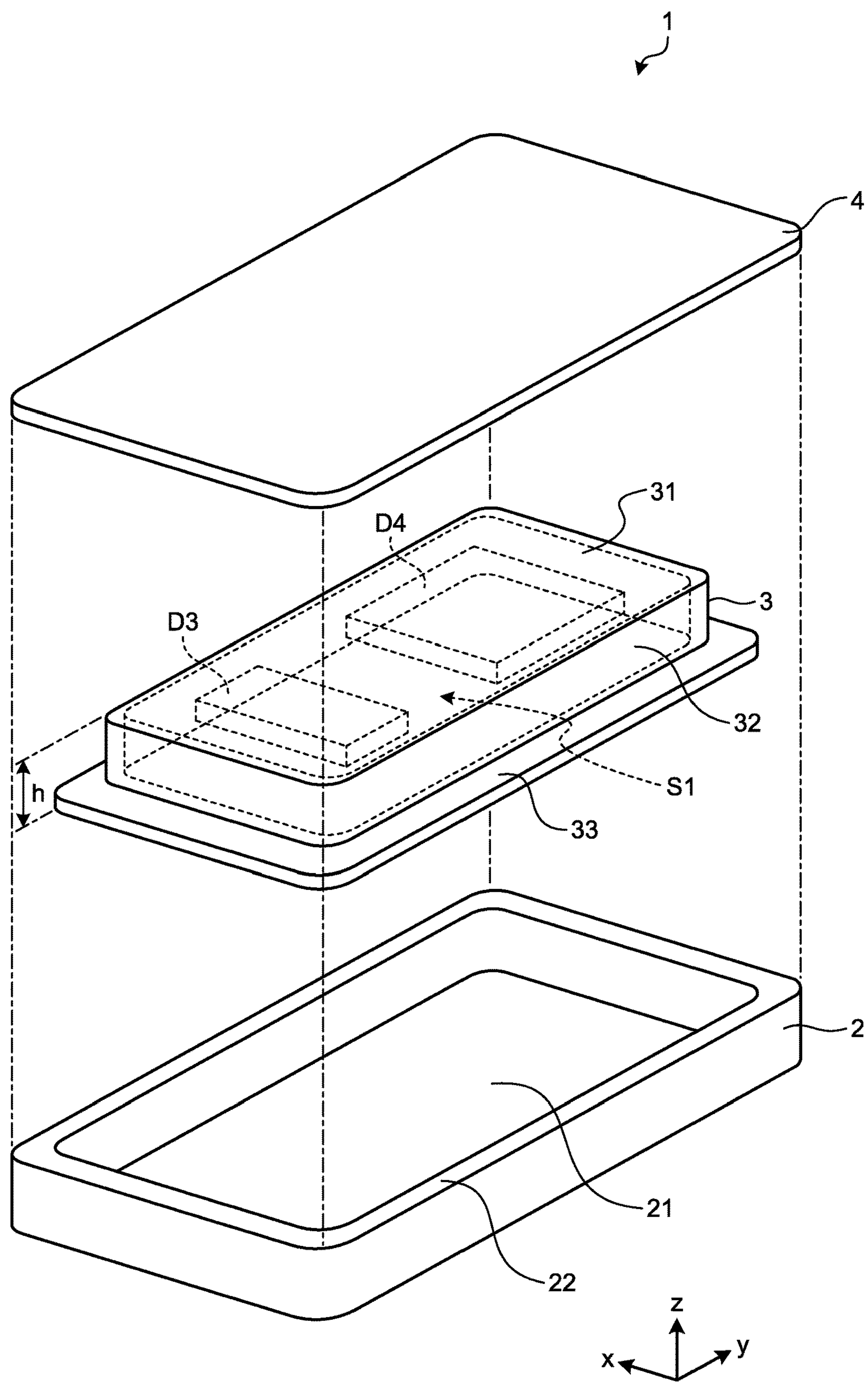
FIG. 13 is an exploded perspective view of the electronic device housing shown in FIG. 12.

FIG. 13 is an exploded perspective view of the electronic device housing 1 shown in FIG. 12. As shown in FIG. 13, the bottom cover 2 includes a flat portion 21 parallel to an x-y plane and rectangular in plan view, and a rising wall member 22 erected in the positive direction of z from an edge member of the flat portion 21. The thickness of a member that forms the bottom cover 2 is preferably within a range of 0.1 mm or more and 0.8 mm or less. In addition, the elastic modulus of the member that forms the bottom cover 2 is preferably within a range of 20 GPa or more and 120 GPa or less. In addition, when the antenna is disposed on the partition structure 3, at least a part of the bottom cover 2 joined to the partition structure 3 includes a material having a volume resistivity of less than $1.0\times10^{-2}$ Ω·m, and when the antenna is disposed on the bottom cover 2 or the top cover 4 which is joined to the partition structure 3, the bottom cover 2 or the top cover 4 which is joined to the partition structure 3 includes a material having a volume resistivity of $1.0\times10^{-2}$ Ω·m or more.

In addition, it is preferable that the bottom cover 2 is formed of any one of a metal material and a fiber-reinforced composite material, and the bottom cover 2 may be formed by combining these materials. From the viewpoint of exhibiting high torsional rigidity, the bottom cover 2 is preferably a seamless member formed of the same material. From the viewpoint of productivity, the flat portion 21 having a simple shape may be formed using the metal material and the fiber-reinforced composite material which have high dynamic properties, and the rising wall member 22 and a joining portion which have a complicated shape may be formed by injection molding etc. using a resin material excellent in moldability.

It is preferable to use a light metal material such as an aluminum alloy, a magnesium alloy or a titanium alloy as the metal material. Examples of the aluminum alloy may include A2017 and A2024 as Al—Cu systems, A3003 and A3004 as Al—Mn systems, A4032 as an Al—Si system, A5005, A5052 and A5083 as Al—Mg systems, A6061 and A6063 as Al—Mg—Si systems, and A7075 as an Al—Zn system. Examples of magnesium alloy may include AZ31, AZ61 and AZ91 as Mg—Al—Zn systems. Examples of the titanium alloy may include alloys containing palladium of grades 11 to 23, alloys containing cobalt and palladium, and Ti-6Al-4V corresponding to grade 50 (a alloy), grade 60 (α-β alloy) and grade 80 (β alloy).

As reinforcing fibers to be used in the fiber-reinforced composite material, fibers such as carbon fibers, glass fibers, aramid fibers, boron fibers, PBO fibers, high strength polyethylene fibers, alumina fibers and silicon carbide fibers can be used, and two or more of these fibers may be mixed, and used. These reinforcing fibers can be used as fiber structures such as long fibers aligned in one direction, single tows, woven fabrics, knits, nonwoven fabrics, mats and braided cords.

Examples of the matrix resin that can be used include thermosetting resins such as epoxy resins, phenol resins, benzoxazine resins and unsaturated polyester resins, polyester-based resins such as polyethylene terephthalate (PET), polybutylene terephthalate (PBT), polytrimethylene terephthalate (PTT), polyethylene naphthalate and liquid crystal polyester, polyolefins such as polyethylene (PE), polypropylene (PP) and polybutylene, styrene-based resins, urethane resins, and thermosetting resins such as polyoxymethylene (POM), polyamide (PA), polycarbonate (PC), polymethyl methacrylate (PMMA), polyvinyl chloride (PVC), polyphenylene sulfide (PPS), polyphenylene ether (PPE), modified PPE, polyimide (PI), polyamideimide (PAI), polyether imide (PEI), polysulfone (PSU), modified PSU, polyether sulfone (PES), polyketone (PK), polyether ketone (PEK), polyether ether ketone (PEEK), polyether ketone ketone (PEKK), polyarylate (PAR), polyether nitrile (PEN), phenol-based resins, and phenoxy resins. From the viewpoint of productivity and dynamic characteristics, thermosetting resins are preferably used, and among them, epoxy resins are preferably used. From the viewpoint of moldability, thermoplastic resins are preferably used. Among them, polyamide resins are preferably used from the viewpoint of strength, polycarbonate resins are preferably used from the viewpoint of impact resistance, polypropylene resins are preferably used from the viewpoint of lightness, and polyphenylene sulfide resins are preferably used from the viewpoint of heat resistance. The resin may be used not only as a matrix resin of the fiber-reinforced composite material but also as the bottom cover, the top cover or the partition structure which is composed of a resin itself.

In the present invention, it is preferable that a prepreg including the reinforcing fiber and matrix resin is used as a material of each member from the viewpoint of handling characteristics in lamination etc. From the viewpoints of high dynamic characteristics and design freedom, it is preferable to use unidirectional continuous fiber prepreg, and from the viewpoint of isotropic dynamic characteristics and moldability, it is preferable to use a fabric prepreg. In addition, the member may be composed of a laminate of these prepregs.

The partition structure 3 includes a flat portion 31 parallel to an x-y plane and rectangular in plan view, a rising wall member 32 erected in the negative direction of z from an edge member of the flat portion 31, and a joining portion 33 extending in an outward direction parallel to an x-y plane from the edge member of the rising wall member 32. The partition structure 3 is joined to the bottom cover 2 with a hollow structure S1 formed between the flat portion 31 and the flat portion 21 of the bottom cover 2 by joining the joining portion 33 to the flat portion 21 of the bottom cover 2. Use of the partition structure 3 having the joining portion 33 is one factor of further improving torsional rigidity in the present invention, and it is preferable that the joining portion 33, the bottom cover 2 and the top cover 4 are joined together. In addition, it is preferable that an electronic component is packed in the hollow structure S1, and it is preferable that an electronic component is disposed on the partition structure 3 because the distance from the bottom cover 2 or top cover 4 joined to the partition structure 3 can be increased. In addition, when the antenna is disposed on the partition structure 3, it is preferable that the partition structure 3 is joined to a portion of the bottom cover 2 or the top cover 4 joined to the partition structure 3, which includes a material having a volume resistivity of less than $1.0\times10^{-2}$ Ω·m, and when the antenna is disposed on the bottom cover 2 or the top cover 4 which is joined to the partition structure 3, it is preferable that the partition structure 3 is joined to a portion of the bottom cover 2 or the top cover 4 joined to the partition structure 3, which includes a material having a volume resistivity of $1.0\times10^{-2}$ Ω·m or more.

The area of the joining portion 33 in a plane parallel to the x-y plane is within a range of 10 $cm^2$ or more and 100 $cm^2$ or less. Specifically, when the area of the joining portion 33 is less than 10 $cm^2$, there arises the problem if a load that causes large deformation is applied to the electronic device housing 1, the partition structure 3 is peeled from the bottom cover 2, and thus original torsional rigidity cannot be exhibited. When the area of the joining portion 33 is larger than 100 $cm^2$, there arises the problem that the increase in area of the joining portion 33 causes an increase in weight of the electronic device housing 1 and a decrease in volume of the hollow structure S1. Thus, the area of the joining portion 33 is within a range of 10 $cm^2$ or more and 100 $cm^2$ or less.

The maximum value of a distance h between the flat portion 31 of the partition structure 3 and the flat portion 21 of the bottom cover 2 (height of the partition structure 3 from the flat portion 21) is within a range of 3 mm or more and 30 mm or less. In the present invention, the height h of the partition structure 3 is one factor of exhibiting torsional rigidity. Thus, when the maximum value of the height h is less than 3 mm, there arises the problem that the effect of the rising wall member 32 is low in the electronic device housing 1, so that original torsional rigidity cannot be exhibited. On the other hand, when the maximum value of the height h is larger than 30 mm, there arises the problem that it is necessary to increase the thickness of the rising wall member 32, resulting in an increase in weight of the electronic device housing 1. Thus, the maximum value of the height h is within a range of 3 mm or more and 30 mm or less.

Figure 14:
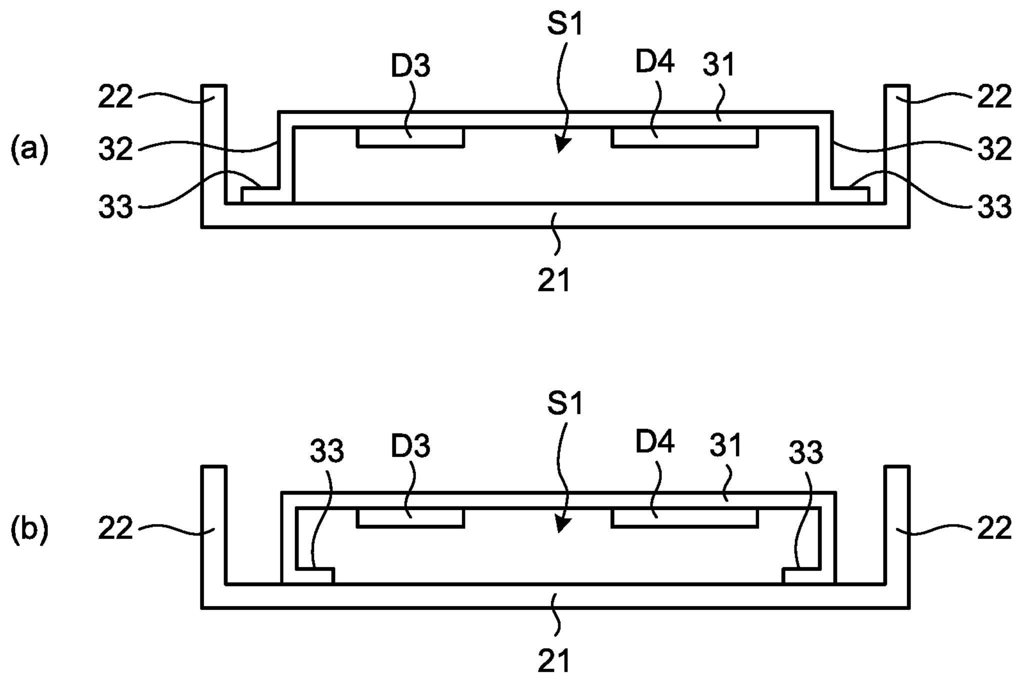
FIGS. 14(*a*) and 14(*b*) are sectional views showing one example of a configuration of the partition structure shown in FIG. 13.
Figure 15:
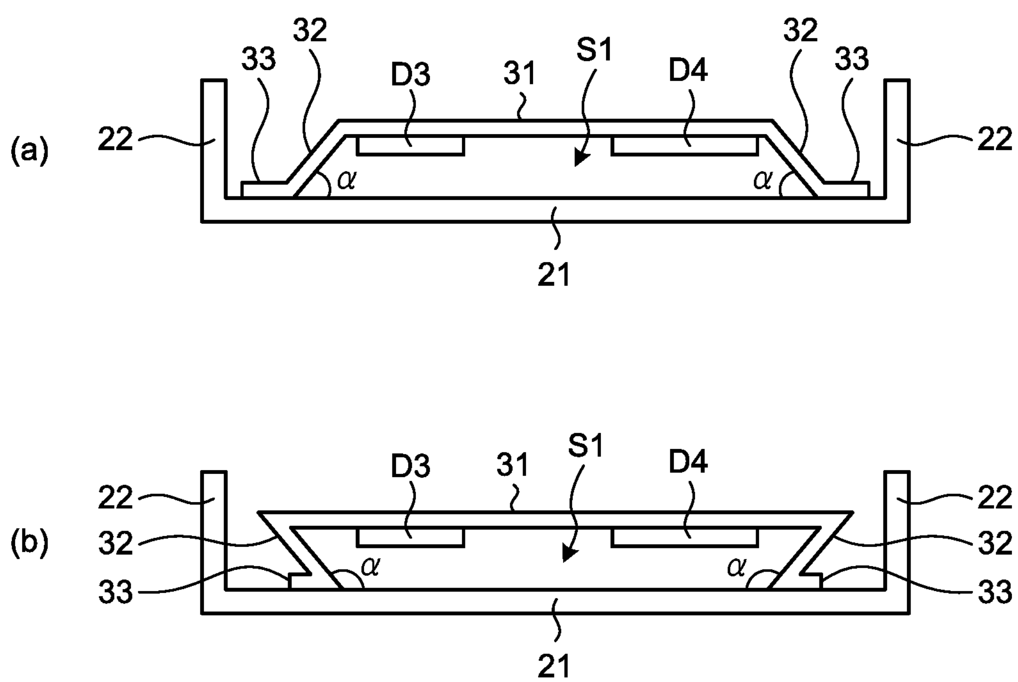
FIGS. 15(*a*) and 15(*b*) are sectional views showing one example of a configuration of the partition structure shown in FIG. 13.

FIGS. 14 and 15 are sectional views showing one example of a configuration of the partition structure 3 shown in FIG. 13. In the present embodiment, the joining portion 33 is provided so as to extend in an outward direction parallel to the x-y plane from the edge member of the rising wall member 32 as shown in FIG. 14(*a*), but the joining portion 33 may be provided so as to extend in an inward direction parallel to the x-y plane from the peripheral portion of the rising wall member 32 as shown in FIG. 14(*b*). In addition, it is preferable that the angle α of the rising wall member 32 with respect to the flat portion 21 of the bottom cover 2 (or the joining portion 33 of the partition structure 3) is within a range of 45° or more and 135° or less as shown in FIGS. 15(*a*) and 15(*b*). FIG. 15(*a*) shows a state in which the angle α of the rising wall member 32 is an acute angle, and FIG. 15(*b*) shows a state in which the angle α of the rising wall member 32 is an obtuse angle.

Figure 16:
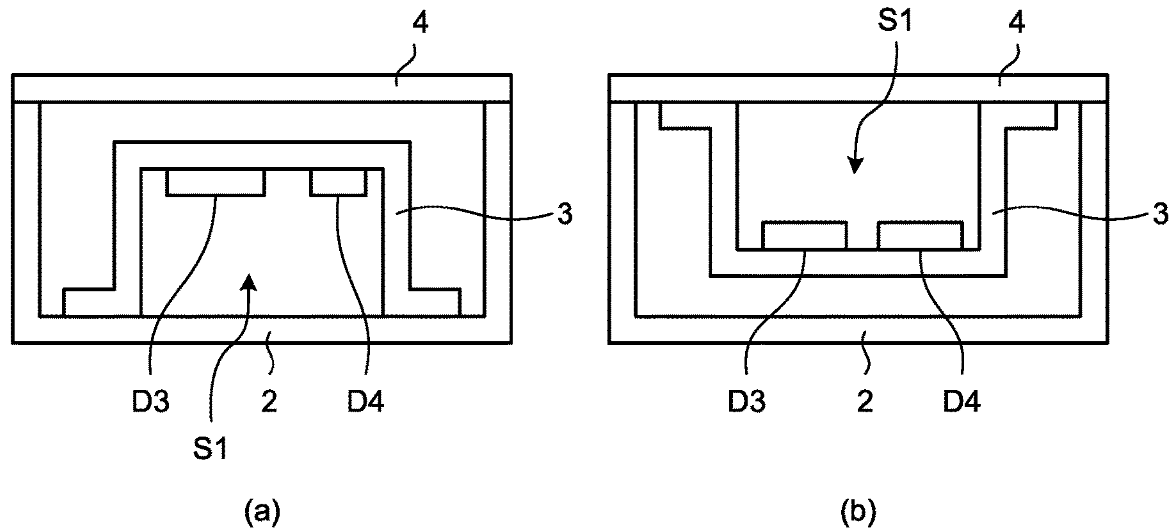
FIGS. 16(*a*) and 16(*b*) are sectional views showing a configuration of an electronic device housing.

FIGS. 16(*a*) and 16(*b*) are sectional views showing a configuration of an electronic device housing. As shown in FIGS. 16(*a*) and 16(*b*), an antenna D3 and an electronic component D4 other than the antenna D3 are disposed in the hollow structure S1 formed by joining the partition structure 3 and the bottom cover 2 or the top cover 4. In this specification, the antenna means an antenna module, which includes a transmission portion for transmitting a radio wave, a reception portion for receiving a radio wave, an IC chip for controlling operations of the antenna, a circuit board on which these components are mounted, a grounding portion, and so on.

When the antenna D3 is disposed on the partition structure 3, the shortest distance between the antenna D3 and the portion of the bottom cover 2 or the top cover 4 joined to the partition structure 3, which includes a material having a volume resistivity of less than $1.0\times10^{-2}$ Ω·m is preferably 3 mm or more, and when the antenna D3 is disposed on the bottom cover 2 or the top cover 4 which is joined to the partition structure 3, the shortest distance between the antenna D3 and the portion of the partition structure 3, which includes a material having a volume resistivity of less than $1.0\times10^{-2}$ Ω·m is preferably 3 mm or more. In addition, it is preferable that the antenna D3 is disposed within a range of 50% or more and 95% or less of the height of a space divided by the bottom cover 2 and the top cover 4 where the position of the inner surface of the bottom cover 2 is a reference position. Further, the shortest distance between the antenna D3 and the other electronic component D4 is preferably 3 mm or more. In addition, when the antenna is disposed on the partition structure 3, the shortest distance between at least the transmission portion and the reception portion that form the antenna D3 and the portion of the bottom cover 2 or the top cover 4 joined to the partition structure 3, which includes a material having a volume resistivity of less than $1.0\times10^{-2}$ Ω·m may be 3 mm or more, and when the antenna D3 is disposed on the bottom cover 2 or the top cover 4 which is joined to the partition structure 3, the shortest distance between at least the transmission portion and the reception portion that form the antenna D3 and the portion of the partition structure 3, which includes a material having a volume resistivity of less than $1.0\times10^{-2}$ Ω·m may be 3 mm or more.

In the present invention, it is preferable that another partition structure is provided in the hollow structure S1 formed between the partition structure 3 and the bottom cover 2 or the top cover 4 to which the partition structure 3 is joined. Another partition structure provided in the hollow structure S1 may be joined to only the bottom cover 2 or the top cover 4, or may be joined to only the partition structure 3. Preferably, another partition structure is joined to the inner surface of the partition structure 3, and also joined to the bottom cover 2 or the top cover 4 to which the partition structure 3 is joined. Here, the inner surface of the partition structure 3 means a surface inside the hollow structure S1 in the partition structure 3.

Figure 17:
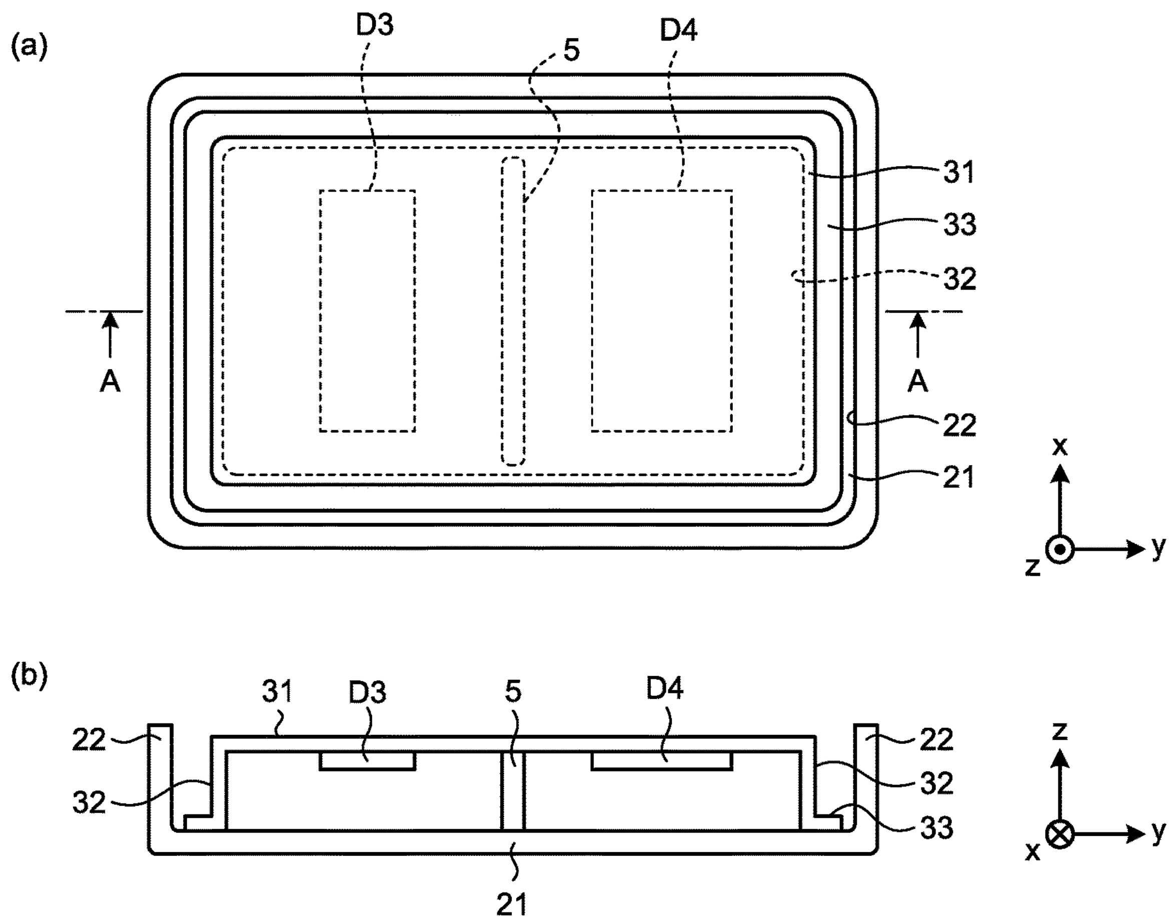
FIGS. 17(*a*) and 17(*b*) show a plan view and a sectional view showing a configuration of another partition structure.

Deflection rigidity may also be increased by disposing another partition structure in the hollow structure S1 formed between the flat portion 31 of the partition structure 3 and the flat portion 21 of the bottom cover 2 in such a manner that the inner surface of the partition structure 3 is joined to the bottom cover 2 or the top cover 4 to which the partition structure 3 is joined. FIG. 17(*a*) is a plan view showing a configuration of another partition structure, and FIG. 17(*b*) is a sectional view taken along line A-A in FIG. 17(*a*). As shown in FIGS. 17(*a*) and 17 (*b*), the other partition structure 5 is a member disposed so as to extend in the x direction at the central part of the hollow structure S1 in the y direction, and is connected to the flat portion 21 of the bottom cover 2 and the flat portion 31 of the partition structure 3. By integrating the flat portion 21 of the bottom cover 2 and the flat portion 31 of the partition structure 3 with the other partition structure 5 interposed therebetween, the bottom cover 2 and the partition structure 3 are deformed in synchronization with each other if a load is applied, and therefore the deflection rigidity of the electronic device housing 1 can be improved. In addition, the rising wall member 22 of the bottom cover 2 and the rising wall member 32 of the partition structure 3 are integrated with the other partition structure 5, and thus the rising wall members 22 and 32 of the bottom cover 2 and the partition structure 3 are hardly deformed particularly inside direction of the electronic device housing 1, so that the torsional rigidity of the electronic device housing 1 can be improved.

As long as the other partition structure 5 is connected to the flat portion 21 of the bottom cover 2 and the flat portion 31 of the partition structure 3, another reinforcing structure 5 may be a member disposed so as to extend in the y direction at the central part of the hollow structure S1 in the x direction, or a member disposed so as to extend in the diagonal direction of the hollow structure S1. In particular, it is preferable that the other partition structure 5 is disposed so as to pass through a position at which the amount of deflection of the flat portion 21 of the bottom cover 2 increases when a load is applied in the thickness direction, and a plurality of members may be disposed with the members crossing one another. In addition, it is preferable that the other partition structure 5 is formed of an impact absorbing material excellent in elasticity, such as a resin material having an elastomer or rubber component, or a gel, and accordingly, not only deflection rigidity but also an effect against impact can be exhibited.

Figure 18:
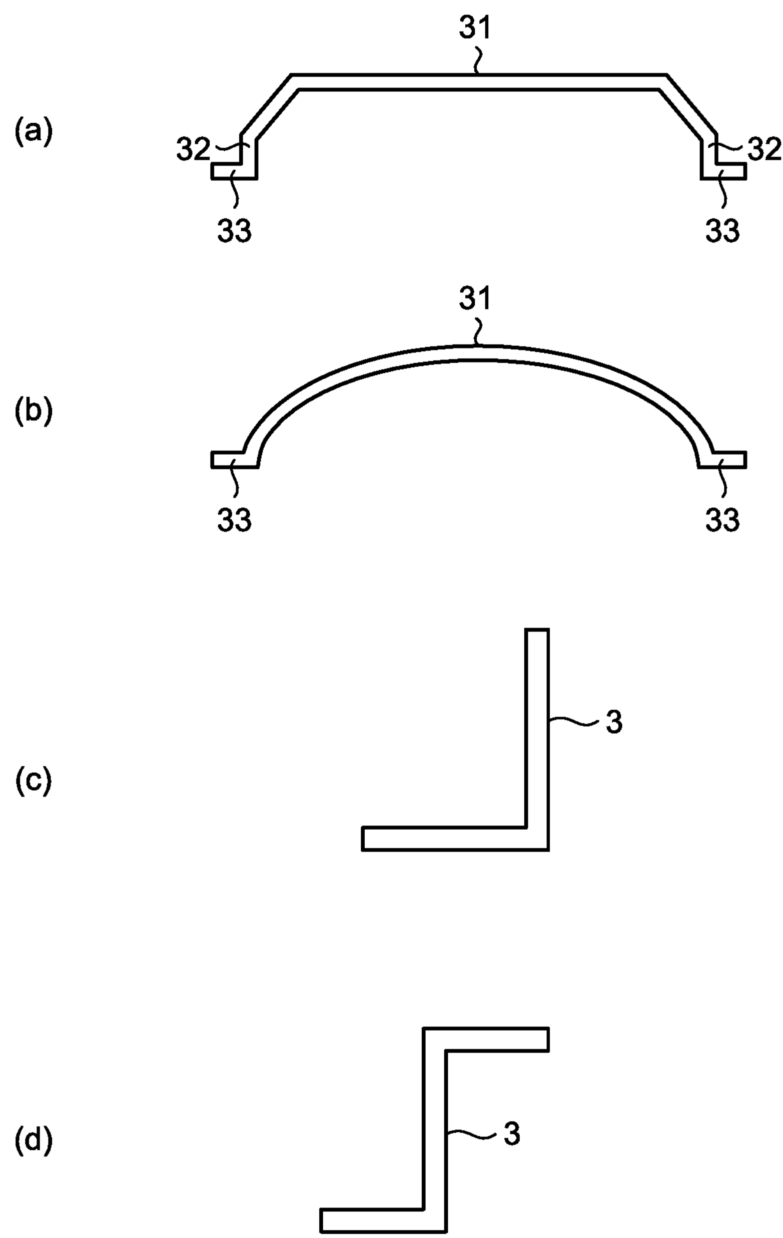
FIGS. 18(*a*) to 18(*d*) are sectional views showing a configuration of the partition structure in the electronic device housing according to the second embodiment of the present invention.

In the present embodiment, the partition structure 3 includes the flat portion 31, the rising wall member 32 and the joining portion 33 as shown in FIG. 18(*a*), but the partition structure 3 may be formed by using a curved member as the flat portion 31 and forming the joining portion 33 on an edge member of the curved member as shown in FIG. 18(*b*). That is, a curved member may be used as the flat portion 31, resulting in omission of the rising wall member 32. In addition, the partition structure 3 may have an L shape as shown in FIG. 18(*c*) or an S shape as shown in FIG. 18(*d*). In addition, from the viewpoint of increasing rigidity and effectively utilizing the space, an irregular shape may be formed on the flat portion 31. In the present embodiment, the partition structure 3 is joined to the bottom cover 2, but the partition structure 3 may be joined to the top cover 4 to form the hollow structure S1 between the flat portion 31 of the partition structure 3 and the top cover 4.

In the present embodiment, the joining portion 33 is formed on all of the four rising wall members 32 formed on respective sides of the flat portion 31, but the joining portion 33 may be formed on at least one of the four rising wall members 32. Alternatively, the joining portion 33 may be formed on two or more adjacent rising wall members 32 among the four rising wall members 32. In addition, the area of the joining portion 33 formed on one rising wall member 32 is preferably 1 $cm^2$ or more. In addition, the thickness of the member that forms the partition structure 3 is preferably within a range of 0.3 mm or more and 1.0 mm or less from the viewpoint of reducing the weight and thickness of the electronic device housing. In addition, the elastic modulus of the member that forms the partition structure 3 is preferably within a range of 20 GPa or more and 120 GPa or less.

In addition, when the antenna D3 is disposed on the partition structure 3, the partition structure 3 includes a material having a volume resistivity of $1.0\times10^{-2}$ Ω·m or more. It is preferable that the partition structure 3 is formed of any one of the above-described metal material and fiber-reinforced composite material, and the material can be selected according to the purpose of the partition structure 3. That is, from the viewpoint of exhibiting a high reinforcing effect, it is preferable to use a metal material or fiber-reinforced composite material having a high elastic modulus, and from the viewpoint of heat dissipation, it is preferable to use a metal material having a high thermal conductivity. Further, when the partition structure 3 is formed of a fiber-reinforced composite material, it is preferable that the partition structure 3 is composed of a laminate of continuous fiber prepregs. In addition, the ratio of the linear expansion coefficient of the partition structure 3 to the linear expansion coefficient of the bottom cover 2 or the top cover 4 to which the partition structure 3 is joined is preferably within a range of 0.1 or more and 10 or less.

In addition, it is preferable that the joining portion 33 of the partition structure 3 is bonded to the flat portion 21 of the bottom cover 2 by thermal welding. The peeling load at 23° C. is more preferably within a range of 100 N/$cm^2$ or more and 5000 N/$cm^2$ or less. Examples of the thermal welding method may include an insert injection method, an outsert injection method, a vibration welding method, an ultrasonic welding method, a laser welding method and a hot plate welding method. Here, it is preferable that the bonding surface between the joining portion 33 and the flat portion 21 has a peeling load of less than 60 N/$cm^2$ at 200° C. in addition, the peeling load at 200° C. is more preferably 30 N/$cm^2$ or less.

In addition, this peeling load is preferably less than 60 N/$cm^2$ at 180° C., and it is preferable from the viewpoint of disassembling adhesive that the peeling load can be easily peeled off in a lower temperature range. However, when the disassembling temperature decreases, the partition structure 3 may be peeled off by temperature elevation associated with operation of an electronic component or depending on a temperature of a use environment in use as an electronic device housing. Therefore, it is preferable that in the temperature range where the electronic device housing is used, the partition structure is joined with high bonding strength, and in the disassembling temperature range, the reinforcing structure can be easily peeled off. Thus, the peeling load at 80° C. is more preferably within a range of 60 N/$cm^2$ or more and 5000 N/$cm^2$ or less.

The peeling load at 200° C. is preferably as low as possible, and most preferably 10 N/$cm^2$ or less. Since the peeling load at 200° C. is preferably as low as possible, the lower limit thereof is not particularly limited, and is preferably 0 N/$cm^2$ or more, but the peeling load at 200° C. is more preferably 1 N/$cm^2$ or more because when it is excessively low, handling characteristics may be deteriorated. With this configuration, disassembling bondability that makes it possible to easily remove the partition structure 3 can be exhibited, so that repair and recycling of an electronic device can be facilitated. In addition, it is preferable that the partition structure 3, and the bottom cover 2 or the top cover 4 to which the partition structure 3 is joined are formed of a fiber-reinforced composite material, a thermoplastic resin is provided in or on a joining portion of at least one of the partition structure 3 and the bottom cover 2 or the top cover 4, and the partition structure 3 and the bottom cover 2 or the top cover 4 are joined with the thermoplastic resin.

As a method for providing a thermoplastic resin on the joining portion, mention is made of a method in which using a fiber-reinforced sheet (prepreg sheet) including a thermoplastic resin as a matrix resin, molding is performed to obtain the partition structure 3, and the bottom cover 2 or the top cover 4 to which the partition structure 3 is joined. A molded product obtained by this method is preferable because a thermoplastic resin is present on a surface of the molded product at a high ratio, and therefore it is possible to secure a wide bonding area in joining, leading to an increase in selection freedom of a joining site. From the viewpoint of the dynamic characteristics of the members, a fiber-reinforced composite material including a thermosetting resin as a matrix resin is preferable, and as a method for providing a thermoplastic resin on such a member, a mention is made of a method in which a molten material obtained by heating and melting a thermoplastic resin or a solution obtained by dissolving a thermoplastic resin in a solvent is applied to provide a thermoplastic resin on the fiber-reinforced composite material. In addition, a mention may be made of, for example, a method in which in molding and curing of a fiber-reinforced sheet (prepreg sheet) including a thermosetting resin as a matrix resin, a laminate in which a film or nonwoven fabric composed of a thermoplastic resin is laminated on a surface is molded under heat and pressure on the outermost layer of the fiber-reinforced sheet (prepreg sheet).

In addition, it is preferable that the partition structure 3 and the bottom cover 2 or the top cover 4 are joined directly. When a fiber-reinforced composite material having a thermoplastic resin is used for the joining portion 33 of the partition structure 3 and/or the joining portion of the bottom cover 2 or the top cover 4 that is bonded to the joining portion 33, it is not necessary to use an adhesive in addition to the members, and the members can be joined directly, so that an increase in weight of the electronic device housing 1 can be suppressed. A suitable method for directly joining the partition structure 3 and the bottom cover 2 or the top cover 4 is a method using a laminate, in which a film or nonwoven fabric composed of a thermoplastic resin is laminated on a surface, for the outermost layer of a fiber-reinforced sheet (prepreg sheet) including a thermosetting resin as a matrix resin, and the thermoplastic resin used here can also be selected from the group of thermoplastic resins exemplified as the matrix resin.

Preferably, a thermoplastic resin is selected which has a melting point lower than the molding temperature at which a fiber-reinforced sheet (prepreg sheet) with the matrix resin composed of a thermosetting resin is molded and cured. The lower limit of the melting point of the thermoplastic resin is not particularly limited, but it is preferably 80° C. or higher, more preferably 100° C. or higher from the viewpoint of exhibiting heat resistance in application of the electronic device housing of the present invention to an electronic device. In addition, the form of the thermoplastic resin is not particularly limited, and examples thereof include forms of films, continuous fibers, woven fabrics, particles, nonwoven fabrics and the like, but from the viewpoint of handling characteristics during molding operation, forms of films and nonwoven fabrics are preferable. By selecting such a resin, the thermoplastic resin is melted during molding, and the thermoplastic resin is formed while spreading like a film over a surface of a molded product, so that the bonding area increases during joining, or the reinforcing fibers of the fiber-reinforced sheet are impregnated with the thermoplastic resin to form a strong thermoplastic resin layer, so that high peeling strength can be exhibited. The thermoplastic resin may be provided on at least one of the partition structure 3 obtained in the above-mentioned method and the bottom cover 2 and the top cover 4 joined to the partition structure 3, but it is preferable that the thermoplastic resin is provided on the joining members of both the members to be joined. In addition, it is preferable that substantially the same thermoplastic resin is selected as thermoplastic resins to be provided.

In this specification, the "disassembling adhesive" means that the partition structure 3 can be not only easily removed, but also re-bonded, and in re-bonding, the thermoplastic resin may be provided, but it is preferable that the reinforcing structure can be re-bonded without increasing the weight of the thermoplastic resin or the like. In addition, the peeling load in re-bonding is preferably 50% or more, more preferably 70% or more, of the original peeling load. The disassembling adhesive in the present invention can be attained by applying to a joining technique such characteristics of a thermoplastic resin that the resin is melted by heating to reduce dynamic characteristics, and the resin is solidified by cooling or at normal temperature to exhibit high dynamic characteristics specific to the resin.

In addition, a hole can be formed in each of the flat portion 31, the rising wall member 32 and the joining portion 33 of the partition structure 3 to the extent that torsional rigidity in the present invention is improved. With such a structure, it is possible to dispose a wiring cable for connecting an electronic component built in the hollow structure S1 to an electronic component disposed in a space (space S3 as described later) other than the hollow structure S1 divided by the bottom cover 2 and the top cover 4, and a display, a keyboard and so on which correspond to the top cover 4. From the viewpoint of heat dissipation, it is preferable that the hole is disposed to so as to improve the flow of air, e.g. the hole is formed on the opposed rising wall member 32. The area of the holes is preferably 30% or less of the surface area of the partition structure 3, and is more desirably 15% or less of the surface area of the reinforcing structure 3 from the viewpoint of torsional rigidity.

The hollow structure S1 may be formed by joining the edge member of the partition structure 3 to the bottom cover 2 or the top cover 4 with the partition structure 3 being formed from a partition structure having an opening. As used herein, "partition structure having an opening" refers to a shape having an opening in a part of the partition structure, and may be a member having the joining portion 33 as described above and shown in FIGS. 18(*a*) and 18(*b*). That is, one example of the partition structure having an opening is a partition structure having a flat portion, a rising wall member erected on the edge member of the flat portion, and a joining portion extending from the edge member of the rising wall member, or having a curved portion, and a joining portion extending from an edge member of the curved.

The top cover 4 is joined to the edge member of the rising wall member 22 of the bottom cover 2. In FIG. 12, the top cover 4 has a smooth plate shape, but may have a plate shape having a curved surface or irregularities. In addition, at least a part of the top cover 4 includes a material having a volume resistivity of less than $1.0\times10^{-2}$ Ω·m. In addition, the top cover 4 may be an electronic component such as a liquid crystal display or a keyboard, and with such a configuration, application to a clamshell-type personal computer or a tablet-type personal computer is possible.

As is evident from the above description, the electronic device housing 1 according to the second aspect of the present invention includes: the bottom cover 2; the top cover 4; the partition structure 3 disposed in a space divided by the bottom cover 2 and the top cover 4; the antenna D3; and the electronic component D4, the partition structure 3 being joined to the bottom cover 2 or the top cover 4. The electronic device housing 1 satisfies the following condition (A) or (B), and the shortest distance between a first material and the antenna D3 is 3 mm or more. Accordingly, there can be provided an electronic device housing having improved torsional rigidity and deflection rigidity while securing antenna performance.

Condition (A): the antenna D3 is disposed on the partition structure 3, and at least a part of the bottom cover 2 or the top cover 4 which is joined to the partition structure 3 includes a first material having a volume resistivity of less than $1.0\times10^{-2}$ Ω·m, and the partition structure 3 includes a second material having a volume resistivity of $1.0\times10^{-2}$ Ω·m or more.

Condition (B): the antenna D3 is disposed on the bottom cover 2 or the top cover 4 to which the partition structure 3 is joined, at least a part of the partition structure 3 includes a first material having a volume resistivity of less than $1.0\times10^{-2}$ Ω·m, and the bottom cover 2 or the top cover 4 to which the partition structure 3 is joined includes a second material having a volume resistivity of $1.0\times10^{-2}$ Ω·m or more.

The projected area S of the partition structure 3 in a direction of the bottom cover 2 or the top cover 4 to which the edge member is joined may be adjusted to fall within a range of 60% or more and 95% or less of the projected area R of the bottom cover 2 or the top cover 4 to which the edge member is joined. In addition, the disposed position of the partition structure 3 is not particularly limited, but it is preferable that the partition structure 3 is positioned equally from the center position of the bottom cover 2 or the top cover 4, and by disposing the partition structure 3 in this manner, torsional rigidity in an x direction or a y direction can be made isotropic. From the viewpoint of effectively utilizing a space S3 excluding the hollow structure S1, in the space divided by the bottom cover 2 and the top cover 4, the partition structure 3 may be placed on any one of the bottom cover 2 and the top cover 4.

Specifically, when the projected area S is less than 60% of the area of the bottom cover 2 or the top cover 4 to which the partition structure 3 is joined, there arises the problem that the rising wall member 32 that is one factor of exhibiting torsional rigidity in the present invention is formed at a position close to the center position of the bottom cover 2 or the top cover 4, so that original torsional rigidity cannot be exhibited. On the other hand, when the projected area S is more than 95% of the area of the bottom cover 2 or the top cover 4 to which the partition structure 3 is joined, high torsional rigidity can be exhibited, but there arises the problem that the space S3 becomes small, and therefore it is difficult to dispose electronic components and wiring and the like for forming an electronic device, so that application as an electronic device housing is difficult. Thus, the projected area S of the partition structure 3 in a direction of the bottom cover 2 or the top cover 4 to which the edge member is joined may be within a range of 60% or more and 95% or less of the area R of the bottom cover 2 or the top cover 4 to which the edge member is joined.

In the present invention, the projected area of the partition structure 3 in a direction of the bottom cover 2 or the top cover 4 to which the joining portion 33 is joined is preferably within a range of 60% or more and 95% or less of the area of the bottom cover 2 or the top cover 4 to which the joining portion 33 is joined, and therefore, in the present invention, rather than an aspect in which the partition structure 3 and the bottom cover 2 or the top cover 4 are joined to each other at a lateral surface, an aspect in which the joining portion of the partition structure 3 is joined to the flat portion of the bottom cover 2 or the top cover 4 as long as, for example, the partition structure 3 has the flat portion, the rising wall member erected on the edge member of the flat portion, and the joining portion extending from the edge member of the rising wall member, and the bottom cover 2 or the top cover 4 joined to the partition structure 3 has a flat portion.

Here, the shape of the projected surface of the partition structure 3, i.e. the shape of the flat portion 31 is not particularly limited, and may be not only a rectangular shape, but also a circular shape or a polygonal shape, and from the viewpoint of exhibiting high deflection rigidity, a shape conforming to the shape of the bottom cover 2 and/or the top cover 4 is preferable. Specifically, in the example shown in FIG. 12, the shape of the projected surface of the partition structure 3 is preferably a rectangular shape. In addition, from the viewpoint of effectively utilizing the hollow structure S1 and the space S3 excluding the hollow structure S1, the shape of the projected surface of the partition structure 3 is preferably a shape conforming to the shape of an electronic component to be packed. In addition, from the viewpoint of exhibiting isotropic rigidity against any load, the shape of the projected surface of the partition structure 3 is preferably a shape that is symmetric with respect to an axis in the x direction and/or the y direction.

In addition, the volume of the hollow structure S1 formed by the partition structure 3 in the bottom cover 2 is preferably within a range of 55% or more and 95% or less of the volume of the space S2 divided by the bottom cover 2 and the top cover 4. Specifically, when the volume of the hollow structure S1 is less than 55% of the volume of the space S2, there arises the problem that the height of the rising wall member 32 that is one factor exhibiting torsional rigidity in the present invention is low and/or the projected area of the partition structure 3 is small, so that original torsional rigidity cannot be exhibited. On the other hand, when the volume of the hollow structure S1 is more than 95% of the volume of the space S2, high torsional rigidity can be exhibited, but there arises the problem that the space S3 excluding the hollow structure S1, in the space S2, becomes small, and thus it is difficult to dispose electronic components and wiring and the like for forming an electronic device, so that application as an electronic device housing is difficult. Thus, the volume of the hollow structure S1 is preferably within a range of 55% or more and 95% or less of the volume of the space S2 divided by the bottom cover 2 and the top cover 4.

In the present embodiment, the partition structure 3 includes one component, but the partition structure 3 may include a plurality of components. Similarly, the bottom cover 2 and the top cover 4 include one component, but the bottom cover 2 and/or the top cover 4 may include a plurality of components. With regard to the partition structure including a plurality of components, the bottom cover including a plurality of components, and the top cover including a plurality of components, the method for joining a plurality of components for forming the partition structure 3, the bottom cover 2 and the top cover 4 is not particularly limited. Examples of the method for joining a plurality of components include a method components are provided with holes, and fastened using screws, rivets and the like, or a method in which components shapes so that they can be mutually fitted are fitted and joined. Other methods for joining a plurality of components include a method in which in which an adhesive is applied to join components, and a method in which components are joined by thermal welding with a thermoplastic resin interposed between the components. Examples of the thermal welding method may include an insert injection method, an outsert injection method, a vibration welding method, an ultrasonic welding method, a laser welding method and a hot plate welding method.

Hereinafter, the present invention will be described in detail by way of examples. However, the present invention is not limited to the following examples.

<Evaluation and Measurement Methods>

(1) Torsional Rigidity Test

A housing 1 was fixed in a tester in such a manner that one side of the electronic device housing 1 was fixed by a U-shaped fixing tool 100, and the other side opposed to the fixed side was held by a support tool 101 as shown in FIG. 7(*a*), the displacement amount of the electronic device housing 1 was then measured when a load of 50 N was applied with a change rate set to 1°/min at an angle θ as shown in FIG. 7(*b*), and the measured value was defined as a torsional rigidity value of the electronic device housing.

(2) Deflection Rigidity Test

As shown in FIG. 8, the electronic device housing was installed in a tester in such a manner that it was able to apply a load F from the side of a bottom cover 2 or a top cover 4 to which the partition structure was joined. "Instron" (registered trademark) Universal Tester Model 4201 (manufactured by Instron Co., Ltd.) was used as a tester. The flex amount of the bottom cover 2 or the top cover 4 was measured when a load of 100 N was applied with the electronic device housing 1 pressed at the center position at a cross head speed of 1.0 mm/min using an indenter 102 having a diameter of 20 mm, and the measured value was defined as a deflection rigidity value.

(3) Evaluation of Flexural Modulus

In accordance with the specifications in ASTM D-790 (1997), the flexural moduli of materials to be used for the partition structure 3, the bottom cover 2 and the top cover 4 were evaluated. From each of members obtained in examples and comparative examples, a bending test piece having a width of 25±0.2 mm with a length set to span L+20±1 mm so that the thickness D and the span L satisfied the relationship of L/D=16 was cut for the four directions: 0°, +45°, −45° and 90° directions where a certain direction was set to the 0° direction. In this way, test pieces were prepared. The number of measurements (n) in each direction was 5, and the average value of all measured values (n=20) was defined as a flexural modulus. "Instron" (registered trademark) Universal Tester Model 4201 (manufactured by Instron Co., Ltd.) was used as a tester, a three-point bending test tool (indenter diameter: 10 mm, fulcrum diameter: 10 mm) was used, the support span was set to 16 times of the thickness of the test piece, and the bending elastic modulus was measured. The test was conducted under the following conditions: the moisture content of the test piece was 0.1 mass % or less, the atmospheric temperature was 23° C., and the humidity was 50% by mass.

(4) Peeling Load Test of Partition Structure (23° C. and 200° C.)

The peeling load of the partition structure was evaluated in accordance with "Testing methods for tensile strength of adhesive bonds" specified in JIS K6849 (1994). As test pieces in this test, electronic device housings obtained in examples and comparative examples were used. Here, for measuring the peeling strength of the partition structure, evaluation was performed in a state in which there was not a top cover or bottom cover to which the partition structure was not joined (before the reinforcing structure was joined). Specifically, as shown in FIG. 9, the bottom cover 2 or the top cover 4 of the electronic device housing 1 was fixed by a fixing tool 103, and the partition structure 3 was fixed by a tensile tool 104. A tensile load F was applied while each member was fixed, and evaluation was performed until the partition structure 3 was peeled off, or the tensile tool 104 was detached from the partition structure 3. The bonding area here was calculated by measuring the width and length of the joining surface of the partition structure 3 before joining. When joining was partially performed, the areas thereof were measured, and summed to determine a joining area. The peeling load of the partition structure 3 was calculated from the resulting tensile load value and joining area. For the peeling load of the partition structure 3 at 200° C., the electronic device housing 1 was placed in a thermostat together with the fixing tool, and the atmospheric temperature in the thermostat was elevated to 200° C. After elevation of the temperature, this state was maintained for 10 minutes, and a tensile load was then applied in the same manner as in the peeling load test of the partition structure 3, and evaluation was performed.

(5) Measurement of Volume Resistivity

A test piece was cut out from each member, and dried into an absolutely dry state (moisture content: 0.1% or less), and the width, the length and the thickness of the test piece were then measured using a caliper or a micrometer. After the measurement, a conductive paste (DOTITE manufactured by Fujikura Kasei Co. Ltd.) was applied to cross-sections at both ends of the test piece, the conductive paste was sufficiently dried, the both ends of the test piece were then press-bonded to electrodes, and an electric resistance value between the electrodes was measured by a digital multimeter (manufactured by FLUKE Corporation). A value obtained by subtracting the contact resistance values of a measurement device, a tool and so on from the electric resistance value was multiplied by the area of a conductive paste-coated surface, and the obtained value was divided by the length of the test piece to determine a volume resistivity value (unit: Ω·m).

(6) Evaluation of Antenna Performance

Figure 19:
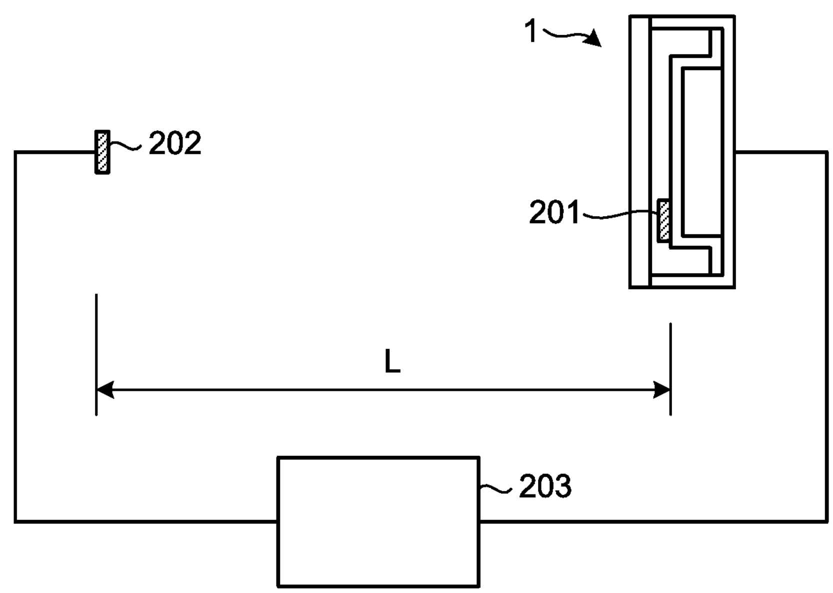
FIG. 19 is a schematic view for illustrating a method for evaluating antenna performance.

As shown in FIG. 19, the electronic device housing 1 with a signal transmitting antenna 201 disposed therein was installed, and a signal receiving antenna 202 was installed at such a position that the distance L was 1.5 m. A signal was transmitted from the signal transmitting antenna 201, and the reception state of the signal receiving antenna 202 was examined using a spectrum analyzer 203. Here, the signal intensity attenuation amount in movement of the signal from the signal transmitting antenna 201 to the signal receiving antenna 202 was measured, and evaluation was performed in accordance with the following criteria. ○: the signal intensity attenuation amount is less than 30 [dB]. Δ: the signal intensity attenuation amount is 30 [dB] or more and less than 50 [dB]. x: the signal intensity attenuation amount is 50 [dB] or more.

<Materials Used>

Materials used for evaluation are shown below.

[Material 11]

"TORAYCA" Prepreg P3252S-12 (manufactured by Toray Industries, Inc.) was provided as material 11. The properties of material 11 are shown in Table 6 below.

[Material 12]

SCF 183 EP-BL 3 manufactured by Super Resin Industry Co., Ltd. was provided as material 12. The properties of material 12 are shown in Table 6 below.

[Material 13]

An aluminum alloy A5052 was provided as material 13. The properties of material 13 are shown in Table 6 below.

[Material 14]

Using a master batch including 90% by mass of a polyamide 6 resin ("AMILAN" (registered trademark) CM1021T manufactured by Toray Industries, Inc.) and 10% by mass of a polyamide terpolymer resin composed of polyamide 6/66/610 ("AMILAN" (registered trademark) CM4000 manufactured by Toray Industries, Inc.), a thermoplastic resin film having a basis weight of 124 g/m² was prepared, and provided as material 14. The properties of material 14 are shown in Table 6 below.

TABLE 6

| | | Material 11 | Material 12 | Material 13 | Material 14 |
|---|---|---|---|---|---|
| Material | — | CFRP | GFRP | Al alloy | Ny resin |
| Elastic modulus | GPa | 60 | 25 | 70 | 3.5 |

TABLE 6-continued

| | | Material 11 | Material 12 | Material 13 | Material 14 |
|---|---|---|---|---|---|
| Linear expansion coefficient | $10^{-6}$/° C. | 0.3 | 7 | 23.6 | 83 |
| Thermal conductivity | W/m · K | 3.0 | 0.3 | 236.0 | 0.3 |
| Volume resistivity | Ω · m | 2 × $10^{-4}$ | 1 × $10^{12}$ | 3 × $10^{-6}$ | 1 × $10^{12}$ |

Example 11

Example 11-(1): Preparation of Bottom Cover

Seven sheets having a predetermined size were cut from material 11. Among them, four sheets were cut in such a manner that the fiber direction of a prepreg was parallel to a longitudinal direction (x direction in FIG. 12), and the other three sheets were cut in such a manner that the fiber direction was parallel to a lateral direction (y direction in FIG. 12). In this example, the lateral direction (y direction) was set to 0°, and a laminate including seven prepreg sheets was prepared in such a manner that prepreg sheets with the fiber direction set to 90° and prepreg sheets with the fiber direction set to 0° were symmetrically laminated.

Figure 20:
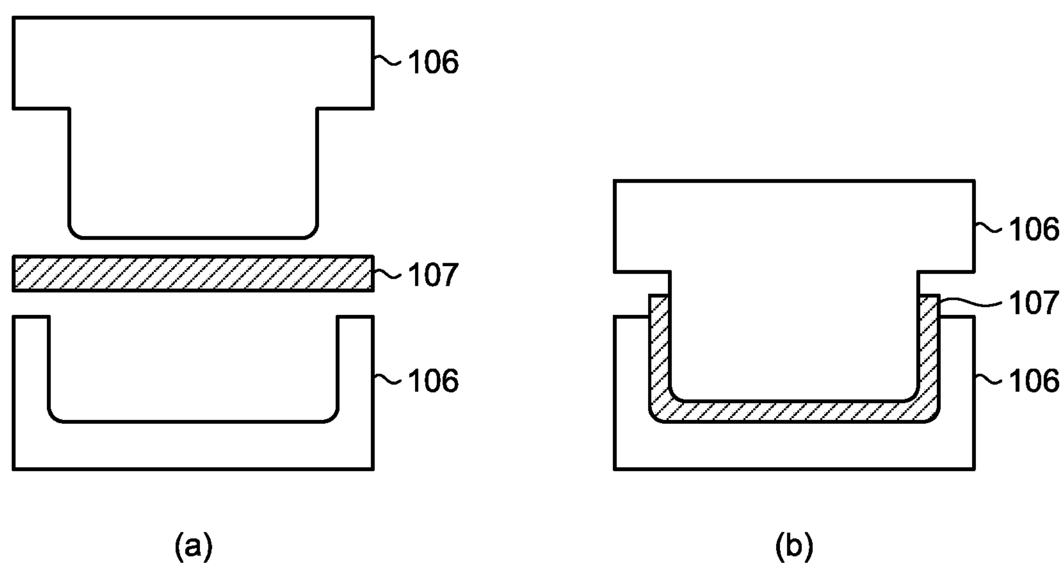
FIGS. 20(*a*) and 20(*b*) are sectional views for illustrating a press molding method.

Here, a press molding apparatus and a pair of molds 106 as shown in FIG. 20(*a*) were used, and the resulting laminate 107 was disposed in a pair of molds 106. Here, the heating platen temperature of the press molding apparatus was set to 150° C., and as shown in FIG. 20(*b*), the molds 106 were moved, and the laminate was pressurized with the molding pressure kept at 1.0 MPa. After 30 minutes, the molds 106 were opened, and the molded article was removed from the molds 106. Trimming was performed so that the rising wall of the resulting molded article had a desired height, thereby obtaining a bottom cover.

Example 11-(2): Preparation of Top Cover

Except that material 12 was used, and molds configured to prepare a molded article having a smooth shape were used, the same procedure as in Example 11-(1) was carried out to obtain a molded article. Trimming was performed so that the resulting molded article had a desired size, thereby obtaining a top cover.

Example 11-(3): Preparation of Partition Structure

Figure 21:
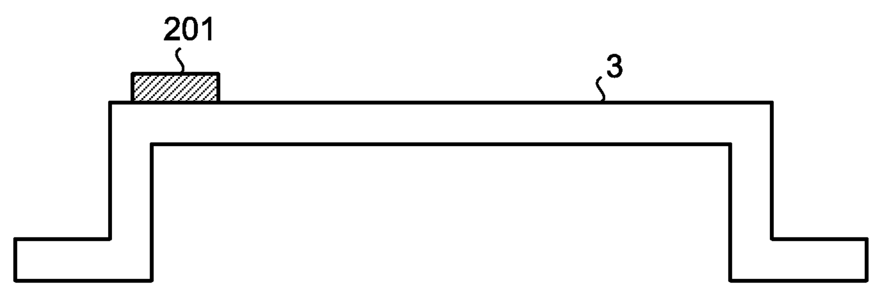
FIG. 21 is a schematic view showing an arrangement position of a signal transmitting antenna.

Except that material 12 was used, and molds 106 as shown in FIG. 10 were used, the same procedure as in Example 11-(1) was carried out to obtain a molded article. Trimming was performed so that the joining surface of the resulting molded article had a desired width, thereby obtaining a partition structure. As shown in FIG. 21, a signal transmitting antenna 201 was disposed on the resulting partition structure 3 so as to be positioned as in Table 7.

Example 11-(4): Preparation of Electronic Device Housing

Figure 22:
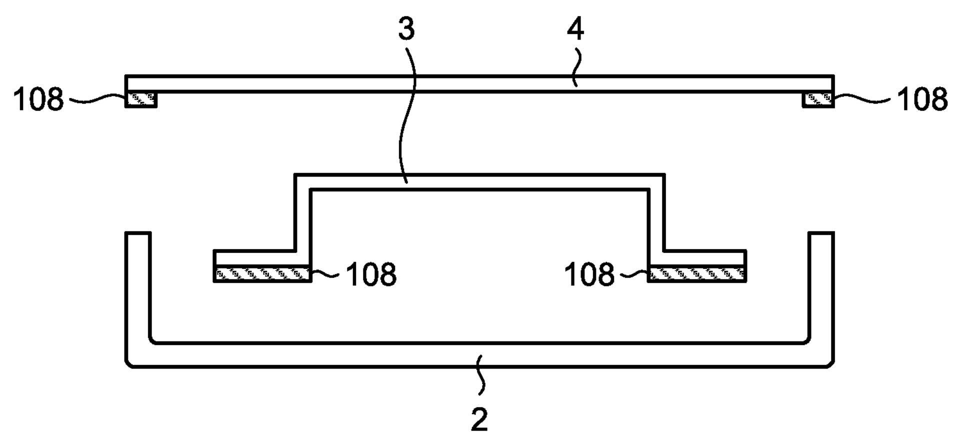
FIG. 22 is a sectional view for illustrating a method for preparing an electronic device housing.

The partition structure obtained in Example 11-(3) and the members obtained in Examples 11-(1) to 11-(3) were joined to each other using an adhesive 108 as shown in FIG. 22. Here, a hole was formed in each member for wiring connecting a signal transmitting antenna and a spectrum analyzer, so that the wiring extended from the back surface of the electronic device housing. The molding conditions and evaluation results in Example 11 are shown in Table 7 below.

Example 12

A bottom cover and a partition structure that were obtained in the same manner as in Examples 11-(1) and 11-(2) were joined to each other in the following manner: a molten hot melt resin (HM712 manufactured by Cemedine Co., Ltd.) was applied to a joining portion of the partition structure by a hot melt applicator at 140° C., a reinforcing structure was superposed thereon, a weight was placed on the partition structure, and this state was kept for 3 minutes. Except for the method for joining, the same procedure as in Examples 11-(1) to 11-(4) was carried out to obtain an electronic device housing. The molding conditions and evaluation results in Example 12 are shown in Table 7 below.

Example 13

Example 13-(1): Preparation of Bottom Cover

A film composed of a polyamide copolymer ("AMILAN" (registered trademark) CM8000 manufactured by Toray Industries, Inc.) and having a thickness of 50 μm was laminated on a surface to be joined to the partition structure, thereby obtaining a laminate. Except that the resulting laminate was used, the same procedure as in Example 11-(1) was carried out to obtain a bottom cover.

Example 13-(2): Preparation of Top Cover

As in the case of Example 13-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 13-(2) was carried out to obtain a top cover.

Example 13-(3): Preparation of Partition Structure

As in the case of Example 13-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 11-(3) was carried out to obtain a partition structure.

Example 13-(4): Preparation of Electronic Device Housing

Figure 23:
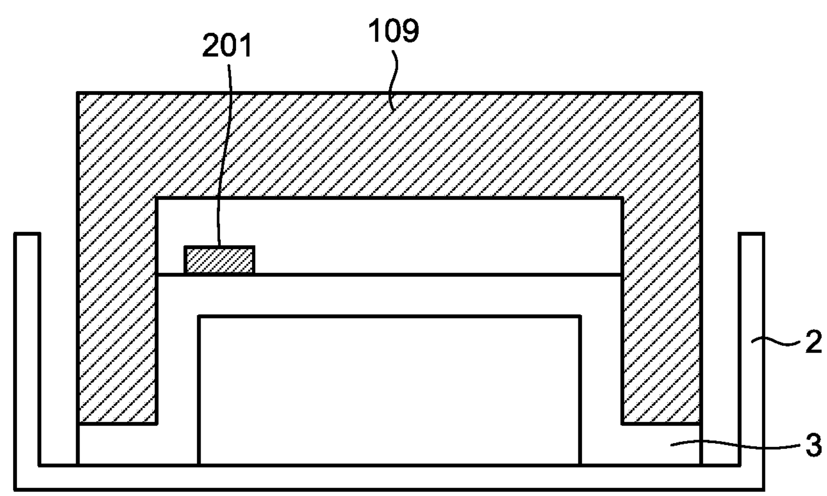
FIG. 23 is a sectional view for illustrating a press molding method.

The partition structure obtained in Example 13-(3) and the bottom cover obtained in Example 13-(1) were superposed on each other in joined form, a joining tool 109 as shown in FIG. 23 was provided, and the joined bottom cover and partition structure were disposed, and heated and pressurized in a press molding apparatus set so that the joining tool 109 had a surface temperature of 180° C. After 1 minute, the bottom cover 2, the partition structure 3 and the joining tool 109 were taken out from the press molding apparatus, and cooled. After 5 minutes, the joining tool 109 was removed to obtain an integrated product of the bottom cover 2 and the partition structure 3. Thereafter, the top cover 4 was joined using an adhesive in the same manner as in Example 11-(4). The molding conditions and evaluation results in Example 13 are shown in Table 7 below.

Example 14

Except that a partition structure having a size as described in Table 7 was obtained by molding, the same procedure as in Example 13 was carried out to obtain an electronic device housing. The molding conditions and evaluation results in Example 14 are shown in Table 7 below.

Example 15

Except that material 13 was used as a material of a bottom cover, the heating platen temperature was 220° C., and the molding pressure was 10 MPa, the same procedure as in Example 13 was carried out to obtain an electronic device housing. The molding conditions and evaluation results in Example 15 are shown in Table 8 below.

Example 16

Except that a material as described in Table 8 was used, the same procedure as in Example 13 was carried out to obtain each member. Except that a partition structure was joined to the resulting top cover, the same procedure as in Example 13 was carried out to obtain an electronic device housing. The molding conditions and evaluation results in Example 16 are shown in Table 8 below.

Example 17

Each member was obtained in the same manner as in Example 13. Except that a signal transmitting antenna was disposed on the bottom surface side, the same procedure as in Example 13 was carried out to obtain an electronic device housing. The molding conditions and evaluation results in Example 17 are shown in Table 8 below.

Example 18

Figure 24:
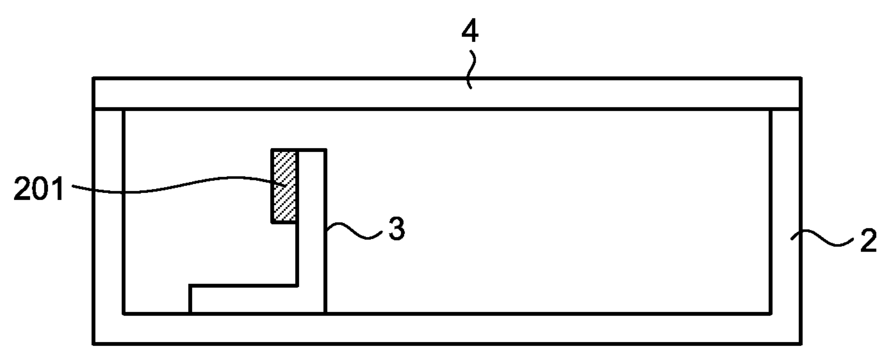
FIG. 24 is a schematic view showing an arrangement position of a partition structure.

Except that an L-shaped partition structure as described in Table 8 was used, and disposed as shown in FIG. 24, the same procedure as in Example 13 was carried out to obtain an electronic device housing. The molding conditions and evaluation results in Example 18 are shown in Table 8 below.

Example 19

Figure 25:
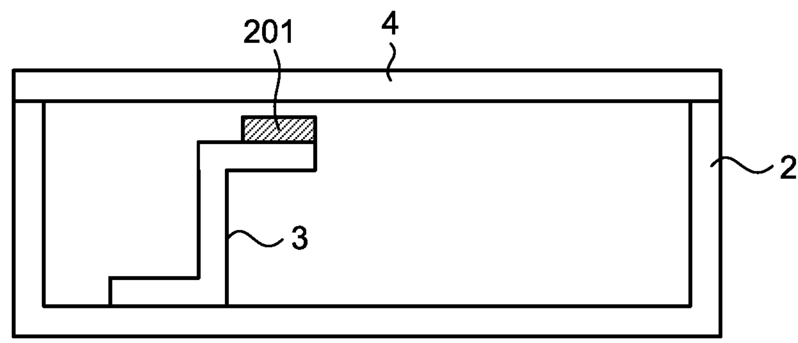
FIG. 25 is a schematic view showing an arrangement position of a partition structure.

Except that an S-shaped partition structure as described in Table 9 was used, and disposed as shown in FIG. 25, the same procedure as in Example 13 was carried out to obtain an electronic device housing. The molding conditions and evaluation results in Example 19 are shown in Table 9 below.

Example 20

Examples 20-(1) and 20-(2): Preparation of Bottom Cover and Top Cover

Each member was obtained in the same manner as in Examples 13-(1) and 13-(2).

Example 20-(3): Preparation of Partition Structure

Except that a mold corresponding to only a flat portion of a partition structure was used, the same procedure as in Example 13-(3) was carried out to obtain a flat portion of a partition structure. The flat portion of the resulting partition structure was then inserted into an injection mold, and using a molding machine, a glass fiber-reinforced resin (CM1011G-30 manufactured by Toray Industries, Inc.) was molded by insert injection molding at a cylinder temperature of 260° C. and a mold temperature of 80° C. to form a rising wall member of a partition structure, thereby obtaining a partition structure.

Example 20-(4): Preparation of Housing

Except that each member obtained in Examples 20-(1) and 20-(3) was used, the same procedure as in Example 13-(4) was carried out to obtain an integrated product of a bottom cover 2 and a partition structure 3. Similarly, the top cover obtained in Example 13-(2) was thermally welded and joined to the bottom cover. The molding conditions and evaluation results in Example 20 are shown in Table 9 below.

Comparative Example 11

Using a material as shown in Table 10, a bottom cover and a top cover were obtained with the heating platen temperature and the molding pressure set to 220° C. and 10 MPa, respectively. Here, the signal transmitting antenna was disposed on the bottom cover. Except for the above, the same procedure as in Example 11 was carried out to obtain an electronic device housing. The molding conditions and evaluation results in Comparative Example 11 are shown in Table 10 below.

Comparative Example 12

A laminate obtained by laminating materials 14 so as to attain a size as described in Table 10 was disposed in a press molding apparatus. Here, the heating platen temperature of the press molding apparatus was set to 260° C., and the laminate was pressurized with the molding pressure kept at 1.0 MPa. After 10 minutes, cooling water was made to pass through the heating plate, so that cooling was started. After the mold temperature decreased to 100° C. or lower, a mold was opened, and a molded article was taken out from the mold. Trimming was performed so that the rising wall of the resulting molded article had a desired height. Except that the above-mentioned processes were performed, and a partition structure was not used, the same procedure as in Comparative Example 11 was carried out to obtain an electronic device housing. The molding conditions and evaluation results in Comparative Example 12 are shown in Table 10 below.

Comparative Example 13

A bottom cover and a top cover were obtained in the same manner as in Example 11. The resulting bottom cover was drilled around a position at which a signal transmitting antenna was disposed. Material 14 was then disposed so as to fill the drilled portion, and the same procedure as in Comparative Example 12 was carried out to obtain a bottom cover partially composed of material 14. Except for the above, the same procedure as in Comparative Example 11 was carried out to obtain an electronic device housing. The molding conditions and evaluation results in Comparative Example 13 are shown in Table 10 below.

[Evaluation]

It was confirmed that the electronic device housings obtained in examples were electronic device housings capable of securing high antenna performance. Among them, the electronic device housings of Examples 11 to 17 exhibited very high torsional rigidity, and were also capable of mounting many electronic components etc. in a hollow structure because the ratio of the hollow structure was high. The electronic device housing of Example 13 also exhibited very high torsional rigidity, and was excellent in balance between the hollow structure and other spaces. Examples 12 to 20 are preferable from the viewpoint of repair and recycling because the bottom cover or the top cover and the partition structure are joined to each other by heat welding, and therefore the joining portion can be disassembled by heating while high torsional rigidity and deflection rigidity are exhibited. In addition, Examples 12 and 20 are preferable from the viewpoint of weight reduction because the partition structure and the bottom cover or the top cover are bonded directly to each other, and therefore an increase in weight is smaller as compared to a case where an adhesive or a hot melt resin is used.

In Example 15, not only high torsional rigidity but also deflection rigidity was exhibited by using a metal material having high dynamic characteristics for the bottom cover. In addition, the metal material has a high thermal conductivity, and is therefore preferable from the viewpoint of thermal characteristics. In the electronic device housing of Example 17, the partition member was joined to the top cover, but high torsional rigidity was exhibited as in the other examples.

On the other hand, the electronic device housings of Comparative Examples 11 to 13 have a configuration that has been proposed heretofore. In Comparative Example 1, a material having a volume resistivity of $1.0\times10^{-2}$ Ω·m or more was used, and therefore signals were blocked, so that antenna performance was not exhibited. In Comparative Example 12, a material having a volume resistivity of less than $1.0\times10^{-2}$ Ω·m was used, and therefore signals were not blocked, and thus antenna performance was exhibited, but torsional rigidity and deflection rigidity were not exhibited, and the electronic device housing was poor in productivity.

TABLE 7

| | | Example 11 | Example 12 | Example 13 | Example 14 |
|---|---|---|---|---|---|
| Bottom cover: | | | | | |
| Material | — | Material 11 | Material 11 | Material 11 | Material 11 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | $cm^2$ | 630 | 630 | 630 | 630 |
| Volume | $cm^3$ | 572 | 572 | 572 | 572 |
| Top cover: | | | | | |
| Material | — | Material 12 | Material 12 | Material 12 | Material 12 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Partition structure: | | | | | |
| Material | — | Material 12 | Material 12 | Material 12 | Material 12 |
| Length | mm | 200 | 200 | 200 | 200 |
| Width | mm | 290 | 290 | 290 | 290 |
| Height | mm | 8 | 8 | 5 | 8 |
| Angle | ° | 90 | 90 | 90 | 90 |
| Thickness | mm | 0.8 | 0.8 | 0.8 | 0.8 |
| Joining portion width | mm | 5 | 5 | 5 | 5 |
| Bonding area | $cm^2$ | 48 | 48 | 48 | 48 |
| Projected area | $cm^2$ | 580 | 580 | 580 | 580 |
| Volume | $cm^3$ | 412 | 412 | 240 | 412 |
| Another partition structure: | | | | | |
| Material | — | — | — | — | — |
| Length | mm | — | — | — | — |
| Width | mm | — | — | — | — |
| Height | mm | — | — | — | — |
| Antenna: | | | | | |
| Antenna shortest distance | mm | 8 | 8 | 5 | 8 |
| Transmission/reception portion shortest distance | mm | 8 | 8 | 5 | 8 |
| Space height | % | 80 | 80 | 50 | 80 |

TABLE 7-continued

| | | Example 11 | Example 12 | Example 13 | Example 14 |
|---|---|---|---|---|---|
| Electronic device housing: | | | | | |
| Projected area ratio | % | 92.1 | 92.1 | 92.1 | 92.1 |
| Volume ratio | % | 72.0 | 72.0 | 42.0 | 72.0 |
| Integration method | — | Adhesive | Thermal welding | Thermal welding | Thermal welding |
| Bonding portion | — | Plane | Plane | Plane | Plane |
| Peeling load (23° C.) | N/cm$^2$ | 1500 | 2000 | 2500 | 2500 |
| Peeling load (200° C.) | N/cm$^2$ | 700 | 50 | 50 | 50 |
| Evaluation: | | | | | |
| Torsional rigidity | — | ⊙ | ⊙ | ⊙ | ⊙ |
| Deflection rigidity | — | ○ | ○ | ○ | ○ |
| Antenna characteristics | — | ○ | ○ | Δ | ○ |

TABLE 8

| | | Example 15 | Example 16 | Example 17 | Example 18 |
|---|---|---|---|---|---|
| Bottom cover: | | | | | |
| Material | — | Material 13 | Material 12 | Material 11 | Material 11 |
| Length | mm | 210 | 210 | 210 | 210 |
| Width | mm | 300 | 300 | 300 | 300 |
| Height | mm | 10 | 10 | 10 | 10 |
| Thickness | mm | 0.6 | 0.8 | 0.8 | 0.8 |
| Projected area | cm$^2$ | 630 | 630 | 630 | 630 |
| Volume | cm$^3$ | 586 | 572 | 572 | 572 |
| Top cover: | | | | | |
| Material | — | Material 12 | Material 11 | Material 12 | Material 12 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | cm$^2$ | 630 | 630 | 630 | 630 |
| Volume | cm$^3$ | — | — | — | — |
| Partition structure: | | | | | |
| Material | — | Material 12 | Material 12 | Material 12 | Material 12 |
| Length | mm | 200 | 200 | 200 | 10 |
| Width | mm | 290 | 290 | 290 | 150 |
| Height | mm | 8 | 8 | 8 | 8 |
| Angle | ° | 90 | 90 | 90 | 90 |
| Thickness | mm | 0.8 | 0.8 | 0.8 | 0.8 |
| Joining portion width | mm | 5 | 5 | 5 | 10 |
| Bonding area | cm$^2$ | 48 | 48 | 48 | 28 |
| Projected area | cm$^2$ | 580 | 580 | 580 | 15 |
| Volume | cm$^3$ | 412 | 412 | 412 | 9 |
| Another partition structure: | | | | | |
| Material | — | — | — | — | — |
| Length | mm | — | — | — | — |
| Width | mm | — | — | — | — |
| Height | mm | — | — | — | — |
| Antenna: | | | | | |
| Antenna shortest distance | mm | 8 | 8 | 7 | 5 |
| Transmission/reception portion shortest distance | mm | 8 | 8 | 7 | 7 |
| Space height | % | 80 | 80 | 80 | 70 |

TABLE 8-continued

| | | Example 15 | Example 16 | Example 17 | Example 18 |
|---|---|---|---|---|---|
| Electronic device housing: | | | | | |
| Projected area ratio | % | 92.1 | 92.1 | 92.1 | 2.4 |
| Volume ratio | % | 70.2 | 72.0 | 72.0 | 1.6 |
| Integration method | — | Thermal welding | Thermal welding | Thermal welding | Thermal welding |
| Bonding portion | — | Plane | Plane | Plane | Plane |
| Peeling load (23° C.) | N/cm$^2$ | 2500 | 2500 | 2500 | 2500 |
| Peeling load (200° C.) | N/cm$^2$ | 700 | 50 | 50 | 50 |
| Evaluation: | | | | | |
| Torsional rigidity | — | ⊙ | ⊙ | ⊙ | ⊙ |
| Deflection rigidity | — | ○ | ○ | ○ | ○ |
| Antenna characteristics | — | Δ | ○ | ○ | ○ |

TABLE 9

| | | Example 19 | Example 20 |
|---|---|---|---|
| Bottom cover: | | | |
| Material | — | Material 11 | Material 11 |
| Length | mm | 210 | 210 |
| Width | mm | 300 | 300 |
| Height | mm | 10 | 10 |
| Thickness | mm | 0.8 | 0.8 |
| Projected area | cm$^2$ | 630 | 630 |
| Volume | cm$^3$ | 572 | 572 |
| Top cover: | | | |
| Material | — | Material 12 | Material 12 |
| Length | mm | 210 | 210 |
| Width | mm | 300 | 300 |
| Height | mm | — | — |
| Thickness | mm | 0.8 | 0.8 |
| Projected area | cm$^2$ | 630 | 630 |
| Volume | cm$^3$ | — | — |
| Partition structure: | | | |
| Material | — | Material 12 | Material 2/GF-reinforced resin |
| Length | mm | 20 | 200 |
| Width | mm | 150 | 290 |
| Height | mm | 8 | 5 |
| Angle | ° | 90 | 90 |
| Thickness | mm | 0.8 | 0.8 |
| Joining portion width | mm | 10 | 5 |
| Bonding area | cm$^2$ | 30 | 48 |
| Projected area | cm$^2$ | 30 | 580 |
| Volume | cm$^3$ | 20 | 240 |
| Another partition structure: | | | |
| Material | — | — | — |
| Length | mm | — | — |
| Width | mm | — | — |
| Height | mm | — | — |
| Antenna: | | | |
| Antenna shortest distance | mm | 8 | 5 |
| Transmission/reception portion shortest distance | mm | 8 | 5 |
| Space height | % | 80 | 50 |
| Electronic device housing: | | | |
| Projected area ratio | % | 4.8 | 92.1 |
| Volume ratio | % | 3.4 | 42.0 |
| Integration method | — | Thermal welding | Thermal welding |
| Bonding portion | — | Plane | Plane |
| Peeling load (23° C.) | N/cm$^2$ | 2500 | 2500 |
| Peeling load (200° C.) | N/cm$^2$ | 50 | 50 |
| Evaluation: | | | |
| Torsional rigidity | — | ⊙ | ⊙ |
| Deflection rigidity | — | ○ | ○ |
| Antenna characteristics | — | ○ | Δ |

TABLE 10

| | | Comparative Example 11 | Comparative Example 12 | Comparative Example 13 |
|---|---|---|---|---|
| Bottom cover: | | | | |
| Material | — | Material 13 | Material 14 | Material 11/ Material 14 |
| Length | mm | 210 | 210 | 210 |
| Width | mm | 300 | 300 | 300 |
| Height | mm | 10 | 10 | 10 |
| Thickness | mm | 0.8 | 0.8 | 0.8 |
| Projected area | cm$^2$ | 630 | 630 | 630 |
| Volume | cm$^3$ | 572 | 572 | 572 |

TABLE 10-continued

| | | Comparative Example 11 | Comparative Example 12 | Comparative Example 13 |
|---|---|---|---|---|
| Top cover: | | | | |
| Material | — | Material 13 | Material 14 | Material 12 |
| Length | mm | 210 | 210 | 210 |
| Width | mm | 300 | 300 | 300 |
| Height | mm | — | — | — |
| Thickness | mm | 0.8 | 0.8 | 0.8 |
| Projected area | $cm^2$ | 630 | 630 | 630 |
| Volume | $cm^3$ | — | — | — |
| Partition structure: | | | | |
| Material | — | — | — | — |
| Length | mm | — | — | — |
| Width | mm | — | — | — |
| Height | mm | — | — | — |
| Angle | ° | — | — | — |
| Thickness | mm | — | — | — |
| Joining portion width | mm | — | — | — |
| Bonding area | $cm^2$ | — | — | — |
| Projected area | $cm^2$ | — | — | — |
| Volume | $cm^3$ | — | — | — |
| Another partition structure: | | | | |
| Material | — | — | — | — |
| Length | mm | — | — | — |
| Width | mm | — | — | — |
| Height | mm | — | — | — |
| Antenna: | | | | |
| Antenna shortest distance | mm | 0 | 0 | 5 |
| Transmission/reception portion shortest distance | mm | 0 | 0 | 5 |
| Space height | % | 0 | 0 | 0 |
| Electronic device housing: | | | | |
| Projected area ratio | % | 0 | 0 | 0 |
| Volume ratio | % | 0 | 0 | 0 |
| Integration method | — | — | — | — |
| Bonding portion | — | — | — | — |
| Peeling load (23° C.) | $N/cm^2$ | — | — | — |
| Peeling load (200° C.) | $N/cm^2$ | — | — | — |
| Evaluation: | | | | |
| Torsional rigidity | — | Δ | X | X |
| Deflection rigidity | — | X | X | X |
| Antenna characteristics | — | X | ○ | Δ |

Third Embodiment

Finally, an electronic device housing according to a third embodiment of the present invention will be described.

Figure 26:
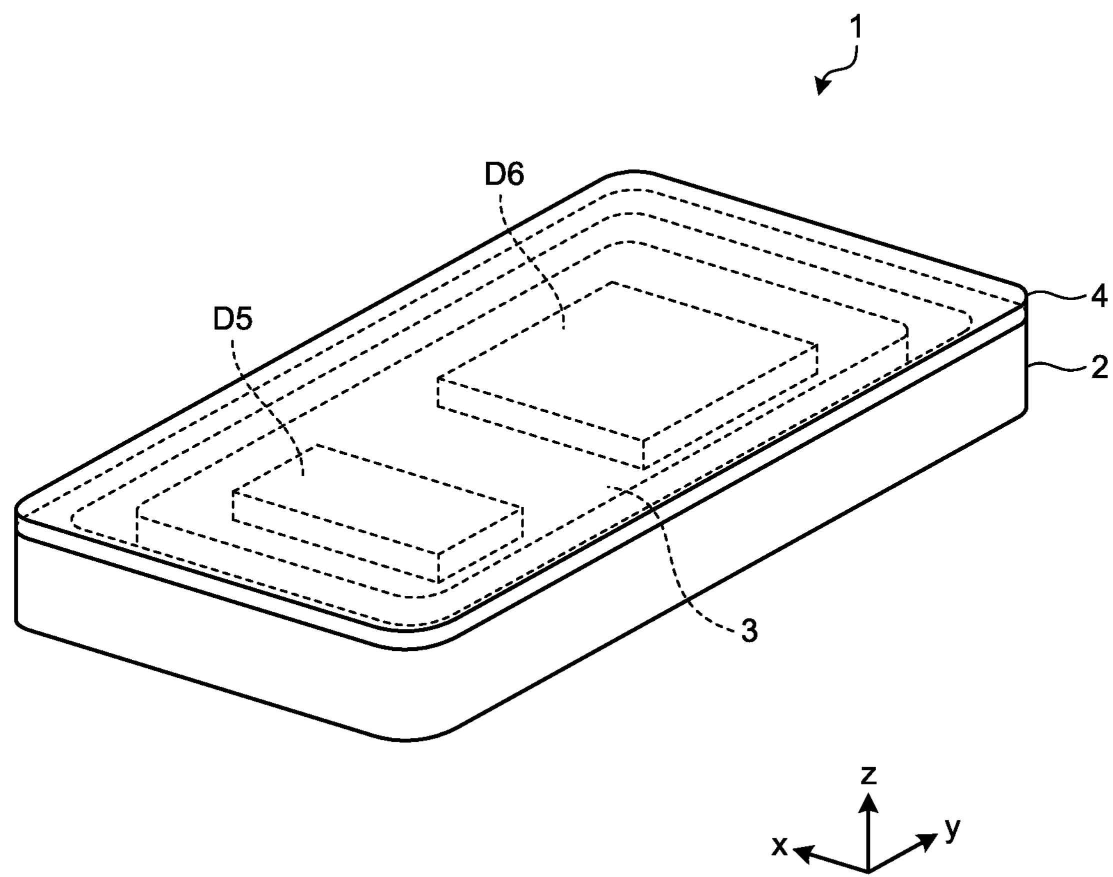
FIG. 26 is a perspective view showing a configuration of an electronic device housing according to a third embodiment of the present invention.

FIG. 26 is a perspective view showing a configuration of the electronic device housing according to the third embodiment of the present invention. As shown in FIG. 26, an electronic device housing 1 according to the third embodiment of the present invention includes, as main components, a bottom cover 2 rectangular in plan view, a partition structure 3 joined to the bottom cover 2, and a top cover 4 rectangular in plan view. In the present embodiment, the bottom cover 2 and top cover 4 and the partition structure 3 are functionally separated, and shaped in accordance with a purpose. In the following description, a direction parallel to short sides of the bottom cover 2 and the top cover 4 is defined as an x direction, a direction parallel to long sides of the bottom cover 2 and the top cover 4 is defined as a y direction, and a direction perpendicular to the x direction and the y direction is defined as a z direction (vertical direction).

Figure 27:
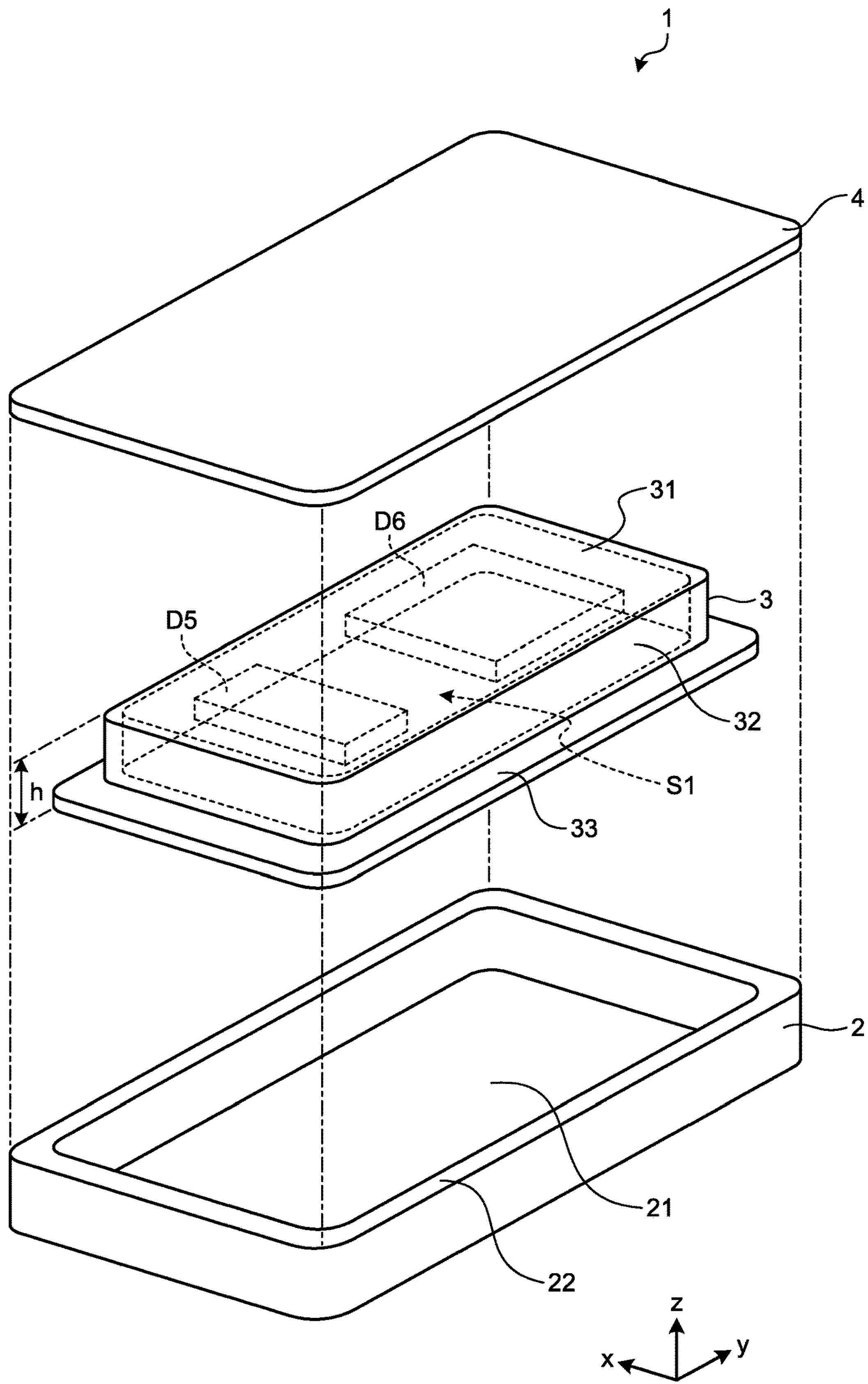
FIG. 27 is an exploded perspective view of the electronic device housing shown in FIG. 26.

FIG. 27 is an exploded perspective view of the electronic device housing 1 shown in FIG. 26. As shown in FIG. 27, the bottom cover 2 includes a flat portion 21 parallel to an x-y plane and rectangular in plan view, and a rising wall member 22 erected in the positive direction of z from an edge member of the flat portion 21. The thickness of a member that forms the bottom cover 2 is preferably within a range of 0.1 mm or more and 0.8 mm or less. In addition, the elastic modulus of the member that forms the bottom cover 2 is preferably within a range of 20 GPa or more and 120 GPa or less.

In addition, it is preferable that the bottom cover 2 is formed of any one of a metal material and a fiber-reinforced composite material, and the bottom cover 2 may be formed by combining these materials. From the viewpoint of exhibiting high torsional rigidity, the bottom cover 2 is preferably a seamless member formed of the same material. From the viewpoint of productivity, the flat portion 21 having a simple shape may be formed using the metal material and the fiber-reinforced composite material which have high dynamic properties, and the rising wall member 22 and a joining portion which have a complicated shape may be formed by injection molding etc. using a resin material excellent in moldability.

It is preferable to use a light metal material such as an aluminum alloy, a magnesium alloy or a titanium alloy as the metal material. Examples of the aluminum alloy may include A2017 and A2024 as Al—Cu systems, A3003 and A3004 as Al—Mn systems, A4032 as an Al—Si system, A5005, A5052 and A5083 as Al—Mg systems, A6061 and A6063 as Al—Mg—Si systems, and A7075 as an Al—Zn system. Examples of magnesium alloy may include AZ31, AZ61 and AZ91 as Mg—Al—Zn systems. Examples of the titanium alloy may include alloys containing palladium of grades 11 to 23, alloys containing cobalt and palladium, and Ti-6Al-4V corresponding to grade 50 (α alloy), grade 60 (α-β alloy) and grade 80 (β alloy).

As reinforcing fibers to be used in the fiber-reinforced composite material, fibers such as carbon fibers, glass fibers, aramid fibers, boron fibers, PBO fibers, high strength polyethylene fibers, alumina fibers and silicon carbide fibers can be used, and two or more of these fibers may be mixed, and used. These reinforcing fibers can be used as fiber structures such as long fibers aligned in one direction, single tows, woven fabrics, knits, nonwoven fabrics, mats and braided cords.

Examples of the matrix resin that can be used include thermosetting resins such as epoxy resins, phenol resins, benzoxazine resins and unsaturated polyester resins, polyester-based resins such as polyethylene terephthalate (PET), polybutylene terephthalate (PBT), polytrimethylene terephthalate (PTT), polyethylene naphthalate and liquid crystal polyester, polyolefins such as polyethylene (PE), polypropylene (PP) and polybutylene, styrene-based resins, urethane resins, and thermosetting resins such as polyoxymethylene (POM), polyamide (PA), polycarbonate (PC), polymethyl methacrylate (PMMA), polyvinyl chloride (PVC), polyphenylene sulfide (PPS), polyphenylene ether (PPE), modified PPE, polyimide (PI), polyamideimide (PAI), polyether imide (PEI), polysulfone (PSU), modified PSU, polyether sulfone (PES), polyketone (PK), polyether ketone (PEK), polyether ether ketone (PEEK), polyether ketone ketone (PEKK), polyarylate (PAR), polyether nitrile (PEN), phenol-based resins, and phenoxy resins. From the viewpoint of productivity and dynamic characteristics, thermosetting resins are preferably used, and among them, epoxy resins are preferably used. From the viewpoint of moldability, thermoplastic resins are preferably used. Among them, polyamide resins are preferably used from the viewpoint of strength, polycarbonate resins are preferably used from the viewpoint of impact resistance, polypropylene resins are preferably used from the viewpoint of lightness, and polyphenylene sulfide resins are preferably used from the viewpoint of heat resistance. The resin may be used not only as a matrix resin of the fiber-reinforced composite material but also as the bottom cover, the top cover or the partition structure which is composed of a resin itself.

In the present invention, it is preferable that a prepreg including the reinforcing fiber and matrix resin is used as a material of each member from the viewpoint of handling characteristics in lamination etc. From the viewpoints of high dynamic characteristics and design freedom, it is preferable to use unidirectional continuous fiber prepreg, and from the viewpoint of isotropic dynamic characteristics and moldability, it is preferable to use a fabric prepreg. In addition, the member may be composed of a laminate of these prepregs.

The partition structure 3 includes a flat portion 31 parallel to an x-y plane and rectangular in plan view, a rising wall member 32 erected in a-z direction from an edge member of the flat portion 31, and a joining portion 33 extending in an outward direction parallel to an x-y plane from the edge member of the rising wall member 32. The partition structure 3 is joined to the bottom cover 2 with a hollow structure S1 formed between the flat portion 31 and the flat portion 21 of the bottom cover 2 by joining the joining portion 33 to the flat portion 21 of the bottom cover 2. Use of the partition structure 3 having the joining portion 33 is one factor of further improving torsional rigidity in the present invention, and it is preferable that the joining portion 33, the bottom cover 2 and the top cover 4 are joined together. In addition, it is preferable that an electronic component is packed in the hollow structure S1, and it is preferable that an electronic component is disposed on the partition structure 3 because the distance from the bottom cover 2 or top cover 4 joined to the partition structure 3 can be increased.

The area of the joining portion 33 in a plane parallel to the x-y plane is within a range of 10 $cm^2$ or more and 100 $cm^2$ or less. Specifically, when the area of the joining portion 33 is less than 10 $cm^2$, there arises the problem if a load that causes large deformation is applied to the electronic device housing 1, the partition structure 3 is peeled from the bottom cover 2, and thus original torsional rigidity cannot be exhibited. When the area of the joining portion 33 is larger than 100 $cm^2$, there arises the problem that the increase in area of the joining portion 33 causes an increase in weight of the electronic device housing 1 and a decrease in volume of the hollow structure S1. Thus, the area of the joining portion 33 is within a range of 10 $cm^2$ or more and 100 $cm^2$ or less.

The maximum value of a distance h between the flat portion 31 of the partition structure 3 and the flat portion 21 of the bottom cover 2 (height of the partition structure 3 from the flat portion 21) is within a range of 3 mm or more and 30 mm or less. In the present invention, the height h of the partition structure 3 is one factor of exhibiting torsional rigidity. Thus, when the maximum value of the height h is less than 3 mm, there arises the problem that the effect of the rising wall member 32 is low in the electronic device housing 1, so that original torsional rigidity cannot be exhibited. On the other hand, when the maximum value of the height h is larger than 30 mm, there arises the problem that it is necessary to increase the thickness of the rising wall member 32, resulting in an increase in weight of the electronic device housing 1. Thus, the maximum value of the height h is within a range of 3 mm or more and 30 mm or less.

Figure 28:
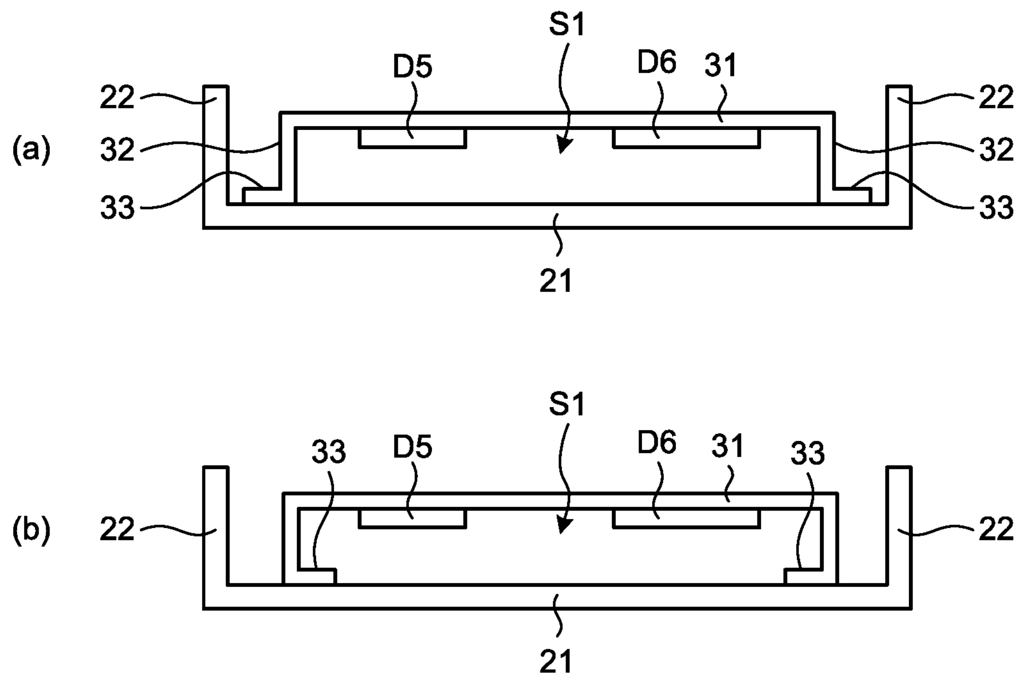
FIGS. 28(*a*) and 28(*b*) are sectional views showing one example of a configuration of the partition structure shown in FIG. 27.
Figure 29:
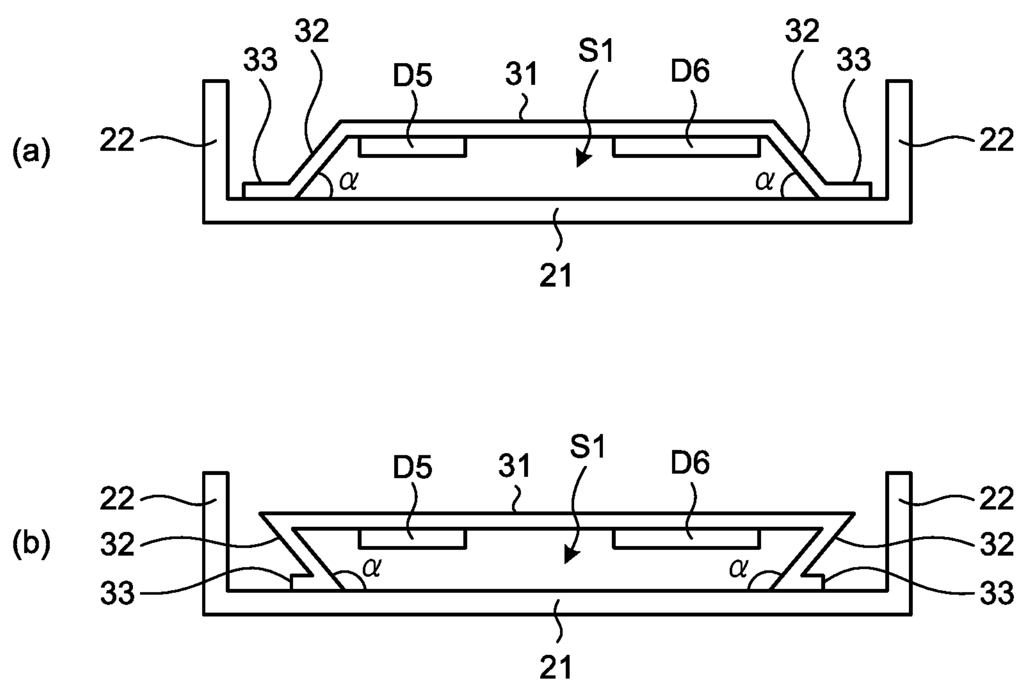
FIGS. 29(*a*) and 29(*b*) are sectional views showing one example of a configuration of the partition structure shown in FIG. 27.

FIGS. 28 and 29 are sectional views showing one example of a configuration of the partition structure 3 shown in FIG. 27. In the present embodiment, the joining portion 33 is provided so as to extend in an outward direction parallel to the x-y plane from the edge member of the rising wall member 32 as shown in FIG. 28(*a*), but the joining portion 33 may be provided so as to extend in an inward direction parallel to the x-y plane from the peripheral portion of the rising wall member 32 as shown in FIG. 28(*b*). In addition, it is preferable that the angle $\alpha$ of the rising wall member 32 with respect to the flat portion 21 of the bottom cover 2 (or the joining portion 33 of the partition structure 3) is within a range of 45° or more and 135° or less as shown in FIGS. 29(*a*) and 29(*b*). FIG. 29(*a*) shows a state in which the angle $\alpha$ of the rising wall member 32 is an acute angle, and FIG. 29(*b*) shows a state in which the angle $\alpha$ of the rising wall member 32 is an obtuse angle.

Figure 30:
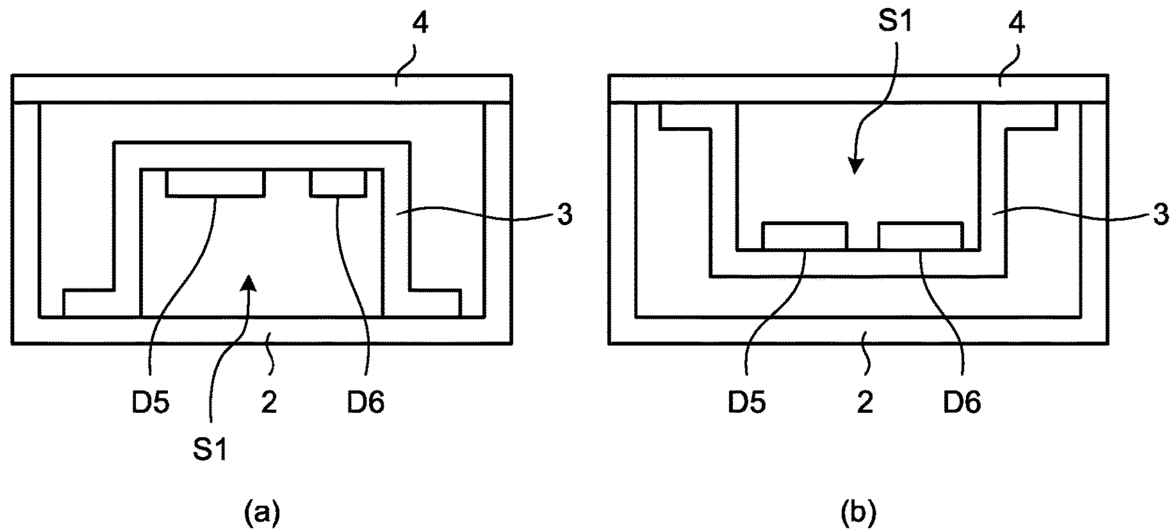
FIGS. 30(*a*) and 30(*b*) are sectional views showing a configuration of an electronic device housing.

FIGS. 30(*a*) and 30(*b*) are sectional views showing a configuration of an electronic device housing. As shown in FIGS. 30(*a*) and 30(*b*), a battery D5, and an electronic component D6 other than the battery D5 are disposed in the hollow structure S1 formed by joining the partition structure 3 and the bottom cover 2 or the top cover 4. It is preferable that the battery D5 has a structure which enables non-contact charging. With such a structure, it is possible to minimize formation of holes in the partition structure 3, and improvement of torsional rigidity can be promoted. In addition, since airtightness is improved, ingress of dust and water can be suppressed. In addition, for suppressing protrusion of the battery D5 and improving thermal characteristics, a gap of 1 mm or more may be formed between the battery D5 and the bottom cover 2 or the top cover 4 which is joined to the partition structure 3. Accordingly, it is possible to suppress contact between the battery D5 and the bottom cover 2 or the top cover 4 which is joined to the partition structure 3. In addition, a cushioning member may be disposed in the gap. Examples of the cushioning member may include cushioning materials (prevention of protrusion and absorption of impacts), heat insulating materials (suppression of transfer of heat to the bottom cover 2 or the top cover 4), and high-thermal conductivity materials (improvement of heat dissipation property (suppression of local temperature rise suppression)). Even if the bottom cover 2 or the top cover 4 which is joined to the battery D5 and the partition structure 3 comes into contact with the battery D5, impact in the contact can be reduced by disposing a cushioning member as described above.

The elastic modulus of the partition structure 3 and the elastic modulus of the bottom cover 2 or the top cover 4 which is joined to the partition structure 3 are preferably larger than the elastic modulus of the bottom cover 2 or the top cover 4 to which the partition structure 3 is not joined. Accordingly, it is possible to suppress protrusion of the battery D5. In addition, it is preferable that the partition structure 3 has an opening having an area of 30% or less of the surface area of the partition structure 3.

In addition, in the present invention, it is preferable that another partition structure is provided in the hollow structure S1 formed between the partition structure 3 and the bottom cover 2 or the top cover 4 to which the partition structure 3 is joined. Another partition structure provided in the hollow structure S1 may be joined to only the bottom cover 2 or the top cover 4, or may be joined to only the partition structure 3. Preferably, another partition structure is joined to the inner surface of the partition structure 3, and also joined to the bottom cover 2 or the top cover 4 to which the partition structure 3 is joined. Here, the inner surface of the partition structure 3 means a surface inside the hollow structure S1 in the partition structure 3.

Figure 31:
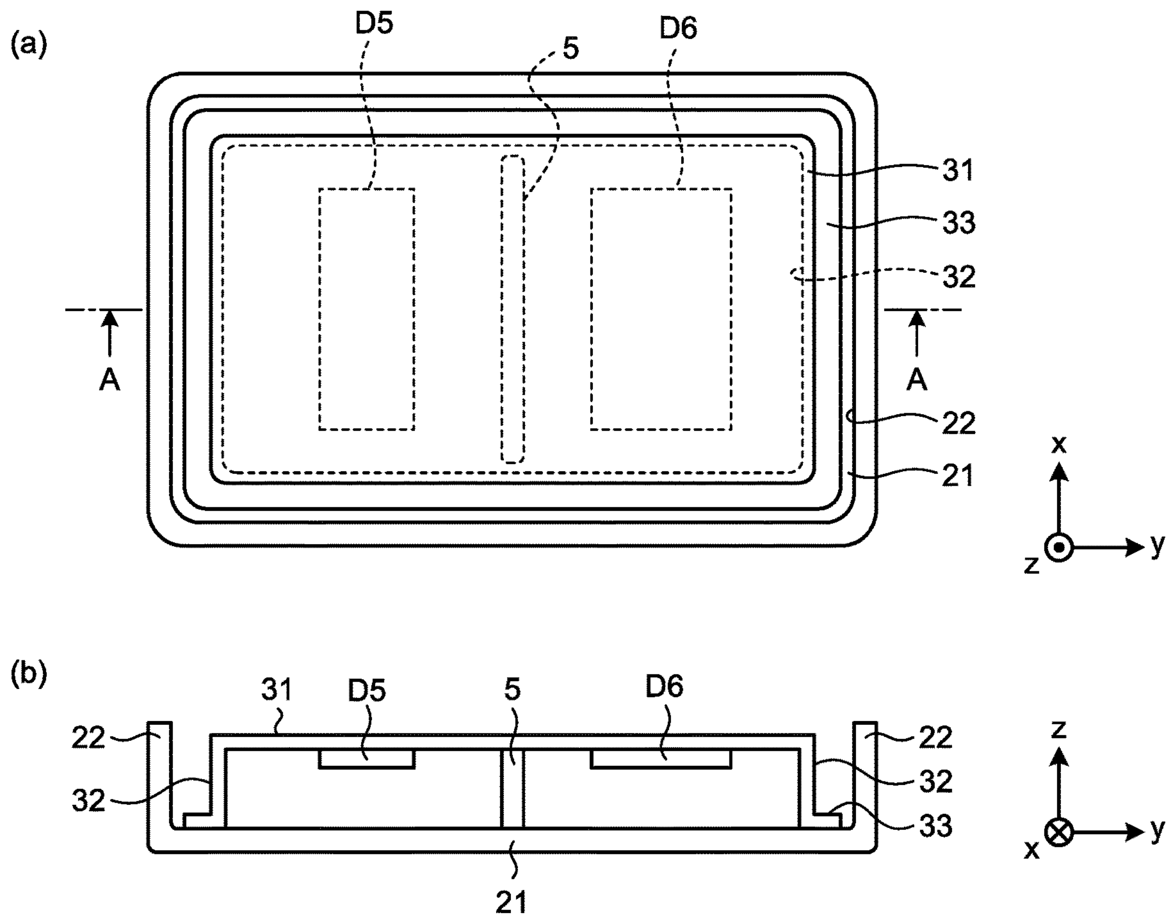
FIGS. 31(*a*) and 31(*b*) show a plan view and a sectional view showing a configuration of another partition structure.

Deflection rigidity may also be increased by disposing another partition structure in the hollow structure S1 formed between the flat portion 31 of the partition structure 3 and the flat portion 21 of the bottom cover 2 in such a manner that the inner surface of the partition structure 3 is joined to the bottom cover 2 or the top cover 4 to which the partition structure 3 is joined. FIG. 31(*a*) is a plan view showing a configuration of another partition structure, and FIG. 31(*b*) is a sectional view taken along line A-A in FIG. 31(*a*). As shown in FIGS. 31(*a*) and 31 (*b*), the other partition structure 5 is a member disposed so as to extend in the x direction at the central part of the hollow structure S1 in the y direction, and is connected to the flat portion 21 of the bottom cover 2 and the flat portion 31 of the partition structure 3. By integrating the flat portion 21 of the bottom cover 2 and the flat portion 31 of the partition structure 3 with the other partition structure 5 interposed therebetween, the bottom cover 2 and the partition structure 3 are deformed in synchronization with each other if a load is applied, and therefore the deflection rigidity of the electronic device housing 1 can be improved. In addition, the rising wall member 22 of the bottom cover 2 and the rising wall member 32 of the partition structure 3 are integrated with the other partition structure 5, and thus the rising wall members 22 and 32 of the bottom cover 2 and the partition structure 3 are hardly deformed particularly inside direction of the electronic device housing 1, so that the torsional rigidity of the electronic device housing 1 can be improved.

As long as the other partition structure 5 is connected to the flat portion 21 of the bottom cover 2 and the flat portion 31 of the partition structure 3, another reinforcing structure 5 may be a member disposed so as to extend in the y direction at the central part of the hollow structure S1 in the x direction, or a member disposed so as to extend in the diagonal direction of the hollow structure S1. In particular, it is preferable that the other partition structure 5 is disposed so as to pass through a position at which the amount of deflection of the flat portion 21 of the bottom cover 2 increases when a load is applied in the thickness direction, and a plurality of members may be disposed with the members crossing one another. In addition, it is preferable that the other partition structure 5 is formed of an impact absorbing material excellent in elasticity, such as a resin material having an elastomer or rubber component, or a gel, and accordingly, not only deflection rigidity but also an effect against impact can be exhibited.

Figure 32:
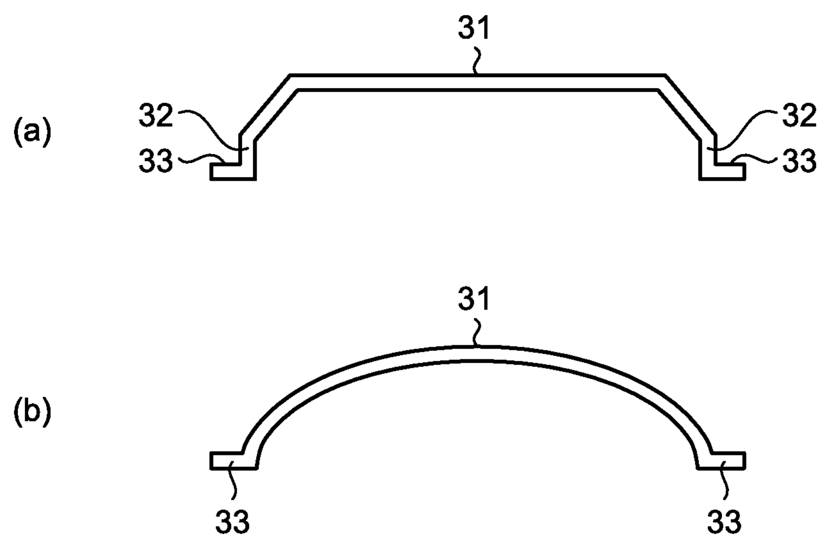
FIGS. 32(*a*) and 32(*b*) are sectional views showing a configuration of the partition structure in the electronic device housing according to the third embodiment of the present invention.

In the present embodiment, the partition structure 3 includes the flat portion 31, the rising wall member 32 and the joining portion 33 as shown in FIG. 32(*a*), but the partition structure 3 may be formed by using a curved member as the flat portion 31 and forming the joining portion 33 on an edge member of the curved member as shown in FIG. 32(*b*). That is, a curved member may be used as the flat portion 31, resulting in omission of the rising wall member 32. In addition, from the viewpoint of increasing rigidity and effectively utilizing the space, an irregular shape may be formed on the flat portion 31. In the present embodiment, the partition structure 3 is joined to the bottom cover 2, but the partition structure 3 may be joined to the top cover 4 to form the hollow structure S1 between the flat portion 31 of the partition structure 3 and the top cover 4.

In the present embodiment, the joining portion 33 is formed on all of the four rising wall members 32 formed on respective sides of the flat portion 31, but the joining portion 33 may be formed on at least one of the four rising wall members 32. Alternatively, the joining portion 33 may be formed on two or more adjacent rising wall members 32 among the four rising wall members 32. In addition, the area of the joining portion 33 formed on one rising wall member 32 is preferably 1 $cm^2$ or more. In addition, the thickness of the member that forms the partition structure 3 is preferably within a range of 0.3 mm or more and 1.0 mm or less from the viewpoint of reducing the weight and thickness of the electronic device housing. In addition, the elastic modulus of the member that forms the partition structure 3 is preferably within a range of 20 GPa or more and 120 GPa or less.

In addition, it is preferable that the partition structure 3 is formed of a material having flame retardancy higher than that of V-2 in the UL 94 standard. More preferably, the partition structure 3, and the bottom cover 2 or the top cover 4 which is joined to the partition structure 3 are formed of a material having flame retardancy higher than V-2 in the UL 94 standard. Even if the battery is fired, accidents such as spreading of fire to other electronic components and burns of the user can be prevented by using a material as described above. It is preferable that the partition structure 3 is formed of any one of the above-described metal material and fiber-reinforced composite material, and the material can be selected according to the purpose of the partition structure 3. That is, from the viewpoint of exhibiting a high reinforcing effect, it is preferable to use a metal material or fiber-reinforced composite material having a high elastic modulus, and from the viewpoint of heat dissipation, it is preferable to use a metal material having a high thermal conductivity. Further, when the partition structure 3 is formed of a fiber-reinforced composite material, it is preferable that the partition structure 3 is composed of a laminate of continuous fiber prepregs. In addition, the ratio of the linear expansion coefficient of the partition structure 3 to the linear expansion coefficient of the bottom cover 2 or the top cover 4 to which the partition structure 3 is joined is preferably within a range of 0.1 or more and 10 or less.

In addition, it is preferable that the joining portion 33 of the partition structure 3 is joined to the flat portion 21 of the bottom cover 2 by thermal welding. The peeling load at 23° C. is more preferably within a range of 100 $N/cm^2$ or more and 5000 $N/cm^2$ or less. Examples of the thermal welding method may include an insert injection method, an outsert injection method, a vibration welding method, an ultrasonic welding method, a laser welding method and a hot plate welding method. Here, it is preferable that the bonding surface between the joining portion 33 and the flat portion 21 has a peeling load of less than 60 $N/cm^2$ at 200° C. in addition, the peeling load at 200° C. is more preferably 30 $N/cm^2$ or less.

In addition, this peeling load is preferably less than 60 $N/cm^2$ at 180° C., and it is preferable from the viewpoint of disassembling adhesive that the peeling load can be easily peeled off in a lower temperature range. However, when the disassembling temperature decreases, the partition structure 3 may be peeled off by temperature elevation associated with operation of an electronic component or depending on a temperature of a use environment in use as an electronic device housing. Therefore, it is preferable that in the temperature range where the electronic device housing is used, the partition structure is joined with high bonding strength, and in the disassembling temperature range, the reinforcing structure can be easily peeled off. Thus, the peeling load at 80° C. is more preferably within a range of 60 $N/cm^2$ or more and 5000 $N/cm^2$ or less.

The peeling load at 200° C. is preferably as low as possible, and most preferably 10 $N/cm^2$ or less. Since the peeling load at 200° C. is preferably as low as possible, the lower limit thereof is not particularly limited, and is preferably 0 $N/cm^2$ or more, but the peeling load at 200° C. is more preferably 1 $N/cm^2$ or more because when it is excessively low, handling characteristics may be deteriorated. With this configuration, disassembling bondability that makes it possible to easily remove the partition structure 3 can be exhibited, so that repair and recycling of an electronic device can be facilitated. In addition, it is preferable that the partition structure 3, and the bottom cover 2 or the top cover 4 to which the partition structure 3 is joined are formed of a fiber-reinforced composite material, a thermoplastic resin is provided in or on a joining portion of at least one of the partition structure 3 and the bottom cover 2 or the top cover 4, and the partition structure 3 and the bottom cover 2 or the top cover 4 are joined with the thermoplastic resin.

As a method for providing a thermoplastic resin on the joining portion, mention is made of a method in which using a fiber-reinforced sheet (prepreg sheet) including a thermoplastic resin as a matrix resin, molding is performed to obtain the partition structure 3, and the bottom cover 2 or the top cover 4 to which the partition structure 3 is joined. A molded product obtained by this method is preferable because a thermoplastic resin is present on a surface of the molded product at a high ratio, and therefore it is possible to secure a wide bonding area in joining, leading to an increase in selection freedom of a joining site. From the viewpoint of the dynamic characteristics of the members, a fiber-reinforced composite material including a thermosetting resin as a matrix resin is preferable, and as a method for providing a thermoplastic resin on such a member, a mention is made of a method in which a molten material obtained by heating and melting a thermoplastic resin or a solution obtained by dissolving a thermoplastic resin in a solvent is applied to provide a thermoplastic resin on the fiber-reinforced composite material. In addition, a mention may be made of, for example, a method in which in molding and curing of a fiber-reinforced sheet (prepreg sheet) including a thermosetting resin as a matrix resin, a laminate in which a film or nonwoven fabric composed of a thermoplastic resin is laminated on a surface is molded under heat and pressure on the outermost layer of the fiber-reinforced sheet (prepreg sheet).

In addition, it is preferable that the partition structure 3 and the bottom cover 2 or the top cover 4 are joined directly. When a fiber-reinforced composite material having a thermoplastic resin is used for the joining portion 33 of the partition structure 3 and/or the joining portion of the bottom cover 2 or the top cover 4 that is bonded to the joining portion 33, it is not necessary to use an adhesive in addition to the members, and the members can be joined directly, so that an increase in weight of the electronic device housing 1 can be suppressed. A suitable method for directly joining the partition structure 3 and the bottom cover 2 or the top cover 4 is a method using a laminate, in which a film or nonwoven fabric composed of a thermoplastic resin is laminated on a surface, for the outermost layer of a fiber-reinforced sheet (prepreg sheet) including a thermosetting resin as a matrix resin, and the thermoplastic resin used here can also be selected from the group of thermoplastic resins exemplified as the matrix resin.

Preferably, a thermoplastic resin is selected which has a melting point lower than the molding temperature at which a fiber-reinforced sheet (prepreg sheet) with the matrix resin composed of a thermosetting resin is molded and cured. The lower limit of the melting point of the thermoplastic resin is not particularly limited, but it is preferably 80° C. or higher, more preferably 100° C. or higher from the viewpoint of exhibiting heat resistance in application of the electronic device housing of the present invention to an electronic device. In addition, the form of the thermoplastic resin is not particularly limited, and examples thereof include forms of films, continuous fibers, woven fabrics, particles, nonwoven fabrics and the like, but from the viewpoint of handling characteristics during molding operation, forms of films and nonwoven fabrics are preferable. By selecting such a resin, the thermoplastic resin is melted during molding, and the thermoplastic resin is formed while spreading like a film over a surface of a molded product, so that the bonding area increases during joining, or the reinforcing fibers of the fiber-reinforced sheet are impregnated with the thermoplastic resin to form a strong thermoplastic resin layer, so that high peeling strength can be exhibited. The thermoplastic resin may be provided on at least one of the partition structure 3 obtained in the above-mentioned method and the bottom cover 2 and the top cover 4 joined to the partition structure 3, but it is preferable that the thermoplastic resin is provided on the joining members of both the members to be joined. In addition, it is preferable that substantially the same thermoplastic resin is selected as thermoplastic resins to be provided.

In this specification, the "disassembling adhesive" means that the partition structure 3 can be not only easily removed, but also re-bonded, and in re-bonding, the thermoplastic resin may be provided, but it is preferable that the reinforcing structure can be re-bonded without increasing the weight of the thermoplastic resin or the like. In addition, the peeling load in re-bonding is preferably 50% or more, more preferably 70% or more, of the original peeling load. The disassembling adhesive in the present invention can be attained by applying to a joining technique such characteristics of a thermoplastic resin that the resin is melted by heating to reduce dynamic characteristics, and the resin is solidified by cooling or at normal temperature to exhibit high dynamic characteristics specific to the resin.

In addition, the partition structure 3 may be joined to the bottom cover 2 or the top cover 4 by a pressure sensitive adhesive, a screw or the like. Further, a hole can be formed in each of the flat portion 31, the rising wall member 32 and the joining portion 33 of the partition structure 3 to the extent that torsional rigidity in the present invention is improved. With such a structure, it is possible to dispose a wiring cable for connecting an electronic component built in the hollow structure S1 to an electronic component disposed in a space (space S3 as described later) other than the hollow structure S1 divided by the bottom cover 2 and the top cover 4, and a display, a keyboard and so on which correspond to the top cover 4. From the viewpoint of heat dissipation, it is preferable that the hole is disposed to so as to improve the flow of air, e.g. the hole is formed on the opposed rising wall member 32. The area of the holes is preferably 30% or less of the surface area of the partition structure 3, and is more desirably 15% or less of the surface area of the reinforcing structure 3 from the viewpoint of torsional rigidity.

In addition, the hollow structure S1 may be formed by joining the edge member of the partition structure 3 to the bottom cover 2 or the top cover 4 with the partition structure 3 being formed from a partition structure having an opening. As used herein, "partition structure having an opening" refers to a shape having an opening in a part of the partition structure, and may be a member having a joining portion as described above and shown in FIGS. 32(*a*) and 32(*b*). That is, one example of the partition structure having an opening is a partition structure having a flat portion, a rising wall member erected on the edge member of the flat portion, and a joining portion extending from the edge member of the rising wall member, or having a curved portion, and a joining portion extending from an edge member of the curved.

The top cover 4 is joined to the edge member of the rising wall member 22 of the bottom cover 2. In FIG. 26, the top cover 4 has a smooth plate shape, but may have a plate shape having a curved surface or irregularities. In addition, the top cover 4 may be an electronic component such as a liquid crystal display or a keyboard, and with such a configuration, application to a clamshell-type personal computer or a tablet-type personal computer is possible.

As is evident from the above description, the electronic device housing 1 according to the third aspect of the present invention includes: the bottom cover 2; the top cover 4; the partition structure 3 that is disposed in a space divided by the bottom cover 2 and the top cover 4; the battery D5; and the electronic component D6, the partition structure 3 being joined to the bottom cover 2 or the top cover 4, the battery D5 being fixed in the hollow structure S1 formed by joining the partition structure 3 to the bottom cover 2 or the top cover 4. Accordingly, it is possible to effectively suppress breakage of the battery stored inside while attaining thickness reduction and weight reduction.

The projected area S of the partition structure 3 in a direction of the bottom cover 2 or the top cover 4 to which the partition structure 3 is joined may be adjusted to fall within a range of 60% or more and 95% or less of the projected area R of the bottom cover 2 or the top cover 4 to which the partition structure 3 is joined. In addition, the disposed position of the partition structure 3 is not particularly limited, but it is preferable that the partition structure 3 is positioned equally from the center position of the bottom cover 2 or the top cover 4, and by disposing the partition structure 3 in this manner, torsional rigidity in an x direction or a y direction can be made isotropic. From the viewpoint of effectively utilizing a space S3 excluding the hollow structure S1, in the space divided by the bottom cover 2 and the top cover 4, the partition structure 3 may be placed on any one of the bottom cover 2 and the top cover 4.

Specifically, when the projected area S is less than 60% of the area of the bottom cover 2 or the top cover 4 to which the partition structure 3 is joined, there arises the problem that the rising wall member that is one factor of exhibiting torsional rigidity in the present invention is formed at a position close to the center position of the bottom cover 2 or the top cover 4, so that original torsional rigidity cannot be exhibited. On the other hand, when the projected area S is more than 95% of the area of the bottom cover 2 or the top cover 4 to which the partition structure 3 is joined, high torsional rigidity can be exhibited, but there arises the problem that the space S3 becomes small, and therefore it is difficult to dispose electronic components and wiring and the like for forming an electronic device, so that application as an electronic device housing is difficult. Thus, the projected area S of the partition structure 3 in a direction of the bottom cover 2 or the top cover 4 to which the partition structure 3 is joined may be within a range of 60% or more and 95% or less of the area R of the bottom cover 2 or the top cover 4 to which the partition structure 3 is joined.

In the present invention, the projected area of the partition structure 3 in a direction of the bottom cover 2 or the top cover 4 to which the joining portion 33 is joined is preferably within a range of 60% or more and 95% or less of the area of the bottom cover 2 or the top cover 4 to which the joining portion 33 is joined, and therefore, in the present invention, rather than an aspect in which the partition structure 3 and the bottom cover 2 or the top cover 4 are joined to each other at a lateral surface, an aspect in which the joining portion of the partition structure 3 is joined to the flat portion of the bottom cover 2 or the top cover 4 as long as, for example, the partition structure 3 has the flat portion, the rising wall member erected on the edge member of the flat portion, and the joining portion extending from the edge member of the rising wall member, and the bottom cover 2 or the top cover 4 joined to the partition structure 3 has a flat portion.

Here, the shape of the projected surface of the partition structure 3, i.e. the shape of the flat portion 31 is not particularly limited, and may be not only a rectangular shape, but also a circular shape or a polygonal shape, and from the viewpoint of exhibiting high deflection rigidity, a shape conforming to the shape of the bottom cover 2 and/or the top cover 4 is preferable. Specifically, in the example shown in FIG. 26, the shape of the projected surface of the partition structure 3 is preferably a rectangular shape. In addition, from the viewpoint of effectively utilizing the hollow structure S1 and the space S3 excluding the hollow structure S1, the shape of the projected surface of the partition structure 3 is preferably a shape conforming to the shape of an electronic component to be packed. In addition, from the viewpoint of exhibiting isotropic rigidity against any load, the shape of the projected surface of the partition structure 3 is preferably a shape that is symmetric with respect to an axis in the x direction and/or the y direction.

In addition, the volume of the hollow structure S1 formed by the partition structure 3 in the bottom cover 2 is within a range of 55% or more and 95% or less of the volume of the space S2 divided by the bottom cover 2 and the top cover 4. Specifically, when the volume of the hollow structure S1 is less than 55% of the volume of the space S2, there arises the problem that the height of the rising wall member 32 that is one factor exhibiting torsional rigidity in the present invention is low and/or the projected area of the partition structure 3 is small, so that original torsional rigidity cannot be exhibited. On the other hand, when the volume of the hollow structure S1 is more than 95% of the volume of the space S2, high torsional rigidity can be exhibited, but there arises the problem that the space S3 left after excluding the hollow structure S1 from the space S2 becomes small, and thus it is difficult to dispose electronic components and wiring and the like for forming an electronic device, so that application as an electronic device housing is difficult. Thus, the volume of the hollow structure S1 is preferably within a range of 55% or more and 95% or less of the volume of the space S2 divided by the bottom cover 2 and the top cover 4.

In the present embodiment, the partition structure 3 includes one component, but the partition structure 3 may include a plurality of components. Similarly, the bottom cover 2 and the top cover 4 include one component, but the bottom cover 2 and/or the top cover 4 may include a plurality of components. With regard to the partition structure including a plurality of components, the bottom cover including a plurality of components, and the top cover including a plurality of components, the method for joining a plurality of components for forming the partition structure 3, the bottom cover 2 and the top cover 4 is not particularly limited. Examples of the method for joining a plurality of components include a method components are provided with holes, and fastened using screws, rivets and the like, or a method in which components shapes so that they can be mutually fitted are fitted and joined. Other methods for joining a plurality of components include a method in which in which an adhesive is applied to join components, and a method in which components are joined by thermal welding with a thermoplastic resin interposed between the components. Examples of the thermal welding method may include an insert injection method, an outsert injection method, a vibration welding method, an ultrasonic welding method, a laser welding method and a hot plate welding method.

Hereinafter, the present invention will be described in detail by way of examples. However, the present invention is not limited to the following examples.

<Evaluation and Measurement Methods>

(1) Torsional Rigidity Test

A housing 1 was fixed in a tester in such a manner that one side of the electronic device housing 1 was fixed by a U-shaped fixing tool 100, and the other side opposed to the fixed side was held by a support tool 101 as shown in FIG. 7(*a*), the displacement amount of the electronic device housing 1 was then measured when a load of 50 N was applied with a change rate set to 1°/min at an angle θ as shown in FIG. 7(*b*), and the measured value was defined as a torsional rigidity value of the electronic device housing.

(2) Deflection Rigidity Test

As shown in FIG. 8, the electronic device housing was installed in a tester in such a manner that it was able to apply a load F from the side of a bottom cover 2 or a top cover 4 to which the partition structure was joined. “Instron” (registered trademark) Universal Tester Model 4201 (manufactured by Instron Co., Ltd.) was used as a tester. The flex amount of the bottom cover 2 or the top cover 4 was measured when a load of 100 N was applied with the electronic device housing 1 pressed at the center position at a cross head speed of 1.0 mm/min using an indenter 102 having a diameter of 20 mm, and the measured value was defined as a deflection rigidity value.

(3) Falling Ball Test

Figure 33:
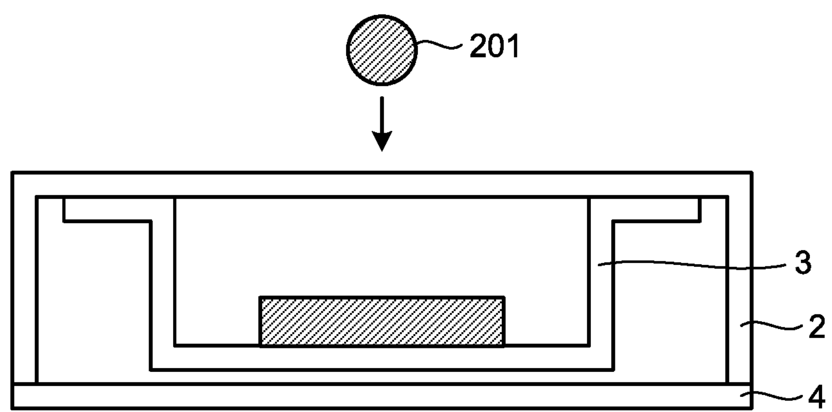
FIG. 33 is a schematic view for illustrating a falling ball test method.

As shown in FIG. 33, the electronic device housing was disposed in such a manner that the bottom cover 2 constituted the upper surface, and a steel ball 201 having a diameter of 25 mm and a weight of 66.7 g was naturally dropped from a height of 1 m to the center of the electronic device housing. In this test, wood material having a size identical to that of the battery and having a pressure-sensitive sheet attached to a surface thereof was disposed in place of the battery to be disposed. Contact between the bottom cover and the pressure-sensitive sheet was made recognizable by a change in color of the attached pressure sensitive sheet. Here, the area of a portion of the pressure-sensitive sheet, the color of which was changed, was measured, and evaluation was performed in accordance with the following criteria. ⊙: the area is 4 $cm^2$ or more. ○: the area is 4 $cm^2$ or more and less than 10 $cm^2$. Δ: the area is 10 $cm^2$ or more and less than 30 $cm^2$. x: the area is 30 $cm^2$ or more.

(4) Evaluation of Flexural Modulus

In accordance with the specifications in ASTM D-790 (1997), the flexural moduli of materials to be used for the partition structure 3, the bottom cover 2 and the top cover 4 were evaluated. From each of members obtained in examples and comparative examples, a bending test piece having a width of 25±0.2 mm with a length set to span L+20±1 mm so that the thickness D and the span L satisfied the relationship of L/D=16 was cut for the four directions: 0°, +45°, −45° and 90° directions where a certain direction was set to the 0° direction. In this way, test pieces were prepared. The number of measurements (n) in each direction was 5, and the average value of all measured values (n=20) was defined as a flexural modulus. “Instron” (registered trademark) Universal Tester Model 4201 (manufactured by Instron Co., Ltd.) was used as a tester, a three-point bending test tool (indenter diameter: 10 mm, fulcrum diameter: 10 mm) was used, the support span was set to 16 times of the thickness of the test piece, and the bending elastic modulus was measured. The test was conducted under the following conditions: the moisture content of the test piece was 0.1 mass % or less, the atmospheric temperature was 23° C., and the humidity was 50% by mass.

(5) Peeling Load Test of Partition Structure (23° C. and 200° C.)

The peeling load of the partition structure was evaluated in accordance with “Testing methods for tensile strength of adhesive bonds” specified in JIS K6849 (1994). As test pieces in this test, electronic device housings obtained in examples and comparative examples were used. Here, for measuring the peeling strength of the partition structure, evaluation was performed in a state in which there was not a top cover or bottom cover to which the partition structure was not joined (before the reinforcing structure was joined). Specifically, as shown in FIG. 9, the bottom cover 2 or the top cover 4 of the electronic device housing 1 was fixed by a fixing tool 103, and the partition structure 3 was fixed by a tensile tool 104. A tensile load F was applied while each member was fixed, and evaluation was performed until the partition structure 3 was peeled off, or the tensile tool 104 was detached from the partition structure 3. The bonding area here was calculated by measuring the width and length of the joining surface of the partition structure 3 before joining. When joining was partially performed, the areas thereof were measured, and summed to determine a joining area. The peeling load of the partition structure 3 was calculated from the resulting tensile load value and joining area. For the peeling load of the partition structure 3 at 200° C., the electronic device housing 1 was placed in a thermostat together with the fixing tool, and the atmospheric temperature in the thermostat was elevated to 200° C. After elevation of the temperature, this state was maintained for 10 minutes, and a tensile load was then applied in the same manner as in the peeling load test of the partition structure 3, and evaluation was performed.

<Materials Used>

Materials used for evaluation are shown below.

[Material 21]

“TORAYCA” Prepreg P3252S-12 (manufactured by Toray Industries, Inc.) was provided as material 21. The properties of material 21 are shown in Table 11 below.

[Material 22]

SCF183 EP-BL3 manufactured by SUPER RESIN. Inc. was provided as material 22. The properties of material 22 are shown in Table 11 below.

[Material 23]

An aluminum alloy A5052 was provided as material 23. The properties of material 23 are shown in Table 11 below.

[Material 24]

A magnesium alloy AZ31 was provided as material 24. The properties of material 24 are shown in Table 11 below.

[Material 25]

Using a master batch including 90% by mass of a polyamide 6 resin ("AMILAN" (registered trademark) CM1021T manufactured by Toray Industries, Inc.) and 10% by mass of a polyamide terpolymer resin composed of polyamide 6/66/610 ("AMILAN" (registered trademark) CM5000 manufactured by Toray Industries, Inc.), a thermoplastic resin film having a basis weight of 124 g/m$^2$ was prepared, and provided as material 25. The properties of material 25 are shown in Table 11 below.

TABLE 11

| | | Material 21 | Material 22 | Material 23 | Material 24 | Material 25 |
|---|---|---|---|---|---|---|
| Material | — | CFRP | GFRP | Al alloy | Mg alloy | Ny resin |
| Elastic modulus | GPa | 60 | 25 | 70 | 45 | 3.5 |
| Linear expansion coefficient | $10^{-6}$/° C. | 0.3 | 7 | 23.6 | 26 | 83 |
| Thermal conductivity | W/m · K | 3.0 | 0.3 | 236.0 | 159.0 | 0.3 |

Example 21

Example 21-(1): Preparation of Bottom Cover

Figure 34:
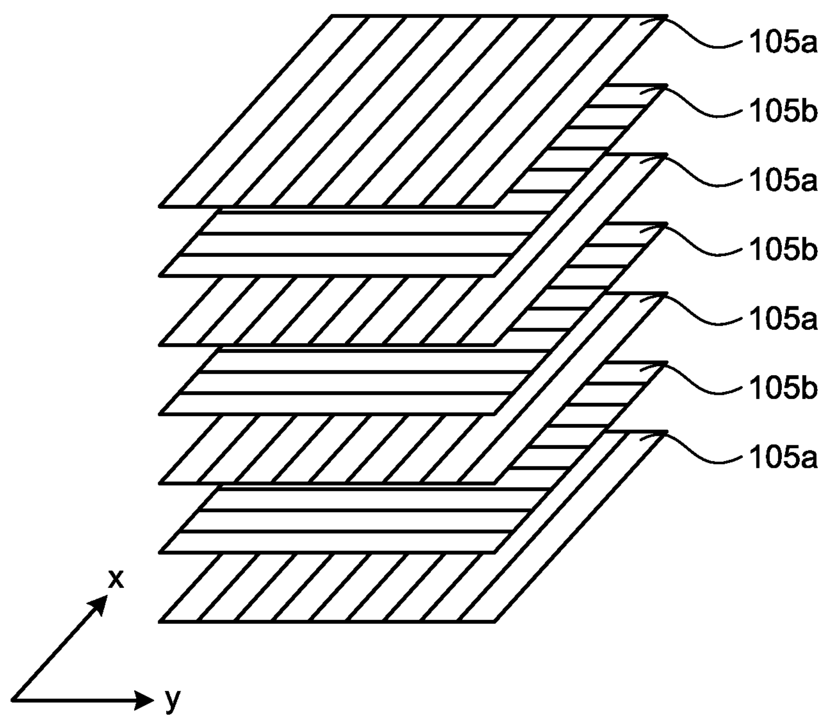
FIG. 34 is a perspective view showing a configuration of a laminate.

Seven sheets having a predetermined size were cut from material 21. Among them, four sheets were cut in such a manner that the fiber direction of a prepreg was parallel to a longitudinal direction (x direction in FIG. 26), and the other three sheets were cut in such a manner that the fiber direction was parallel to a lateral direction (y direction in FIG. 26). In this example, the lateral direction (y direction) was set to 0°, and as shown in FIG. 34, a laminate including seven prepreg sheets was prepared in such a manner that prepreg sheets 105*a* with the fiber direction set to 90° and prepreg sheets 105*b* with the fiber direction set to 0° were symmetrically laminated.

Here, a press molding apparatus and a pair of molds 106 as shown in FIG. 20(*a*) were used, and the resulting laminate 107 was disposed in a pair of molds 106. Here, the heating platen temperature of the press molding apparatus was set to 150° C., and as shown in FIG. 20(*b*), the molds 106 were moved, and the laminate was pressurized with the molding pressure kept at 1.0 MPa. After 30 minutes, the molds 106 were opened, and the molded article was removed from the molds 106. Trimming was performed so that the rising wall of the resulting molded article had a desired height, thereby obtaining a bottom cover.

Example 21-(2): Preparation of Top Cover

Except that molds configured to prepare a molded article having a smooth shape were used, the same procedure as in Example 21-(1) was carried out to obtain a molded article. Trimming was performed so that the resulting molded article had a desired size, thereby obtaining a top cover.

Example 21-(3): Preparation of Partition Structure

Except that molds 106 as shown in FIG. 10 were used, the same procedure as in Example 21-(1) was carried out to obtain a molded article. Trimming was performed so that the joining surface of the resulting molded article had a desired width, thereby obtaining a partition structure. As shown in FIG. 30, a battery was fixed inside the resulting partition structure.

Example 21-(4): Preparation of Electronic Device Housing

The members obtained in Examples 21-(1) to 21-(3) were joined using an adhesive 108 as shown in FIG. 22. The molding conditions and evaluation results in Example 21 are shown in Table 12 below.

Example 22

A bottom cover and a partition structure that were obtained in the same manner as in Examples 21-(1) and 21-(2) were joined to each other in the following manner: a molten hot melt resin (HM712 manufactured by Cemedine Co., Ltd.) was applied to a joining portion of the partition structure by a hot melt applicator at 140° C., a reinforcing structure was superposed thereon, a weight was placed on the partition structure, and this state was kept for 3 minutes. Except for the method for joining, the same procedure as in Examples 21-(1) to 21-(4) was carried out to obtain an electronic device housing. The molding conditions and evaluation results in Example 22 are shown in Table 12 below.

Example 23

Example 23-(1): Preparation of Bottom Cover

A film composed of a polyamide copolymer ("AMILAN" (registered trademark) CM8000 manufactured by Toray Industries, Inc.) and having a thickness of 50 μm was laminated on a surface to be joined to the partition structure, thereby obtaining a laminate. Except that the resulting laminate was used, the same procedure as in Example 21-(1) was carried out to obtain a bottom cover.

Example 23-(2): Preparation of Top Cover

As in the case of Example 23-(1), a film composed of a polyamide copolymer ("AMILAN" (registered trademark) CM8000 manufactured by Toray Industries, Inc.) and having a thickness of 50 μm was laminated on a surface to be joined to the bottom cover, thereby obtaining a laminate. Except that the resulting laminate was used, the same procedure as in Example 21-(2) was carried out to obtain a top cover.

Example 23-(3): Preparation of Partition Structure

As in the case of Example 23-(1), a film composed of a polyamide copolymer ("AMILAN" (registered trademark)

CM8000 manufactured by Toray Industries, Inc.) and having a thickness of 50 μm was laminated on a surface to be joined to the bottom cover, thereby obtaining a laminate. Except that the resulting laminate was used, the same procedure as in Example 21-(3) was carried out to obtain a partition structure.

Example 23-(4): Preparation of Electronic Device Housing

The partition structure obtained in Example 23-(3) and the bottom cover obtained in Example 23-(1) were superposed on each other in joined form, a joining tool 109 as shown in FIG. 11 was provided, and the joined bottom cover and partition structure were disposed, and heated and pressurized in a press molding apparatus set so that the joining tool 109 had a surface temperature of 180° C. After 1 minute, the bottom cover 2, the partition structure 3 and the joining tool 109 were taken out from the press molding apparatus, and cooled. After 5 minutes, the joining tool 109 was removed to obtain an integrated product of the bottom cover 2 and the partition structure 3. Thereafter, the top cover 4 was joined using an adhesive in the same manner as in Example 21-(4). The molding conditions and evaluation results in Example 23 are shown in Table 12 below.

Example 24

Except that the partition structure had a size as described in Table 12, the same procedure as in Example 23 was carried out to obtain an electronic device housing. The molding conditions and evaluation results in Example 24 are shown in Table 12 below.

Example 25

Each member was obtained in the same manner as in Example 23. Except that a soft urethane foam having a thickness of 3 mm was disposed on the bottom cover, the same procedure as in Example 23 was carried out to obtain an electronic device housing. The molding conditions and evaluation results in Example 25 are shown in Table 13 below.

Example 26

As another partition structure, 25 sheets of material 21 were laminated so as to have a thickness of 3 mm with 0° prepreg sheets and 90° prepreg sheets being symmetrically laminated in an alternate manner. In the same manner as in Example 21-(1), the laminate was heated and pressurized by a press molding machine to obtain a molded article. The resulting molded article was processed so as to have a width of 7.2 mm, thereby obtaining another partition structure having a size as shown in Table 13. The resulting another partition structure was disposed as shown in FIG. 31, and joined by an adhesive, and subsequently the same procedure as in Example 23 to obtain an electronic device housing. The molding conditions and evaluation results in Example 26 are shown in Table 13 below.

Example 27

Except that as the bottom cover, a material as described in Table 13 was used, the heating platen temperature was 220° C., and the molding pressure was 10 MPa, the same procedure as in Example 23 was carried out to obtain an electronic device housing. The molding conditions and evaluation results in Example 27 are shown in Table 13 below.

Example 28

Except that as the bottom cover, a material as described in Table 13 was used, the heating platen temperature was 200° C., and the molding pressure was 10 MPa, the same procedure as in Example 23 was carried out to obtain an electronic device housing. The molding conditions and evaluation results in Example 28 are shown in Table 13 below.

Example 29

Except that as the partition structure, a material as described in Table 14 was used, the same procedure as in Example 23 was carried out to obtain an electronic device housing. The molding conditions and evaluation results in Example 29 are shown in Table 14 below.

Example 30

Except that a partition structure was joined to a top cover, the same procedure as in Example 23 was carried out to obtain an electronic device housing. The molding conditions and evaluation results in Example 30 are shown in Table 14 below.

Example 31

Except that a battery was fixed to a surface of a bottom cover, the same procedure as in Example 23 was carried out to obtain an electronic device housing. The molding conditions and evaluation results in Example 31 are shown in Table 14 below.

Example 32

Examples 32-(1) and 32-(2): Preparation of Bottom Cover and Top Cover

Each member was obtained in the same manner as in Examples 23-(1) and 23-(2).

Example 32-(3): Preparation of Partition Structure

Except that a mold corresponding to only a flat portion of a partition structure was used, the same procedure as in Example 23-(3) was carried out to obtain a flat portion of a partition structure. The flat portion of the resulting partition structure was then inserted into an injection mold, and using a molding machine, a glass fiber-reinforced resin (CM1011G-30 manufactured by Toray Industries, Inc.) was molded by insert injection molding at a cylinder temperature of 260° C. and a mold temperature of 80° C. to form a rising wall member of a partition structure, thereby obtaining a partition structure.

Example 32-(4): Preparation of Housing

Except that each member obtained in Examples 32-(1) and 32-(3) was used, the same procedure as in Example 23-(4) was carried out to obtain an integrated product of a bottom cover 2 and a partition structure 3. Similarly, the top cover obtained in Example 23-(2) was thermally welded and joined to the bottom cover. The molding conditions and evaluation results in Example 32 are shown in Table 14 below.

Comparative Example 21

Comparative Example 21-(1): Preparation of Bottom Cover

A laminate obtained by laminating 10 sheets of material 25, a press molding apparatus, and a pair of molds 106 were used. The laminate was disposed in a pair of molds 106. Here, the heating platen temperature of the press molding apparatus was set to 260° C., and the laminate was pressurized with the molding pressure kept at 1.0 MPa. After 10 minutes, cooling water was made to pass through the heating plate, so that cooling was started. After the mold temperature decreased to 100° C. or lower, the molds 106 were opened, and a molded article was taken out from the molds 106. Trimming was performed so that the rising wall of the resulting molded article had a desired height, thereby obtaining a bottom cover.

Comparative Example 21-(2): Preparation of Top Cover

Except that the mold to be used was changed so as to attain a size as described in Table 15, the same procedure as in Comparative Example 21-(1) was carried out to obtain a top cover.

Comparative Example 21-(3): Preparation of Electronic Device Housing

The resulting bottom cover and top cover were superposed on each other in a joined form, and joined using an ultrasonic welding machine. Thereafter, the top cover was joined using an adhesive in the same manner as in Example 21 except that a partition structure was not used. The molding conditions and evaluation results in Comparative Example 21 are shown in Table 15 below.

Comparative Example 22

Except that a partition structure was not used, and material 23 was used for a top cover, the same procedure as in Example 27 was carried out to obtain each member. Except that the resulting members were used, the same procedure as in Example 21 was carried out to obtain an electronic device housing. The molding conditions and evaluation results in Comparative Example 22 are shown in Table 15 below.

Comparative Example 23

Each member was obtained in the same manner as in Example 21. In the resulting bottom cover, a hole was formed so that it was possible to take out a battery, and a lid was prepared. Except that a battery was fixed to the prepared lid, the same procedure as in Example 21 was carried out to obtain an electronic device housing. The molding conditions and evaluation results in Comparative Example 23 are shown in Table 15 below.

[Evaluation]

It was confirmed that the electronic device housings obtained in examples were capable of effectively suppressing breakage of the battery. In particular, in Examples 21 to 23 and 25 to 29, interference with the battery was small in the falling ball test, and it was possible to effectively suppress breakage of the battery. In addition, high torsional rigidity and deflection rigidity were exhibited. In Example 24, the size of the hollow structure S1 in which the battery was fixed was reduced to secure a space to be packed with other electronic components, and resultantly electronic device housing was capable of contributing to thickness reduction. In Example 25, a cushioning member was disposed in a gap between the bottom cover and the battery, and therefore the electronic device housing was capable of reducing impacts on the battery. In the electronic device housing of Example 26, impacts were hardly transmitted to the battery owing to the effect of another partition structure.

In Examples 27 and 28, a metal material having high dynamic properties was used for the bottom cover, and thus breakage of the battery was effectively suppressed due to depression of the metal material. In addition, the metal material has a high thermal conductivity, and is therefore preferable from the viewpoint of thermal characteristics. Example 29 is preferable from the viewpoint of shielding other electronic components from noises emitted from the battery because a carbon fiber-reinforced composite material shielding electromagnetic waves is used for the partition structure. In Example 30, the partition structure is joined to the top cover, and thus impacts from the bottom cover side are hardly transmitted, so that breakage of the battery is effectively suppressed.

In addition, Examples 22 to 32 are preferable from the viewpoint of repair and recycling because the top cover and the partition structure are joined to each other by thermal welding, and therefore the joining portion can be disassembled by heating while breakage of the battery is suppressed, and high torsional rigidity and deflection rigidity are exhibited. In addition, Examples 22 and 32 are preferable from the viewpoint of weight reduction because the partition structure and the bottom cover or the top cover are bonded directly to each other, and therefore an increase in weight is smaller as compared to a case where an adhesive or a hot melt resin is used. While it was normally difficult for a user to make an access, it was possible to easily disassemble the electronic device housing only when necessary.

On the other hand, the electronic device housings of Comparative Examples 21 to 22 have a configuration that has been proposed heretofore. In Comparative Example 21, the electronic device housing was formed of a resin material, and therefore it was not possible to inhibit the battery from being broken by impacts from a falling ball etc. The electronic device housing of Comparative Example 23 was formed of a metal material, and therefore exhibited rigidity originating from a metal material, but was not satisfactory. In addition, since a partition structure was not used, it was not possible to provide a gap between the battery and the bottom cover, and thus the battery received impacts directly, leading to a high possibility of breakage. The electronic device housing of Comparative Example 23 has the same configuration as in Example 21, but is not preferable because the electronic device housing can be opened and closed with a lid, and therefore there is the possibility of contact with other members when the lid is detached, or a user can easily make an access.

TABLE 12

| | | Example 21 | Example 22 | Example 23 | Example 24 |
|---|---|---|---|---|---|
| Bottom cover: | | | | | |
| Material | — | Material 21 | Material 21 | Material 21 | Material 21 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | $cm^2$ | 630 | 630 | 630 | 630 |
| Volume | $cm^3$ | 572 | 572 | 572 | 572 |
| Top cover: | | | | | |
| Material | — | Material 21 | Material 21 | Material 21 | Material 21 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Partition structure: | | | | | |
| Material | — | Material 22 | Material 22 | Material 22 | Material 22 |
| Length | mm | 200 | 200 | 200 | 200 |
| Width | mm | 290 | 290 | 290 | 290 |
| Height | mm | 8 | 8 | 8 | 5 |
| Angle | ° | 90 | 90 | 90 | 90 |
| Thickness | mm | 0.8 | 0.8 | 0.8 | 0.8 |
| Joining portion width | mm | 5 | 5 | 5 | 5 |
| Bonding area | $cm^2$ | 48 | 48 | 48 | 48 |
| Projected area | $cm^2$ | 580 | 580 | 580 | 580 |
| Volume | $cm^3$ | 412 | 412 | 412 | 240 |
| Another partition structure: | | | | | |
| Material | — | — | — | — | — |
| Length | mm | — | — | — | — |
| Width | mm | — | — | — | — |
| Height | mm | — | — | — | — |
| Battery: | | | | | |
| Fixation position | — | Partition structure surface | Partition structure surface | Partition structure surface | Partition structure surface |
| Gap | mm | 3 | 3 | 3 | 1 |
| Cushioning material | — | — | — | — | — |
| Electronic device housing | | | | | |
| Projected area ratio | % | 92.1 | 92.1 | 92.1 | 92.1 |
| Volume ratio | % | 72.0 | 72.0 | 72.0 | 42.0 |
| Integration method | — | Adhesive | Thermal welding | Thermal welding | Thermal welding |
| Bonding portion | — | Plane | Plane | Plane | Plane |
| Peeling load (23° C.) | $N/cm^2$ | 1500 | 2000 | 2500 | 2500 |
| Peeling load (200° C.) | $N/cm^2$ | 700 | 50 | 50 | 50 |
| Evaluation | | | | | |
| Torsional rigidity | — | ⊙ | ⊙ | ⊙ | ⊙ |
| Deflection rigidity | — | ○ | ○ | ○ | ○ |
| Falling ball test | — | ⊙ | ⊙ | ⊙ | ○ |

TABLE 13

| | | Example 25 | Example 26 | Example 27 | Example 28 |
|---|---|---|---|---|---|
| Bottom cover: | | | | | |
| Material | — | Material 21 | Material 21 | Material 23 | Material 24 |
| Length | mm | 210 | 210 | 210 | 210 |
| Width | mm | 300 | 300 | 300 | 300 |

TABLE 13-continued

| | | Example 25 | Example 26 | Example 27 | Example 28 |
|---|---|---|---|---|---|
| Height | mm | 10 | 10 | 10 | 10 |
| Thickness | mm | 0.8 | 0.8 | 0.6 | 0.6 |
| Projected area | $cm^2$ | 630 | 630 | 630 | 630 |
| Volume | $cm^3$ | 572 | 572 | 586 | 586 |
| Top cover: | | | | | |
| Material | — | Material 21 | Material 21 | Material 21 | Material 21 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Partition structure: | | | | | |
| Material | — | Material 22 | Material 22 | Material 22 | Material 22 |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.8 | 0.8 | 0.8 |
| Joining portion width | mm | 5 | 5 | 5 | 5 |
| Bonding area | $cm^2$ | 48 | 48 | 48 | 48 |
| Projected area | $cm^2$ | 580 | 580 | 580 | 580 |
| Volume | $cm^3$ | 412 | 412 | 412 | 412 |
| Another partition structure: | | | | | |
| Material | — | — | Material 21 | — | — |
| Length | mm | — | 188 | — | — |
| Width | mm | — | 3 | — | — |
| Height | mm | — | 7.2 | — | — |
| Battery: | | | | | |
| Fixation position | — | Partition structure surface | Partition structure surface | Partition structure surface | Partition structure surface |
| Gap | mm | 3 | 3 | 3 | 3 |
| Cushioning material | — | Present | — | — | — |
| Electronic device housing | | | | | |
| Projected area ratio | % | 92.1 | 92.1 | 92.1 | 92.1 |
| Volume ratio | % | 72.0 | 72.0 | 70.2 | 70.2 |
| Integration method | — | Thermal welding | Thermal welding | Thermal welding | Thermal welding |
| Bonding portion | — | Plane | Plane | Plane | Plane |
| Peeling load (23° C.) | N/$cm^2$ | 2500 | 2500 | 2500 | 2500 |
| Peeling load (200° C.) | N/$cm^2$ | 50 | 50 | 50 | 50 |
| Evaluation | | | | | |
| Torsional rigidity | — | ⊙ | ⊙ | ⊙ | ⊙ |
| Deflection rigidity | — | ○ | ⊙ | ○ | ○ |
| Falling ball test | — | ⊙ | ⊙ | ⊙ | ⊙ |

TABLE 14

| | | Example 29 | Example 30 | Example 31 | Example 32 |
|---|---|---|---|---|---|
| Bottom cover: | | | | | |
| Material | — | Material 21 | Material 21 | Material 21 | Material 21 |
| Length | mm | 210 | 210 | 210 | 210 |
| Width | mm | 300 | 300 | 300 | 300 |
| Height | mm | 10 | 10 | 10 | 10 |
| Thickness | mm | 0.8 | 0.8 | 0.8 | 0.8 |
| Projected area | $cm^2$ | 630 | 630 | 630 | 630 |
| Volume | $cm^3$ | 572 | 572 | 572 | 572 |

TABLE 14-continued

| | | Example 29 | Example 30 | Example 31 | Example 32 |
|---|---|---|---|---|---|
| Top cover: | | | | | |
| Material | — | Material 21 | Material 21 | Material 21 | Material 21 |
| Length | mm | 210 | 210 | 210 | 210 |
| Width | mm | 300 | 300 | 300 | 300 |
| Height | mm | — | — | — | — |
| Thickness | mm | 0.8 | 0.8 | 0.8 | 0.8 |
| Projected area | $cm^2$ | 630 | 630 | 630 | 630 |
| Volume | $cm^3$ | — | — | — | — |
| Partition structure: | | | | | |
| Material | — | Material 21 | Material 22 | Material 22 | Material 2/ GF-reinforced resin |
| Length | mm | 200 | 200 | 200 | 200 |
| Width | mm | 290 | 290 | 290 | 290 |
| Height | mm | 8 | 8 | 8 | 8 |
| Angle | ° | 90 | 90 | 90 | 90 |
| Thickness | mm | 0.8 | 0.8 | 0.8 | 0.8 |
| Joining portion width | mm | 5 | 5 | 5 | 5 |
| Bonding area | $cm^2$ | 48 | 48 | 48 | 48 |
| Projected area | $cm^2$ | 580 | 580 | 580 | 580 |
| Volume | $cm^3$ | 412 | 412 | 412 | 412 |
| Another partition structure: | | | | | |
| Material | — | — | — | — | — |
| Length | mm | — | — | — | — |
| Width | mm | — | — | — | — |
| Height | mm | — | — | — | — |
| Battery: | | | | | |
| Fixation position | — | Partition structure surface | Partition structure surface | Bottom cover surface | Partition structure surface |
| Gap | mm | 3 | 2.2 | 0 | 3 |
| Cushioning material | — | — | — | — | — |
| Electronic device housing | | | | | |
| Projected area ratio | % | 92.1 | 92.1 | 92.1 | 92.1 |
| Volume ratio | % | 72.0 | 72.0 | 72.0 | 72.0 |
| Integration method | — | Thermal welding | Thermal welding | Thermal welding | Thermal welding |
| Bonding portion | — | Plane | Plane | Plane | Plane |
| Peeling load (23° C.) | $N/cm^2$ | 2500 | 2500 | 2500 | 2500 |
| Peeling load (200° C.) | $N/cm^2$ | 50 | 50 | 50 | 50 |
| Evaluation | | | | | |
| Torsional rigidity | — | ⊙ | ⊙ | ⊙ | ⊙ |
| Deflection rigidity | — | ○ | ○ | ○ | ○ |
| Falling ball test | — | ⊙ | Δ | Δ | ⊙ |

TABLE 15

| | | Comparative Example 21 | Comparative Example 22 | Comparative Example 23 |
|---|---|---|---|---|
| Bottom cover: | | | | |
| Material | — | Material 25 | Material 23 | Material 21 |
| Length | mm | 210 | 210 | 210 |
| Width | mm | 300 | 300 | 300 |
| Height | mm | 10 | 10 | 10 |
| Thickness | mm | 0.8 | 0.8 | 0.8 |
| Projected area | $cm^2$ | 630 | 630 | 630 |
| Volume | $cm^3$ | 572 | 572 | 572 |

TABLE 15-continued

| | | Comparative Example 21 | Comparative Example 22 | Comparative Example 23 |
|---|---|---|---|---|
| Top cover: | | | | |
| Material | — | Material 25 | Material 23 | Material 21 |
| Length | mm | 210 | 210 | 210 |
| Width | mm | 300 | 300 | 300 |
| Height | mm | — | — | — |
| Thickness | mm | 0.8 | 0.8 | 0.8 |
| Projected area | $cm^2$ | 630 | 630 | 630 |
| Volume | $cm^3$ | — | — | — |

TABLE 15-continued

| | | Comparative Example 21 | Comparative Example 22 | Comparative Example 23 |
|---|---|---|---|---|
| Partition structure: | | | | |
| Material | — | — | — | Material 22 |
| Length | mm | — | — | 200 |
| Width | mm | — | — | 290 |
| Height | mm | — | — | 8 |
| Angle | ° | — | — | 90 |
| Thickness | mm | — | — | 0.8 |
| Joining portion width | mm | — | — | 5 |
| Bonding area | $cm^2$ | — | — | 48 |
| Projected area | $cm^2$ | — | — | 580 |
| Volume | $cm^3$ | — | — | 412 |
| Another partition structure: | | | | |
| Material | — | — | — | — |
| Length | mm | — | — | — |
| Width | mm | — | — | — |
| Height | mm | — | — | — |
| Battery: | | | | |
| Fixation position | — | Bottom cover surface | Bottom cover surface | Bottom cover surface |
| Gap | mm | 0 | 0 | 0 |
| Cushioning material | — | — | — | — |
| Electronic device housing | | | | |
| Projected area ratio | % | 0.0 | 0.0 | 92.1 |
| Volume ratio | % | 0.0 | 0.0 | 72.0 |
| Integration method | — | — | — | Adhesive |
| Bonding portion | — | — | — | Plane |
| Peeling load (23° C.) | $N/cm^2$ | — | — | 1500 |
| Peeling load (200° C.) | $N/cm^2$ | — | — | 700 |
| Evaluationl | | | | |
| Torsional rigidity | — | X | Δ | X |
| Deflection rigidity | — | X | X | X |
| Falling ball test | — | X | X | Δ |

INDUSTRIAL APPLICABILITY

According to the present invention, there can be provided an electronic device housing having improved thermal characteristics and torsional rigidity while attaining thickness reduction and weight reduction. In addition, according to the present invention, there can be provided an electronic device housing having improved torsional rigidity and deflection rigidity while securing antenna performance. Further, according to the present invention, there can be provided an electronic device housing capable of effectively suppressing breakage of a battery stored inside while attaining thickness reduction and weight reduction.

DESCRIPTION OF REFERENCE SIGNS

1: Electronic device housing
2: Bottom cover
3: Partition structure
4: Top cover
5: Another partition structure
21: Flat portion
22: Rising wall member
31: Flat portion
32: Rising wall member
33: Joining portion

The invention claimed is:

1. An electronic device housing comprising: a bottom cover; a top cover;

a partition structure disposed in a space provided by the bottom cover and the top cover; and an antenna, the partition structure being joined to the bottom cover or the top cover, wherein the electronic device housing satisfies the following condition (A) or (B), and the shortest distance between a first material having a volume resistivity of less than $1.0\times10^{-2}$ Ω·m and the antenna is 3 mm or more:

Condition (A): the antenna is disposed on the partition structure, and at least a part of the bottom cover or the top cover which is joined to the partition structure includes the first material, and the partition structure includes a second material having a volume resistivity of $1.0\times10^{-2}$ Ω·m or more; and Condition (B): the antenna is disposed on the bottom cover or the top cover to which the partition structure is joined, at least a part of the partition structure includes the first material, and the bottom cover or the top cover to which the partition structure is joined includes a second material having a volume resistivity of $1.0\times10^{-2}$ Ω·m or more.

2. The electronic device housing according to claim 1, wherein the antenna is disposed within a range of 50% or more and 95% or less of the height of the space where the position of the inner surface of the bottom cover is a reference position.

3. The electronic device housing according to claim 1, wherein at least a part of the top cover or the bottom cover which is not joined to the partition structure includes the second material.

4. The electronic device housing according to claim 1, wherein the shortest distance between the first material and a transmission portion and a reception portion that form the antenna is 3 mm or more.

5. The electronic device housing according to claim 1, wherein the partition structure is joined to a portion of the bottom cover or the top cover joined to the partition structure, which includes the first material.

6. The electronic device housing according to claim 1, wherein the projected area of the partition structure in a direction of the bottom cover or the top cover which is joined to the partition structure is within a range of 60% or more and 95% or less of the area of the bottom cover or the top cover to which the partition structure is joined.

7. The electronic device housing according to claim 1, wherein the partition structure is bonded to the bottom cover or the top cover by thermal welding in such a manner that the peeling load at 23° C. is within a range of 60 $N/cm^2$ or more and 5000 $N/cm^2$ or less, and the peeling load at 200° C. is less than 60 $N/cm^2$.

8. An electronic device housing comprising:

a bottom cover; a top cover; a partition structure that comprises a wall extending in a space between the bottom cover and the top cover so as to define an enclosed boundary with a central opening; and a heat generation member, wherein the partition structure is joined only to one of the bottom cover first surface or the top cover first surface to form a hollow structure that extends from the joined bottom cover first surface or the joined top cover first surface, and the heat generation member is disposed on an inner surface of the wall, and the partition structure is bonded to the bottom cover or the top cover by thermal welding in such a manner that the peeling load at 23° C. is within a range of 60 $N/cm^2$ or more and 5000 $N/cm^2$ or less, and the peeling load at 200° C. is less than 60 $N/cm^2$.

9. An electronic device housing comprising:

a bottom cover; a top cover; and a partition structure that is disposed in a space provided by the bottom cover and the top cover and has an opening, the partition structure being joined to the bottom cover or the top cover, wherein a battery is fixed in a hollow structure formed by joining the partition structure to the bottom cover or the top cover, the ratio of the thermal conductivity in a surface direction to the thermal conductivity in a thickness direction in the partition structure is within a range of 1 or more and 100 or less and the partition structure is bonded to the bottom cover or the top cover by thermal welding in such a manner that the peeling load at 23° C. is within a range of 60 $N/cm^2$ or more and 5000 $N/cm^2$ or less, and the peeling load at 200° C. is less than 60 $N/cm^2$.

* * * * *